US012579674B2

(12) United States Patent
Yoshida et al.

(10) Patent No.: US 12,579,674 B2
(45) Date of Patent: Mar. 17, 2026

(54) IMAGE SELECTION APPARATUS, IMAGE SELECTION METHOD, AND NON-TRANSITORY COMPUTER-READABLE MEDIUM

(71) Applicant: NEC Corporation, Tokyo (JP)

(72) Inventors: Noboru Yoshida, Tokyo (JP); Yadong Pan, Tokyo (JP); Ryo Kawai, Tokyo (JP); Jianquan Liu, Tokyo (JP); Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 556 days.

(21) Appl. No.: 17/921,415

(22) PCT Filed: May 8, 2020

(86) PCT No.: PCT/JP2020/018692
§ 371 (c)(1),
(2) Date: Oct. 26, 2022

(87) PCT Pub. No.: WO2021/224994
PCT Pub. Date: Nov. 11, 2021

(65) Prior Publication Data
US 2023/0206482 A1     Jun. 29, 2023

(51) Int. Cl.
*G06T 7/70* (2017.01)
*G06F 16/583* (2019.01)
*G06V 10/74* (2022.01)
(52) U.S. Cl.
CPC ............ *G06T 7/70* (2017.01); *G06F 16/5854* (2019.01); *G06V 10/761* (2022.01); *G06T 2207/20044* (2013.01); *G06T 2207/30196* (2013.01)
(58) Field of Classification Search
None
See application file for complete search history.

(56) References Cited

U.S. PATENT DOCUMENTS

2009/0060294 A1* 3/2009 Matsubara ............ G06F 16/532
                                                        382/118
2009/0307220 A1* 12/2009 Bennett ................... G06F 16/50
(Continued)

FOREIGN PATENT DOCUMENTS

JP          2002-007469 A       1/2002
JP          2005-141584 A       6/2005
(Continued)

OTHER PUBLICATIONS

International Search Report for PCT Application No. PCT/JP2020/018692, mailed on Jul. 28, 2020.
(Continued)

*Primary Examiner* — Chan S Park
*Assistant Examiner* — Promotto Tajrian Islam
(74) *Attorney, Agent, or Firm* — Sughrue Mion, PLLC

(57) ABSTRACT

A search information acquisition unit acquires a plurality of pieces of search pose information generated for each of a plurality of target images and indicate a pose of a person included in the target image. An exclusion information acquisition unit acquires exclusion pose information indicating a pose of a person included in an exclusion query image. The exclusion query image is an image to be a query of an image needed to be excluded from a search result, and includes at least a person. An exclusion score computation unit computes an exclusion score for each of the plurality of pieces of search pose information. The exclusion score indicates a degree of similarity of the search pose information to the exclusion pose information. An exclusion image selection unit selects, from the plurality of target images by using the exclusion score, an image needed to be excluded from a search result.

10 Claims, 46 Drawing Sheets

(56)  References Cited

U.S. PATENT DOCUMENTS

2012/0275705 A1* 11/2012 Duan .................... G06V 20/10
                                                            382/195
2013/0028517 A1    1/2013 Yoo et al.
2019/0147292 A1*  5/2019 Watanabe .......... G06F 16/5838
                                                            382/103
2021/0097101 A1*  4/2021 Hu ....................... G06V 40/103
2022/0284695 A1*  9/2022 Watanabe ............. G06F 16/532

FOREIGN PATENT DOCUMENTS

JP        2006-260405  A     9/2006
JP        2014-522035  A     8/2014
JP        2016-071428  A     5/2016
JP        2018-180894  A    11/2018
JP        2019-091138  A     6/2019

OTHER PUBLICATIONS

Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, p. 7291-7299.

* cited by examiner

FIG. 7
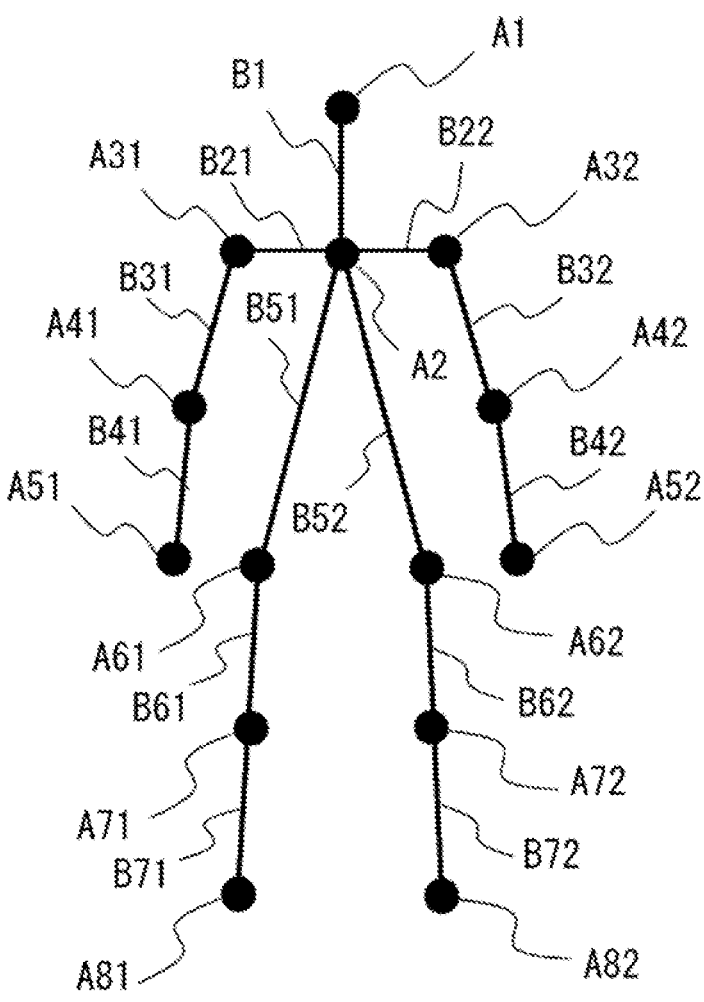

IMAGE SELECTION APPARATUS, IMAGE SELECTION METHOD, AND NON-TRANSITORY COMPUTER-READABLE MEDIUM

This application is a National Stage Entry of PCT/JP2020/018692 filed on May 8, 2020, the contents of all of which are incorporated herein by reference, in their entirety.

TECHNICAL FIELD

The present invention relates to an image selection apparatus, an image selection method, and a program.

BACKGROUND ART

In recent years, in a surveillance system and the like, a technique for detecting and searching for a state such as a pose and behavior of a person from an image of a surveillance camera is used. For example, Patent Documents 1 and 2 have been known as related techniques. Patent Document 1 discloses a technique for searching for a similar pose of a person, based on a key joint of a head, a hand, a foot, and the like of the person included in a depth video. Patent Document 2 discloses a technique for searching for a similar image by using pose information such as a tilt provided to an image, which is not related to a pose of a person. Note that, in addition, Non-Patent Document 1 has been known as a technique related to a skeleton estimation of a person.

Further, Patent Document 3 describes that an image including a pose similar to pose information is searched by inputting the pose information as search information. Further, Patent Document 4 describes that a degree of partial similarity representing a partial difference between a pose of a person in a reference image and a pose of a person in a comparison image is computed, and an image is selected from a plurality of the comparison images by using the degree of partial similarity.

Meanwhile, Patent Document 5 describes that an image satisfying a predetermined condition among a plurality of images is deleted from a storage unit. Examples of the predetermined condition include a blurry face, underexposure with respect to a face, a closed eye, a face excessively facing upward, a dark circle under an eye, no makeup, a face facing to a side, and the like. Further, Patent Document 5 describes that an image in which a person desired to be deleted is captured can be set as a deletion candidate by inputting an image in which the subject is captured. Furthermore, Patent Document 5 also describes that the deletion candidate is displayed on a display unit, and the image being the deletion candidate is then deleted from a storage unit in response to an input from a user.

RELATED DOCUMENT

Patent Document

Patent Document 1: Japanese Patent Application Publication (Translation of PCT Application) No. 2014-522035
Patent Document 2: Japanese Patent Application Publication No. 2006-260405
Patent Document 3: Japanese Patent Application Publication No. 2019-091138
Patent Document 4: Japanese Patent Application Publication No. 2018-180894

Patent Document 5: Japanese Patent Application Publication No. 2005-141584

Non-Patent Document

Non-Patent Document 1: Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, P. 7291-7299

SUMMARY OF THE INVENTION

Technical Problem

The present inventor has considered using, as a search query when an image including a specific pose is selected, an image including a person. In the consideration, the present inventor has noticed that an image including a pose other than a desired pose is included in a selection result with some frequency. Thus, an image needed to be deleted needs to be efficiently selected from selected images.

An object of the present invention is to efficiently select, from images selected in a condition that a specific pose is included, an image including a pose needed to be deleted.

Solution to Problem

The present invention provides an image selection apparatus including:
- a search information acquisition unit that acquires a plurality of pieces of search pose information that are information generated for each of a plurality of target images and indicate a pose of a person included in the target image;
- an exclusion information acquisition unit that acquires exclusion pose information indicating a pose of a person included in an exclusion query image to be a query of an image needed to be excluded from a search result;
- an exclusion score computation unit that computes, for each of the plurality of pieces of search pose information, an exclusion score indicating a degree of similarity to the exclusion pose information; and
- an exclusion image selection unit that selects, from the plurality of target images by using the exclusion score, an exclusion image being an image needed to be excluded from a search result.

The present invention provides an image selection method including,
by a computer:
- acquiring a plurality of pieces of search pose information that are pose information generated for each of a plurality of target images and indicate a pose of a person included in the target image;
- acquiring exclusion pose information indicating a pose of a person included in an exclusion query image to be a query of an image needed to be excluded from a search result;
- computing, for each of the plurality of pieces of search pose information, an exclusion score indicating a degree of similarity to the exclusion pose information; and
- selecting, from the plurality of target images by using the exclusion score, an exclusion image being an image needed to be excluded from a search result.

The present invention provides a program causing a computer to include:

a search information acquisition function of acquiring a plurality of pieces of search pose information that are pose information generated for each of a plurality of target images and indicate a pose of a person included in the target image;

an exclusion information acquisition function of acquiring exclusion pose information indicating a pose of a person included in an exclusion query image to be a query of an image needed to be excluded from a search result;

an exclusion score computation function of computing, for each of the plurality of pieces of search pose information, an exclusion score indicating a degree of similarity to the exclusion pose information; and an exclusion image selection function of selecting, from the plurality of target images by using the exclusion score, an exclusion image being an image needed to be excluded from a search result.

Advantageous Effects of Invention

According to the present invention, an image including a pose needed to be deleted can be efficiently selected from images selected in a condition that a specific pose is included.

BRIEF DESCRIPTION OF THE DRAWINGS

The above-described object, the other objects, features, and advantages will become more apparent from suitable example embodiments described below and the following accompanying drawings.

FIG. 7 is a diagram illustrating a human model according to the example embodiment 1.

FIG. 10 is a diagram illustrating a detection example of the skeleton structure according to the example embodiment 1.

FIG. 31 is a diagram illustrating a detection example of a skeleton structure according to the example embodiment 2.

FIG. 36 is a diagram for describing the normalization method according to the example embodiment 2.

FIG. 38 is a diagram for describing the normalization method according to the example embodiment 2.

FIG. 41 is a diagram for describing one example of an exclusion reference and a selection reference.

FIG. 46 is a diagram for describing a second example of an update method of a selection reference.

DESCRIPTION OF EMBODIMENTS

Hereinafter, example embodiments of the present invention will be described with reference to the drawings. Note that, in all of the drawings, a similar component has a similar reference sign, and description thereof will not be appropriately repeated.

Consideration for Example Embodiment

In recent years, an image recognition technique using machine learning such as deep learning is applied to various systems. For example, application to a surveillance system for performing surveillance by an image of a surveillance camera has been advanced. By using machine learning for the surveillance system, a state such as a pose and behavior of a person is becoming recognizable from an image to some extent.

However, in such a related technique, a state of a person desired by a user may not be necessarily recognizable on demand. For example, there is a case where a state of a person desired to be searched for and recognized by a user can be determined in advance, or there is a case where a determination cannot be specifically made as in an unknown state. Thus, in some cases, a state of a person desired to be searched for by a user cannot be specified in detail. Further, a search or the like cannot be performed when a part of a body of a person is hidden. In the related technique, a state of a person can be searched for only from a specific search condition, and thus it is difficult to flexibly search for and classify a desired state of a person.

Thus, the inventors have considered a method using a skeleton estimation technique such as Non-Patent Document 1 and the like in order to recognize a state of a person desired by a user from an image on demand. Similarly to Open Pose disclosed in Non-Patent Document 1, and the like, in the related skeleton estimation technique, a skeleton of a person is estimated by learning image data in which correct answers in various patterns are set. In the following example embodiments, a state of a person can be flexibly recognized by using such a skeleton estimation technique.

Note that, a skeleton structure estimated by the skeleton estimation technique such as Open Pose is formed of a "keypoint" being a characteristic point such as a joint and a "bone (bone link)" indicating a link between keypoints. Thus, in the following example embodiments, the words "keypoint" and "bone" will be used to describe a skeleton structure, and "keypoint" is associated with a "joint" of a person and "bone" is associated with a "bone" of a person unless otherwise specified.

Overview of Example Embodiment

Figure 1:
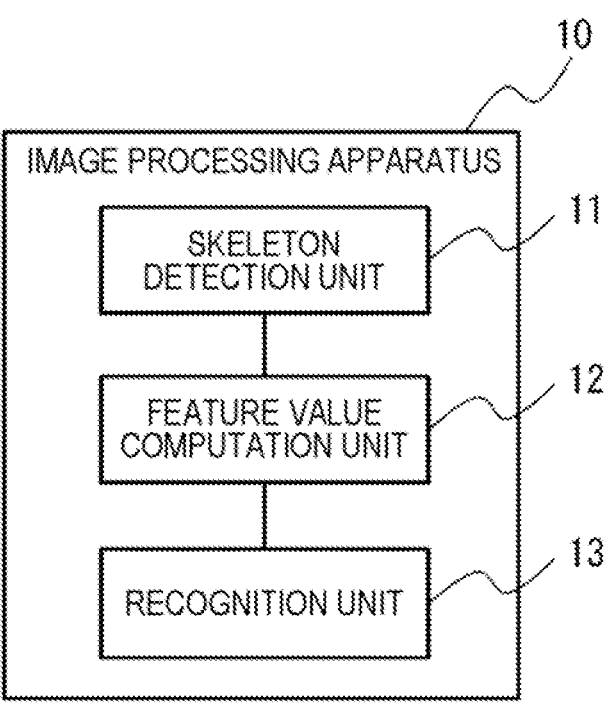
FIG. 1 is a configuration diagram illustrating an outline of an image processing apparatus according to an example embodiment.

FIG. 1 illustrates an outline of an image processing apparatus 10 according to an example embodiment. As illustrated in FIG. 1, the image processing apparatus 10 includes a skeleton detection unit 11, a feature value computation unit 12, and a recognition unit 13. The skeleton detection unit 11 detects two-dimensional skeleton structures of a plurality of persons, based on a two-dimensional image acquired from a camera and the like. The feature value computation unit 12 computes feature values of the plurality of two-dimensional skeleton structures detected by the skeleton detection unit 11. The recognition unit 13 performs recognition processing of a state of the plurality of persons, based on a degree of similarity between the plurality of feature values computed by the feature value computation unit 12. The recognition processing is classification processing, search processing (selection processing), and the like of a state of a person. Thus, the image processing apparatus 10 also functions as an image selection apparatus.

In this way, in the example embodiment, a two-dimensional skeleton structure of a person is detected from a two-dimensional image, and the recognition processing such as classification and search of a state of a person is performed based on a feature value computed from the two-dimensional skeleton structure, and thus a desired state of a person can be flexibly recognized.

Figure 2:
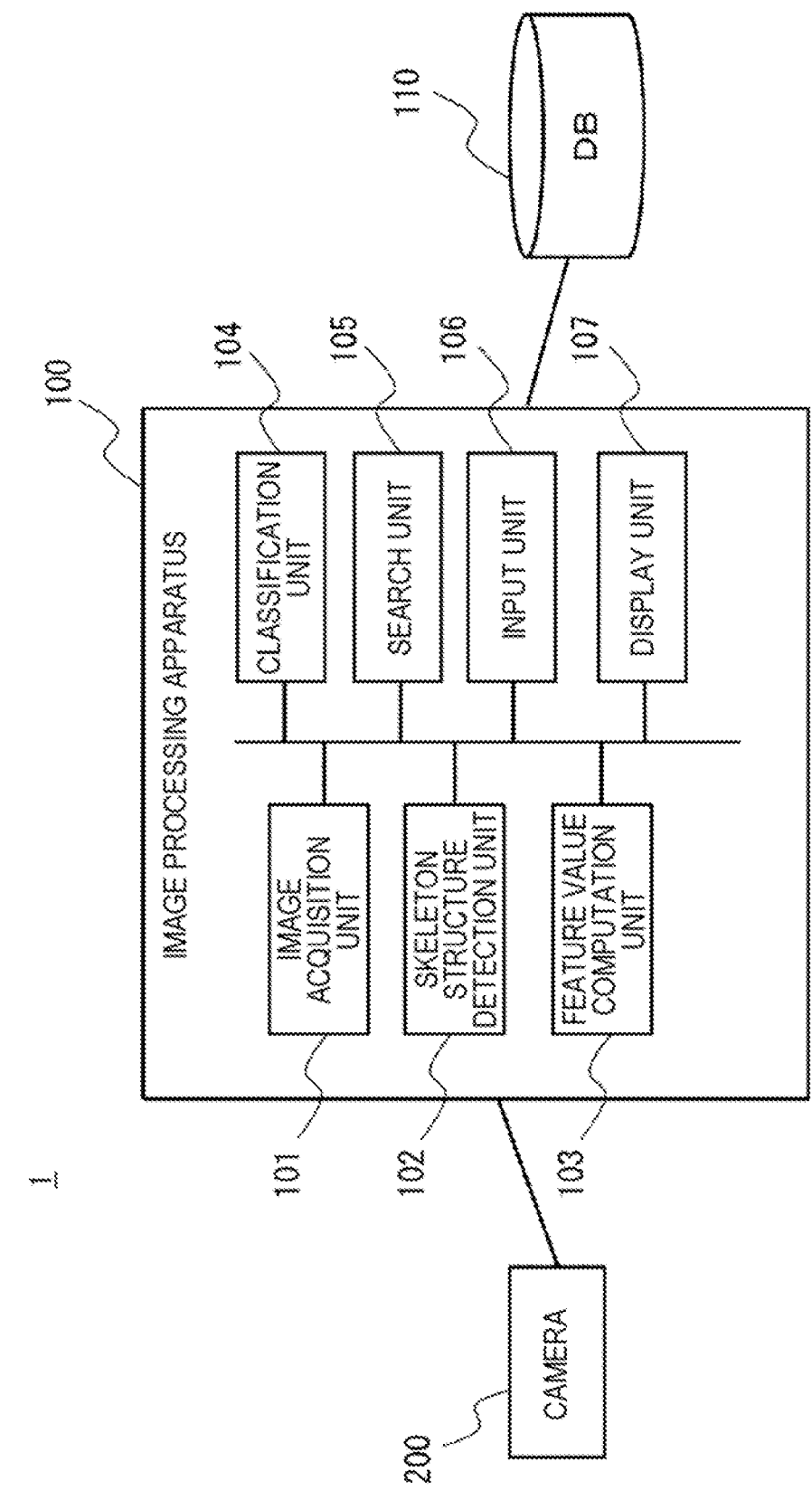
FIG. 2 is a configuration diagram illustrating a configuration of an image processing apparatus according to an example embodiment 1.

(Example Embodiment 1) An example embodiment 1 will be described below with reference to the drawings. FIG. 2 illustrates a configuration of an image processing apparatus 100 according to the present example embodiment. The image processing apparatus 100 constitutes an image processing system 1, together with a camera 200 and a database (DB) 110. The image processing system 1 including the image processing apparatus 100 is a system for classifying and searching for a state such as a pose and behavior of a person, based on a skeleton structure of the person estimated from an image. Note that, the image processing apparatus 100 also functions as an image selection apparatus.

The camera 200 is an image capturing unit, such as a surveillance camera, that generates a two-dimensional image. The camera 200 is installed at a predetermined place, and captures an image of a person and the like in the imaging area from the installed place. The camera 200 may be directly connected to the image processing apparatus 100 in such a way as to be able to output a captured image (video) to the image processing apparatus 100, or may be connected to the image processing apparatus 100 via a network and the like. Note that, the camera 200 may be provided inside the image processing apparatus 100.

The database 110 is a database that stores information (data) needed for processing of the image processing apparatus 100, a processing result, and the like. The database 110 stores an image acquired by an image acquisition unit 101, a detection result of a skeleton structure detection unit 102, data for machine learning, a feature value computed by a feature value computation unit 103, a classification result of a classification unit 104, a search result of a search unit 105, and the like. The database 110 is directly connected to the image processing apparatus 100 in such a way as to be able to input and output data as necessary, or is connected to the image processing apparatus 100 via a network and the like. Note that, the database 110 may be provided inside the image processing apparatus 100 as a non-volatile memory such as a flash memory, a hard disk apparatus, and the like.

As illustrated in FIG. 2, the image processing apparatus 100 includes the image acquisition unit 101, the skeleton structure detection unit 102, the feature value computation unit 103, the classification unit 104, the search unit 105, an input unit 106, and a display unit 107. Note that, a configuration of each unit (block) is one example, and another unit may be used for a configuration as long as a method (operation) described below can be achieved. Further, the image processing apparatus 100 is achieved by a computer apparatus, such as a personal computer and a server, that executes a program, for example, but may be achieved by one apparatus or may be achieved by a plurality of apparatuses on a network. For example, the input unit 106, the display unit 107, and the like may be an external apparatus. Further, both of the classification unit 104 and the search unit 105 may be provided, or only one of them may be provided. Both or one of the classification unit 104 and the search unit 105 is a recognition unit that performs the recognition processing of a state of a person.

The image acquisition unit 101 acquires a two-dimensional image including a person captured by the camera 200. The image acquisition unit 101 acquires an image (video including a plurality of images) including a person captured by the camera 200 in a predetermined surveillance period, for example. Note that, instead of acquisition from the camera 200, an image including a person being prepared in advance may be acquired from the database 110 and the like.

The skeleton structure detection unit 102 detects a two-dimensional skeleton structure of the person in the acquired two-dimensional image, based on the image. The skeleton structure detection unit 102 detects a skeleton structure for all persons recognized in the acquired image. The skeleton structure detection unit 102 detects a skeleton structure of a recognized person, based on a feature such as a joint of the person, by using a skeleton estimation technique using machine learning. The skeleton structure detection unit 102 uses a skeleton estimation technique such as Open Pose in Non-Patent Document 1, for example.

The feature value computation unit 103 computes a feature value of the detected two-dimensional skeleton structure, and stores, in the database 110, the computed feature value in association with the image to be processed. The feature value of the skeleton structure indicates a feature of a skeleton of the person, and is an element for classifying and searching for a state of the person, based on the skeleton of the person. This feature value normally includes a plurality of parameters (for example, a classification element described below). Then, the feature value may be a feature value of the entire skeleton structure, may be a feature value of a part of the skeleton structure, or may include a plurality of feature values as in each portion of the skeleton structure. A method for computing a feature value may be any method such as machine learning and normalization, and a minimum value and a maximum value may be acquired as normalization. As one example, the feature value is a feature value acquired by performing machine learning on the skeleton structure, a size of the skeleton structure from a head to a foot on an image, and the like. The size of the skeleton structure is a height in an up-down direction, an area, and the like of a skeleton region including the skeleton structure on an image. The up-down direction (a height direction or a vertical direction) is a direction (Y-axis direction) of up and down in an image, and is, for example, a direction perpendicular to the ground (reference surface). Further, a left-right direction (a horizontal direction) is a direction (X-axis direction) of left and right in an image, and is, for example, a direction parallel to the ground.

Note that, in order to perform classification and a search desired by a user, a feature value having robustness with respect to classification and search processing is preferably used. For example, when a user desires classification and a search that do not depend on an orientation and a body shape of a person, a feature value that is robust with respect to the orientation and the body shape of the person may be used. A feature value that does not depend on an orientation and a body shape of a person can be acquired by learning skeletons of persons facing in various directions with the same pose and skeletons of persons having various body shapes with the same pose, and extracting a feature only in the up-down direction of a skeleton.

The classification unit 104 classifies a plurality of skeleton structures stored in the database 110, based on a degree of similarity between feature values of the skeleton structures (performs clustering). It can also be said that, as the recognition processing of a state of a person, the classification unit 104 classifies states of a plurality of persons, based on feature values of the skeleton structures. The degree of similarity is a distance between the feature values of the skeleton structures. The classification unit 104 may perform classification by a degree of similarity between feature values of the entire skeleton structures, may perform classification by a degree of similarity between feature values of a part of the skeleton structures, and may perform classification by a degree of similarity between feature values of a first portion (for example, both hands) and a second portion (for example, both feet) of the skeleton structures. Note that, a pose of a person may be classified based on a feature value of a skeleton structure of the person in each image, and behavior of a person may be classified based on a change in a feature value of a skeleton structure of the person in a plurality of images successive in time series. In other words, the classification unit 104 may classify a state of a person including a pose and behavior of the person, based on a feature value of a skeleton structure. For example, the classification unit 104 sets, as subjects to be classified, a plurality of skeleton structures in a plurality of images captured in a predetermined surveillance period. The classification unit 104 acquires a degree of similarity between feature values of the subjects to be classified, and performs classification in such a way that skeleton structures having a high degree of similarity are in the same cluster (group with a similar pose). Note that, similarly to a search, a user may be able to specify a classification condition. The classification unit 104 stores a classification result of the skeleton structure in the database 110, and also displays the classification result on the display unit 107.

The search unit 105 searches for a skeleton structure having a high degree of similarity to a feature value of a search query (query state) from among the plurality of skeleton structures stored in the database 110. It can also be said that, as the recognition processing of a state of a person, the search unit 105 searches for a state of a person that corresponds to a search condition (query state) from among states of a plurality of persons, based on feature values of the skeleton structures. Similarly to classification, the degree of similarity is a distance between the feature values of the skeleton structures. The search unit 105 may perform a search by a degree of similarity between feature values of the entire skeleton structures, may perform a search by a degree of similarity between feature values of a part of the skeleton structures, and may perform a search by a degree of similarity between feature values of a first portion (for example, both hands) and a second portion (for example, both feet) of the skeleton structures. Note that, a pose of a person may be searched based on a feature value of a skeleton structure of the person in each image, and behavior of a person may be searched based on a change in a feature value of a skeleton structure of the person in a plurality of images successive in time series. In other words, the search unit 105 can search for a state of a person including a pose and behavior of the person, based on a feature value of a skeleton structure. For example, similarly to subjects to be classified, the search unit 105 sets, as subjects to be searched, feature values of a plurality of skeleton structures in a plurality of images captured in a predetermined surveillance period. Further, a skeleton structure (pose) specified by a user from among classification results displayed on the classification unit 104 is set as a search query (search key). Note that, without limitation to a classification result, a search query may be selected from among a plurality of skeleton structures that are not classified, or a user may input a skeleton structure to be a search query. The search unit 105 searches for a feature value having a high degree of similarity to a feature value of a skeleton structure being a search query from among feature values being subjects to be searched. The search unit 105 stores a search result of the feature value in the database 110, and also displays the search result on the display unit 107.

The input unit 106 is an input interface that acquires information input by a user who operates the image processing apparatus 100. For example, the user is a surveillant who watches a person in a suspicious state from an image of a surveillance camera. The input unit 106 is, for example, a graphical user interface (GUI), and receives an input of information according to an operation of the user from an input apparatus such as a keyboard, a mouse, and a touch panel. For example, the input unit 106 receives, as a search query, a skeleton structure of a person specified from among the skeleton structures (poses) classified by the classification unit 104.

The display unit 107 is a display unit that displays a result of an operation (processing) of the image processing apparatus 100, and the like, and is, for example, a display apparatus such as a liquid crystal display and an organic electro luminescence (EL) display. The display unit 107 displays, on the GUI, a classification result of the classification unit 104 and a search result of the search unit 105 according to a degree of similarity and the like.

Figure 39:
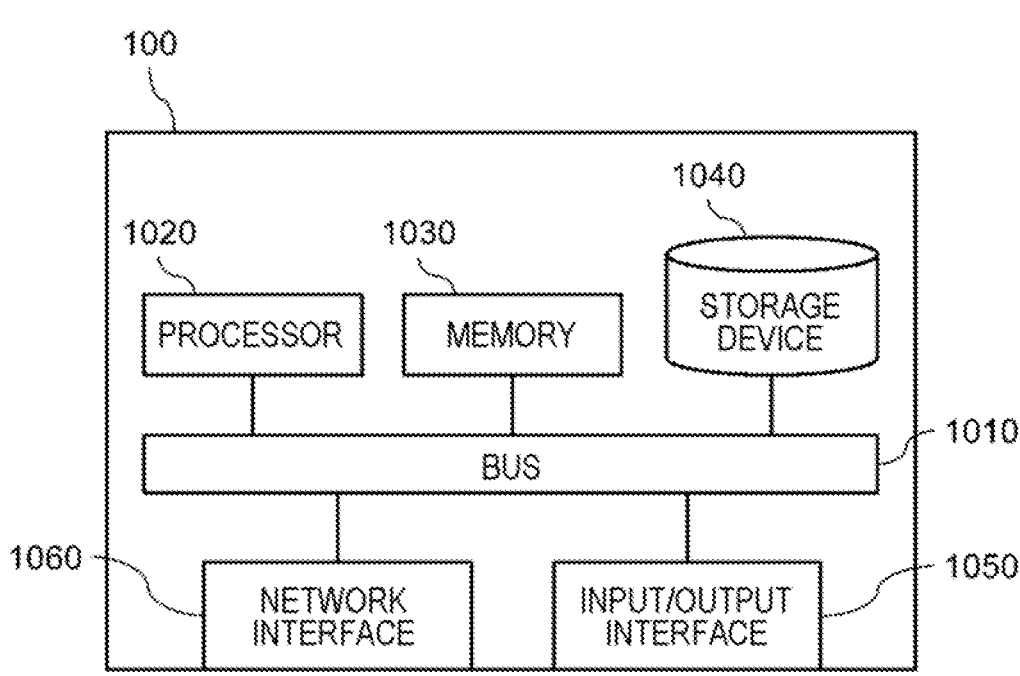
FIG. 39 is a diagram illustrating a hardware configuration example of the image processing apparatus.

FIG. 39 is a diagram illustrating a hardware configuration example of the image processing apparatus 100. The image processing apparatus 100 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method of connecting the processor 1020 and the like to each other is not limited to bus connection.

The processor 1020 is a processor achieved by a central processing unit (CPU), a graphics processing unit (GPU), and the like.

The memory 1030 is a main storage achieved by a random access memory (RAM) and the like.

The storage device 1040 is an auxiliary storage achieved by a hard disk drive (HDD), a solid state drive (SSD), a memory card, a read only memory (ROM), or the like. The storage device 1040 stores a program module that achieves each function (for example, the image acquisition unit 101, the skeleton structure detection unit 102, the feature value computation unit 103, the classification unit 104, the search unit 105, and the input unit 106) of the image processing apparatus 100. The processor 1020 reads each program module onto the memory 1030 and executes the program module, and each function associated with the program module is achieved. Further, the storage device 1040 may also function as the database 110.

The input/output interface 1050 is an interface for connecting the image processing apparatus 100 and various types of input/output equipment. When the database 110 is located outside the image processing apparatus 100, the image processing apparatus 100 may be connected to the database 110 via the input/output interface 1050.

The network interface 1060 is an interface for connecting the image processing apparatus 100 to a network. The network is, for example, a local area network (LAN) and a wide area network (WAN). A method of connection to the network by the network interface 1060 may be wireless connection or wired connection. The image processing apparatus 100 may communicate with the camera 200 via the network interface 1060. When the database 110 is located outside the image processing apparatus 100, the image processing apparatus 100 may be connected to the database 110 via the network interface 1060.

Figure 3:
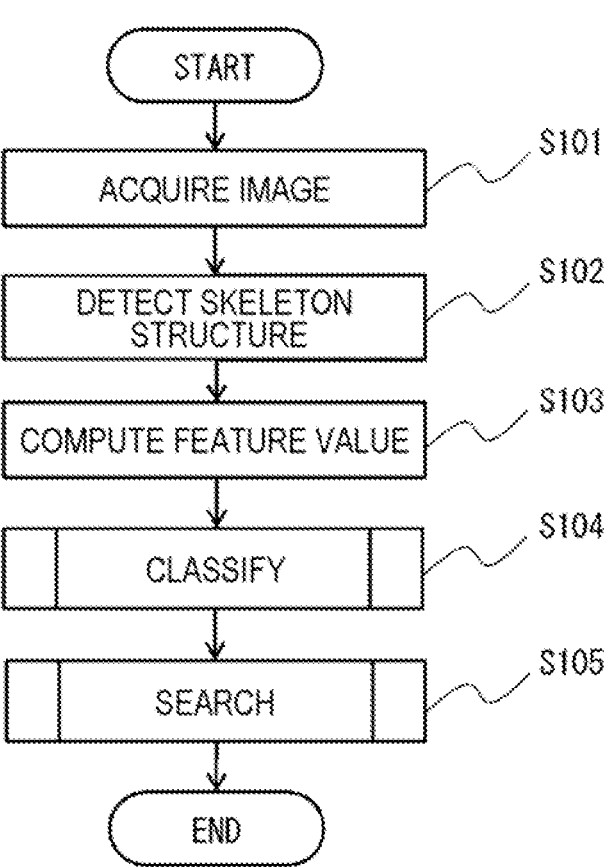
FIG. 3 is a flowchart illustrating an image processing method according to the example embodiment 1.
Figure 4:
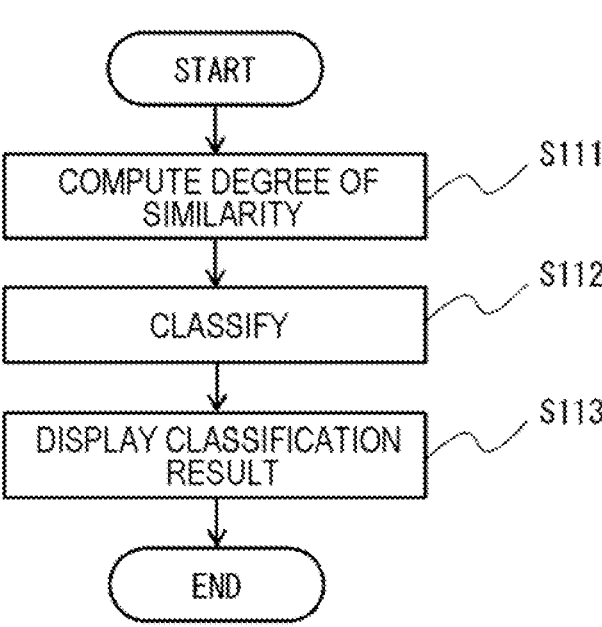
FIG. 4 is a flowchart illustrating a classification method according to the example embodiment 1.
Figure 5:
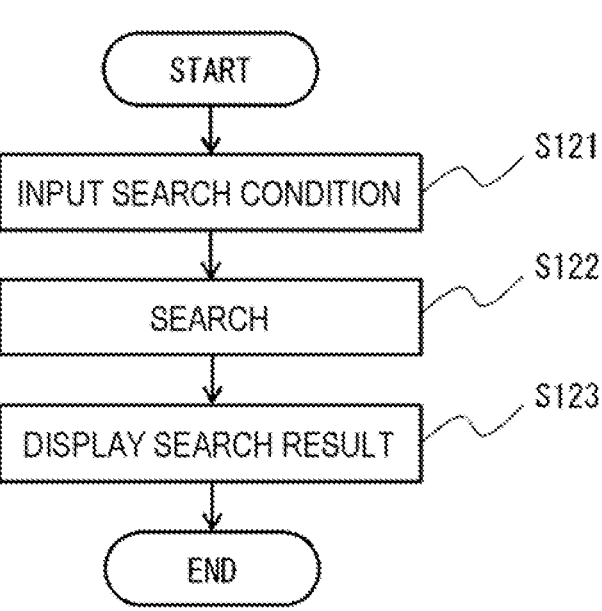
FIG. 5 is a flowchart illustrating a search method according to the example embodiment 1.

FIGS. 3 to 5 illustrate operations of the image processing apparatus 100 according to the present example embodiment. FIG. 3 illustrates a flow from image acquisition to search processing in the image processing apparatus 100, FIG. 4 illustrates a flow of classification processing (S104) in FIG. 3, and FIG. 5 illustrates a flow of the search processing (S105) in FIG. 3.

As illustrated in FIG. 3, the image processing apparatus 100 acquires an image from the camera 200 (S101). The image acquisition unit 101 acquires an image in which a person is captured for performing classification and a search based on a skeleton structure, and stores the acquired image in the database 110. For example, the image acquisition unit 101 acquires a plurality of images captured in a predetermined surveillance period, and performs the following processing on all persons included in the plurality of images.

Figure 6:
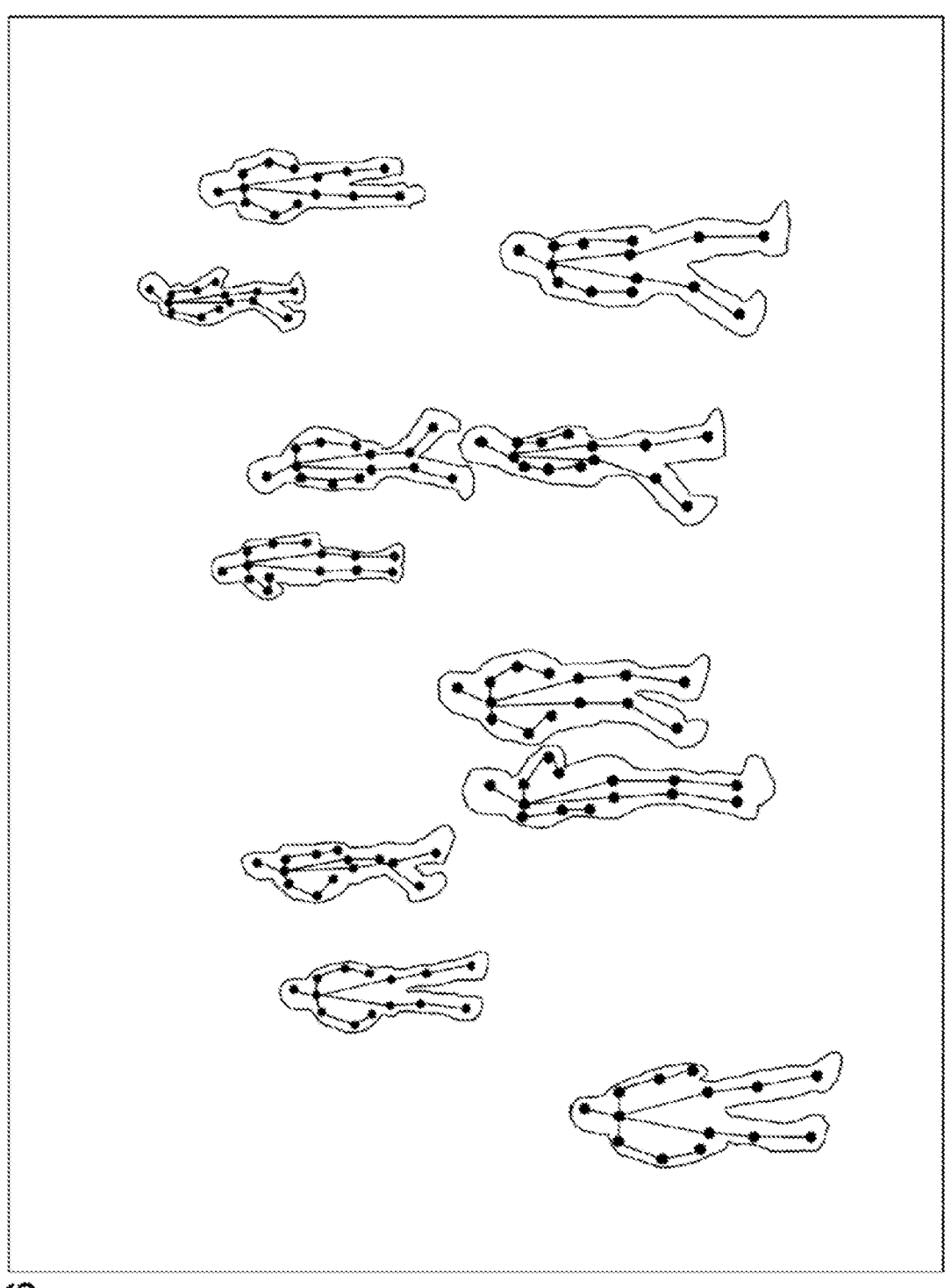
FIG. 6 is a diagram illustrating a detection example of skeleton structures according to the example embodiment 1.

Subsequently, the image processing apparatus 100 detects a skeleton structure of a person, based on the acquired image of the person (S102). FIG. 6 illustrates a detection example of skeleton structures. As illustrated in FIG. 6, a plurality of persons are included in an image acquired from a surveillance camera or the like, and a skeleton structure is detected for each of the persons included in the image.

Figure 8:
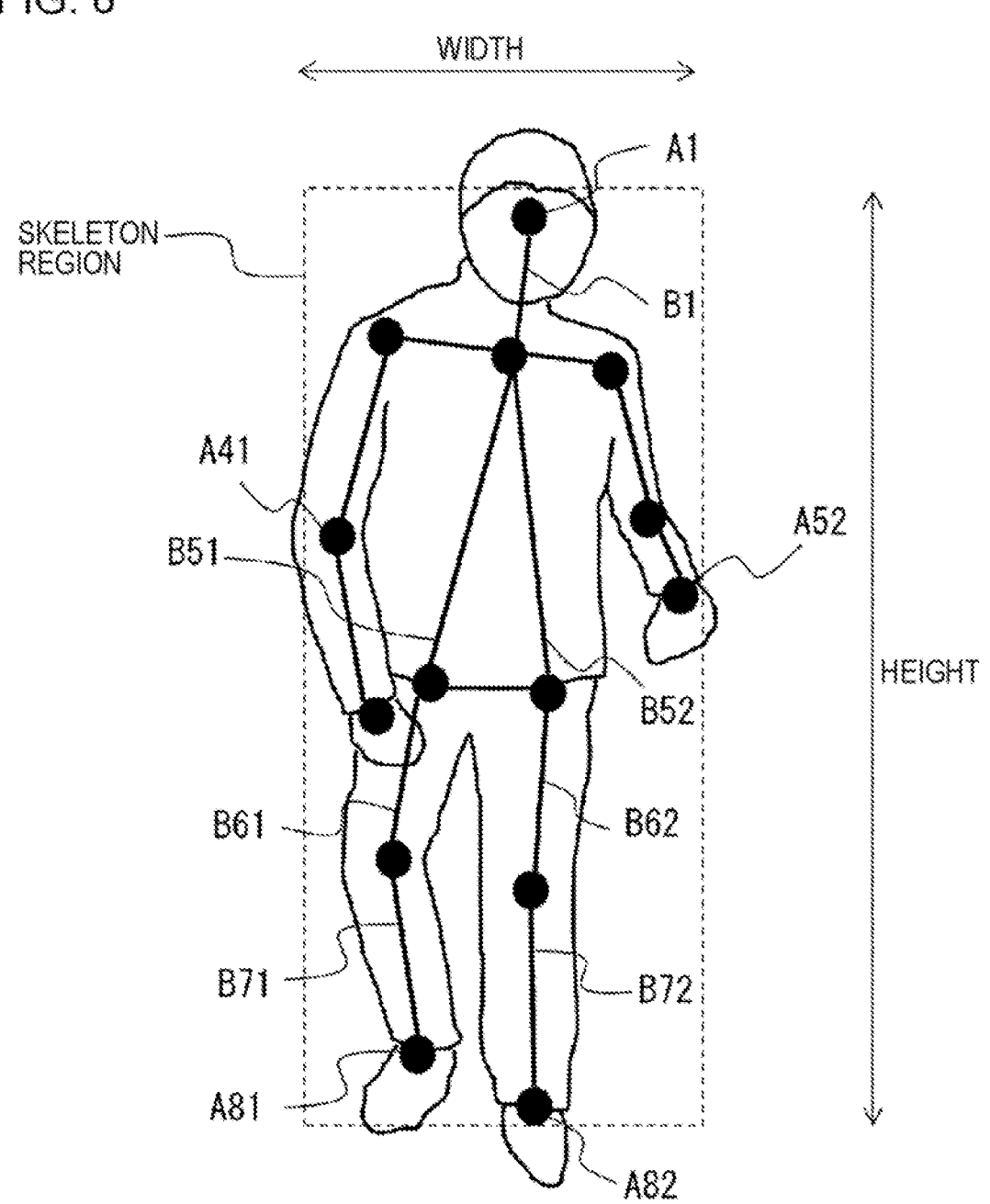
FIG. 8 is a diagram illustrating a detection example of the skeleton structure according to the example embodiment 1.
Figure 9:
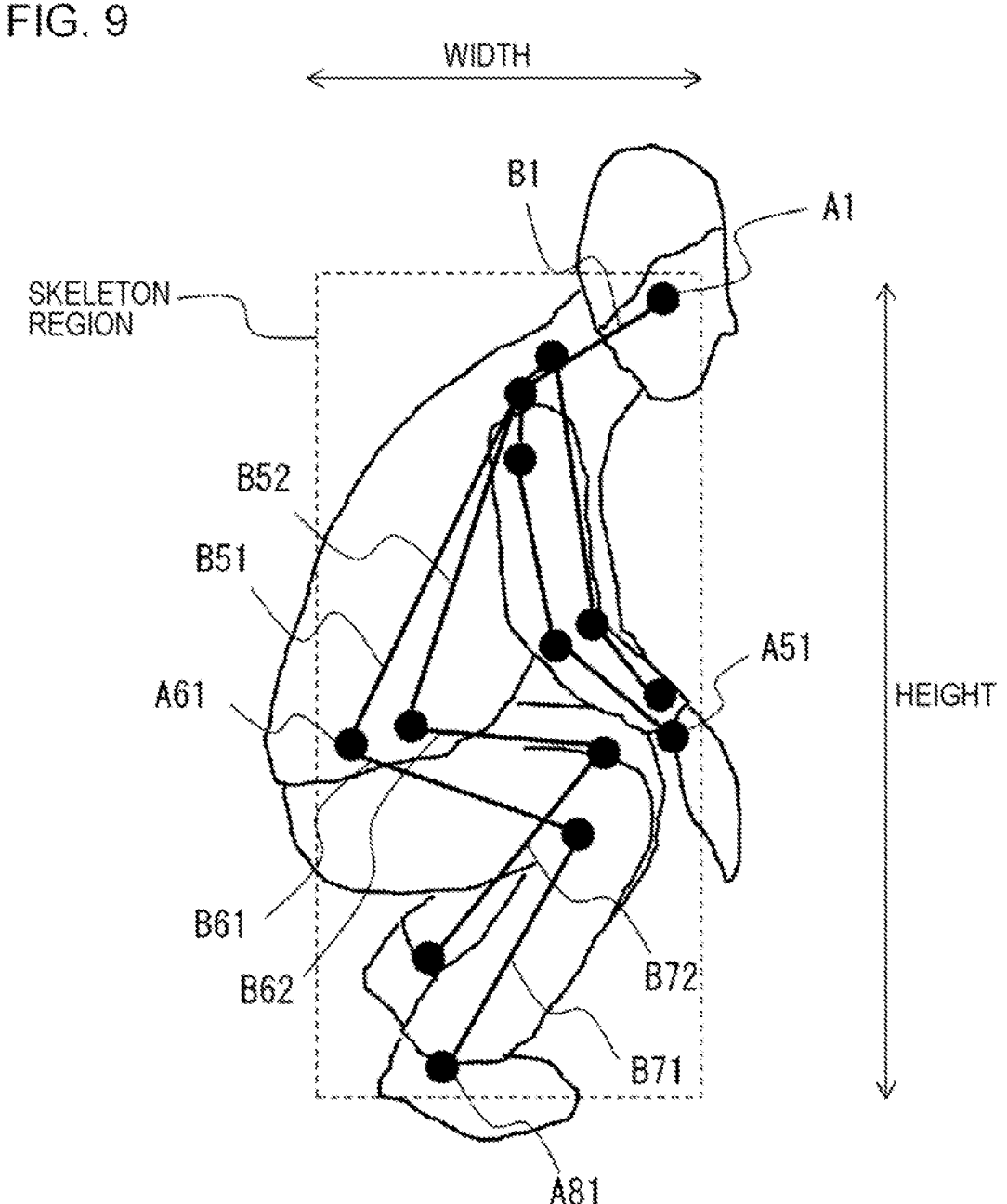
FIG. 9 is a diagram illustrating a detection example of the skeleton structure according to the example embodiment 1.
Figure 10:
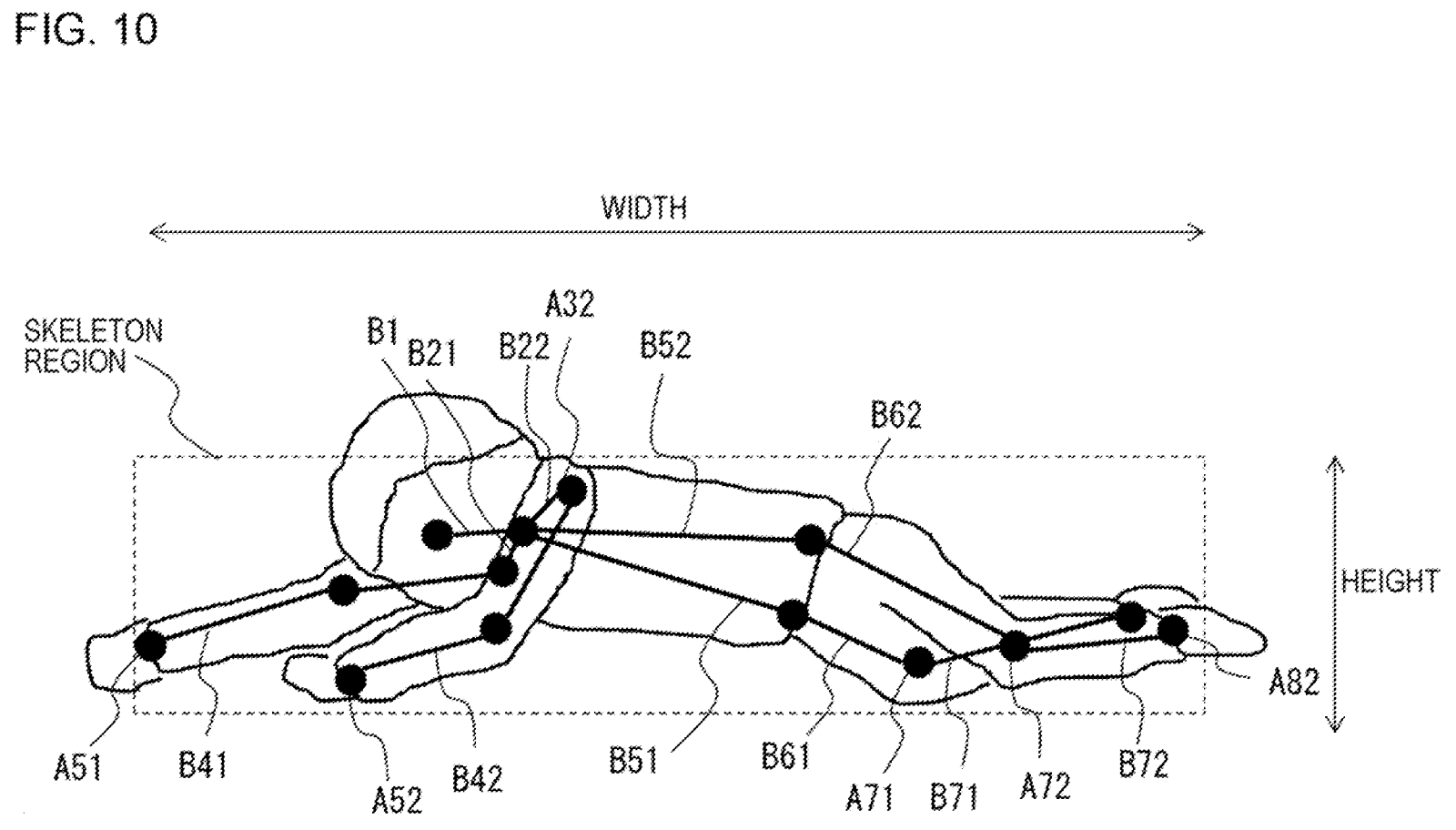

FIG. 7 illustrates a skeleton structure of a human model 300 detected at this time, and FIGS. 8 to 10 each illustrate a detection example of the skeleton structure. The skeleton structure detection unit 102 detects the skeleton structure of the human model (two-dimensional skeleton model) 300 as in FIG. 7 from a two-dimensional image by using a skeleton estimation technique such as Open Pose. The human model 300 is a two-dimensional model formed of a keypoint such as a joint of a person and a bone connecting keypoints.

For example, the skeleton structure detection unit 102 extracts a feature point that may be a keypoint from an image, refers to information acquired by performing machine learning on the image of the keypoint, and detects each keypoint of a person. In the example illustrated in FIG. 7, as a keypoint of a person, a head $A1$, a neck $A2$, a right shoulder $A31$, a left shoulder $A32$, a right elbow $A41$, a left elbow $A42$, a right hand $A51$, a left hand $A52$, a right waist $A61$, a left waist $A62$, a right knee $A71$, a left knee $A72$, a right foot $A81$, and a left foot $A82$ are detected. Furthermore, as a bone of the person connecting the keypoints, detected are a bone $B1$ connecting the head $A1$ and the neck $A2$, a bone $B21$ connecting the neck $A2$ and the right shoulder $A31$, a bone $B22$ connecting the neck $A2$ and the left shoulder $A32$, a bone $B31$ connecting the right shoulder $A31$ and the right elbow $A41$, a bone $B32$ connecting the left shoulder $A32$ and the left elbow $A42$, a bone $B41$ connecting the right elbow $A41$ and the right hand $A51$, a bone $B42$ connecting the left elbow $A42$ and the left hand $A52$, a bone $B51$ connecting the neck $A2$ and the right waist $A61$, a bone $B52$ connecting the neck $A2$ and the left waist $A62$, a bone $B61$ connecting the right waist $A61$ and the right knee $A71$, a bone B62 connecting the left waist A62 and the left knee A72, a bone B71 connecting the right knee A71 and the right foot A81, and a bone B72 connecting the left knee A72 and the left foot A82. The skeleton structure detection unit 102 stores the detected skeleton structure of the person in the database 110.

FIG. 8 is an example of detecting a person in an upright state. In FIG. 8, an image of the upright person is captured from the front, the bone B1, the bone B51 and the bone B52, the bone B61 and the bone B62, and the bone B71 and the bone B72 that are viewed from the front are each detected without overlapping, and the bone B61 and the bone B71 of a right leg are bent slightly more than the bone B62 and the bone B72 of a left leg.

FIG. 9 is an example of detecting a person in a squatting state. In FIG. 9, an image of the squatting person is captured from a right side, the bone B1, the bone B51 and the bone B52, the bone B61 and the bone B62, and the bone B71 and the bone B72 that are viewed from the right side are each detected, and the bone B61 and the bone B71 of a right leg and the bone B62 and the bone B72 of a left leg are greatly bent and also overlap.

FIG. 10 is an example of detecting a person in a sleeping state. In FIG. 10, an image of the sleeping person is captured diagonally from the front left, the bone B1, the bone B51 and the bone B52, the bone B61 and the bone B62, and the bone B71 and the bone B72 that are viewed diagonally from the front left are each detected, and the bone B61 and the bone B71 of a right leg, and the bone B62 and the bone B72 of a left leg are bent and also overlap.

Subsequently, as illustrated in FIG. 3, the image processing apparatus 100 computes a feature value of the detected skeleton structure (S103). For example, when a height and an area of a skeleton region are set a feature value, the feature value computation unit 103 extracts a region including the skeleton structure and acquires a height (pixel count) and an area (pixel area) of the region. The height and the area of the skeleton region are acquired from coordinates of an end portion of the extracted skeleton region and coordinates of a keypoint of the end portion. The feature value computation unit 103 stores the acquired feature value of the skeleton structure in the database 110. Note that, the feature value of the skeleton structure is also used as pose information indicating a pose of the person.

In the example in FIG. 8, a skeleton region including all of the bones is extracted from the skeleton structure of the upright person. In this case, an upper end of the skeleton region is the keypoint A1 of the head, a lower end of the skeleton region is the keypoint A82 of the left foot, a left end of the skeleton region is the keypoint A41 of the right elbow, and a right end of the skeleton region is the keypoint A52 of the left hand. Thus, a height of the skeleton region is acquired from a difference in Y coordinate between the keypoint A1 and the keypoint A82. Further, a width of the skeleton region is acquired from a difference in X coordinate between the keypoint A41 and the keypoint A52, and an area is acquired from the height and the width of the skeleton region.

In the example in FIG. 9, a skeleton region including all of the bones is extracted from the skeleton structure of the squatting person. In this case, an upper end of the skeleton region is the keypoint A1 of the head, a lower end of the skeleton region is the keypoint A81 of the right foot, a left end of the skeleton region is the keypoint A61 of the right waist, and a right end of the skeleton region is the keypoint A51 of the right hand. Thus, a height of the skeleton region is acquired from a difference in Y coordinate between the keypoint A1 and the keypoint A81. Further, a width of the skeleton region is acquired from a difference in X coordinate between the keypoint A61 and the keypoint A51, and an area is acquired from the height and the width of the skeleton region.

In the example in FIG. 10, a skeleton region including all of the bones is extracted from the skeleton structure of the sleeping person lying along the left-right direction of the image. In this case, an upper end of the skeleton region is the keypoint A32 of the left shoulder, a lower end of the skeleton region is the keypoint A52 of the left hand, a left end of the skeleton region is the keypoint A51 of the right hand, and a right end of the skeleton region is the keypoint A82 of the left foot. Thus, a height of the skeleton region is acquired from a difference in Y coordinate between the keypoint A32 and the keypoint A52. Further, a width of the skeleton region is acquired from a difference in X coordinate between the keypoint A51 and the keypoint A82, and an area is acquired from the height and the width of the skeleton region.

Figure 11:
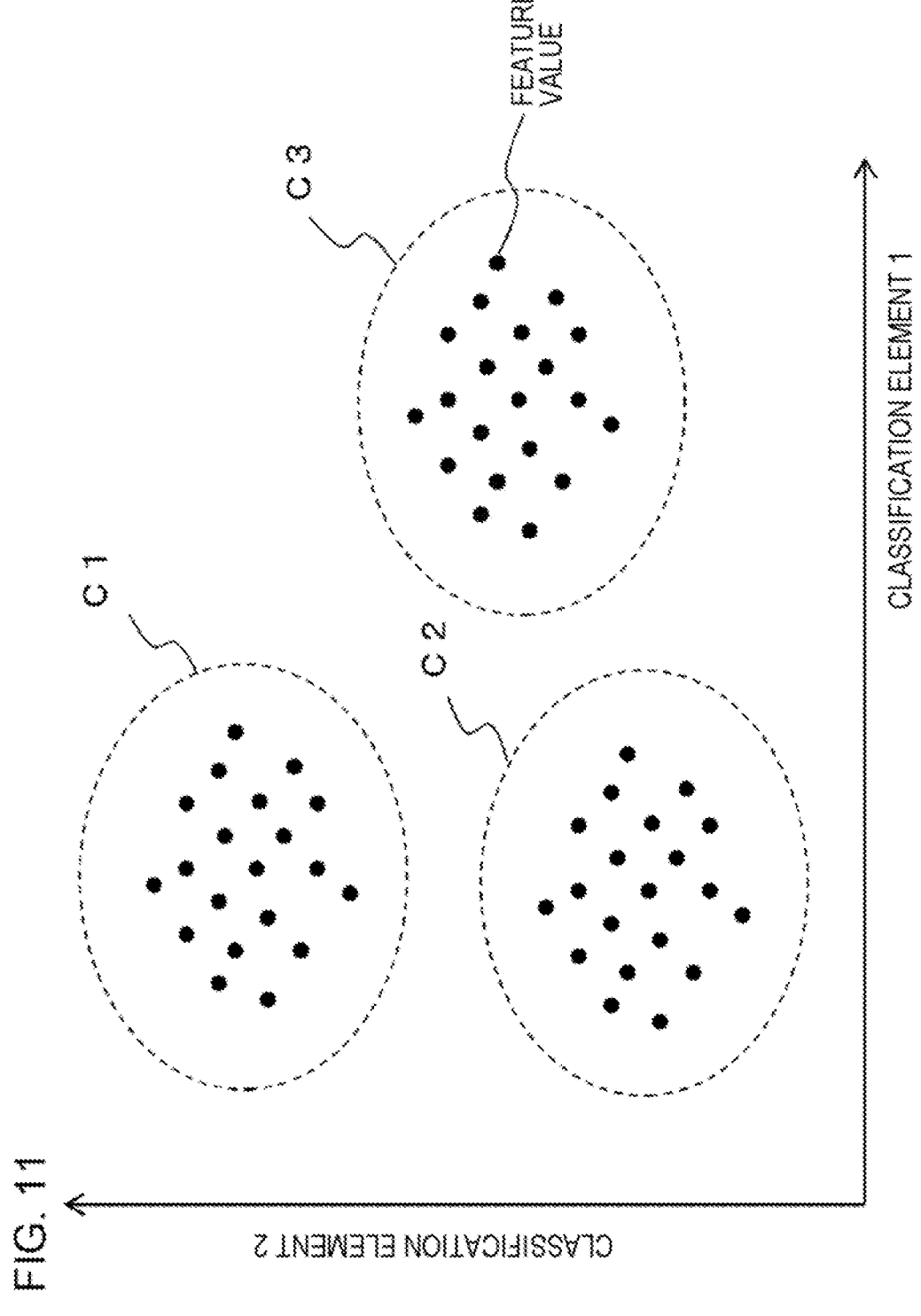
FIG. 11 is a graph illustrating a specific example of the classification method according to the example embodiment 1.

Subsequently, as illustrated in FIG. 3, the image processing apparatus 100 performs classification processing (S104). In the classification processing, as illustrated in FIG. 4, the classification unit 104 computes a degree of similarity of the computed feature value of the skeleton structure (S111), and classifies the skeleton structure based on the degree of similarity (S112). The classification unit 104 acquires a degree of similarity among all of the skeleton structures that are subjects to be classified and are stored in the database 110, and classifies skeleton structures (poses) having a highest degree of similarity in the same cluster (performs clustering). Furthermore, classification is performed by acquiring a degree of similarity between classified clusters, and classification is repeated until the number of clusters becomes a predetermined number. FIG. 11 illustrates an image of a classification result of feature values of skeleton structures. FIG. 11 is an image of a cluster analysis by two-dimensional classification elements, and two classification elements are, for example, a height of a skeleton region and an area of the skeleton region, or the like. In FIG. 11, as a result of classification, feature values of a plurality of skeleton structures are classified into three clusters C1 to C3. The clusters C1 to C3 are associated with poses such as a standing pose, a sitting pose, and a sleeping pose, respectively, for example, and skeleton structures (persons) are classified for each similar pose.

In the present example embodiment, various classification methods can be used by performing classification, based on a feature value of a skeleton structure of a person. Note that, a classification method may be preset, or any classification method may be able to be set by a user. Further, classification may be performed by the same method as a search method described below. In other words, classification may be performed by a classification condition similar to a search condition. For example, the classification unit 104 performs classification by the following classification methods. Any classification method may be used, or any selected classification methods may be combined.

(Classification Method 1) Classification by a Plurality of Hierarchical Levels

Classification is performed by combining, in a hierarchical manner, classification by a skeleton structure of a whole body, classification by a skeleton structure of an upper body and a lower body, classification by a skeleton structure of an arm and a leg, and the like. In other words, classification may be performed based on a feature value of a first portion and a second portion of a skeleton structure, and, furthermore, classification may be performed by assigning weights to the feature value of the first portion and the second portion.

(Classification Method 2) Classification by a Plurality of Images Along Time Series Classification is performed based on a feature value of a skeleton structure in a plurality of images successive in time series. For example, classification may be performed based on a cumulative value by accumulating a feature value in a time series direction. Furthermore, classification may be performed based on a change (change value) in a feature value of a skeleton structure in a plurality of successive images.

(Classification Method 3) Classification by Ignoring the Left and the Right of a Skeleton Structure Classification is performed on an assumption that skeleton structures in which a right side and a left side are reversed are the same skeleton structure.

Figure 12:
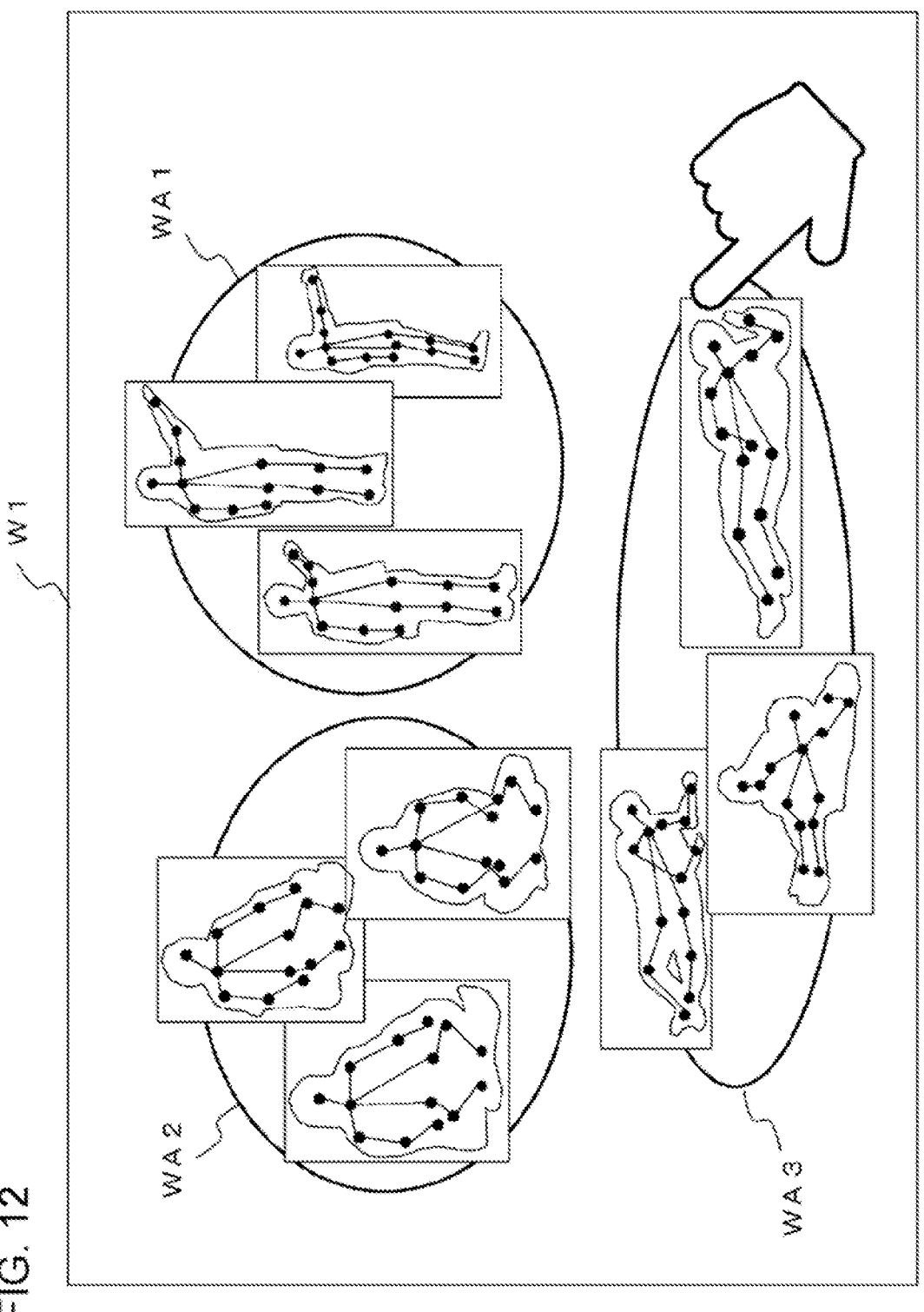
FIG. 12 is a diagram illustrating a display example of a classification result according to the example embodiment 1.

Furthermore, the classification unit 104 displays a classification result of the skeleton structure (S113). The classification unit 104 acquires a necessary image of a skeleton structure and a person from the database 110, and displays, on the display unit 107, the skeleton structure and the person for each similar pose (cluster) as a classification result. FIG. 12 illustrates a display example when poses are classified into three. For example, as illustrated in FIG. 12, pose regions WA1 to WA3 for each pose are displayed on a display window W1, and a skeleton structure and a person (image) of each associated pose are displayed in the pose regions WA1 to WA3. The pose region WA1 is, for example, a display region of a standing pose, and displays a skeleton structure and a person that are classified into the cluster C1 and are similar to the standing pose. The pose region WA2 is, for example, a display region of a sitting pose, and displays a skeleton structure and a person that are classified into the cluster C2 and are similar to the sitting pose. The pose region WA3 is, for example, a display region of a sleeping pose, and displays a skeleton structure and a person that are classified into the cluster C3 and are similar to the sleeping pose.

Subsequently, as illustrated in FIG. 3, the image processing apparatus 100 performs the search processing (S105). In the search processing, as illustrated in FIG. 5, the search unit 105 receives an input of a search condition (S121), and searches for a skeleton structure, based on the search condition (S122). The search unit 105 receives, from the input unit 106, an input of a search query being the search condition in response to an operation of a user. When the search query is input from a classification result, for example, in the display example in FIG. 12, a user specifies (selects), from among the pose regions WA1 to WA3 displayed on the display window W1, a skeleton structure of a pose desired to be searched for. Then, with the skeleton structure specified by the user as the search query, the search unit 105 searches for a skeleton structure having a high degree of similarity of a feature value from among all of the skeleton structures that are subjects to be searched and are stored in the database 110. The search unit 105 computes a degree of similarity between a feature value of the skeleton structure being the search query and a feature value of the skeleton structure being the subject to be searched, and extracts a skeleton structure having the computed degree of similarity higher than a predetermined threshold value. The feature value of the skeleton structure being the search query may use a feature value being computed in advance, or may use a feature value being acquired during a search. Note that, the search query may be input by moving each portion of a skeleton structure in response to an operation of the user, or a pose demonstrated by the user in front of a camera may be set as the search query.

In the present example embodiment, similarly to the classification methods, various search methods can be used by performing a search, based on a feature value of a skeleton structure of a person. Note that, a search method may be preset, or any search method may be able to be set by a user. For example, the search unit 105 performs a search by the following search methods. Any search method may be used, or any selected search methods may be combined. A search may be performed by combining a plurality of search methods (search conditions) by a logical expression (for example, AND (conjunction), OR (disjunction), NOT (negation)). For example, a search may be performed by setting "(pose with a right hand up) AND (pose with a left foot up)" as a search condition.

Figure 13:
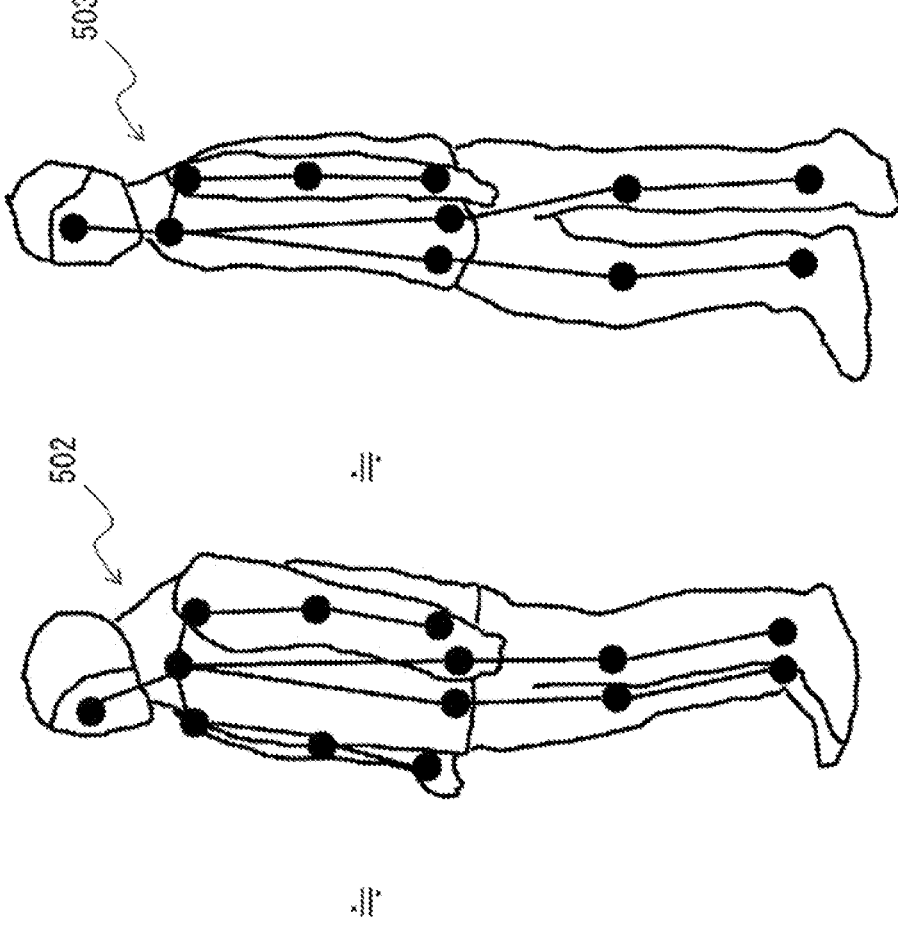
FIG. 13 is a diagram for describing the search method according to the example embodiment 1.
Figure 13:
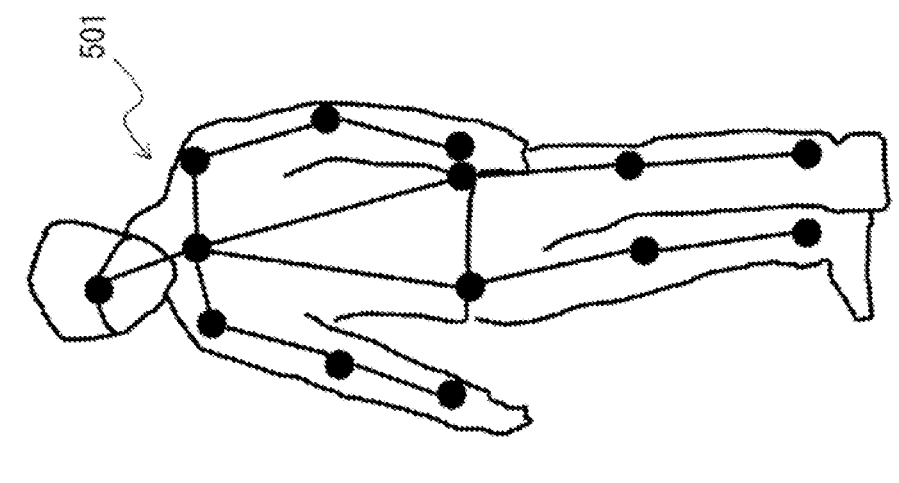

(Search Method 1) A search only by a feature value in the height direction By performing a search by using only a feature value in the height direction of a search person, an influence of a change in the horizontal direction of a person can be suppressed, and robustness improves with respect to a change in orientation of the person and body shape of the person. For example, as in skeleton structures 501 to 503 in FIG. 13, even when there is difference in an orientation or a body shape of a person, a feature value in the height direction does not greatly change. Thus, in the skeleton structures 501 to 503, it can be decided, at a time of a search (at a time of classification), that poses are the same.

Figure 14:
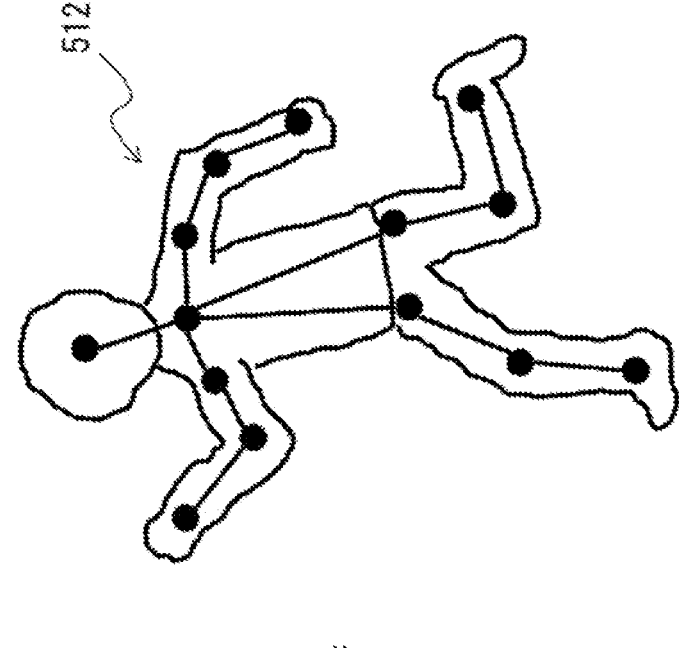
FIG. 14 is a diagram for describing the search method according to the example embodiment 1.
Figure 14:
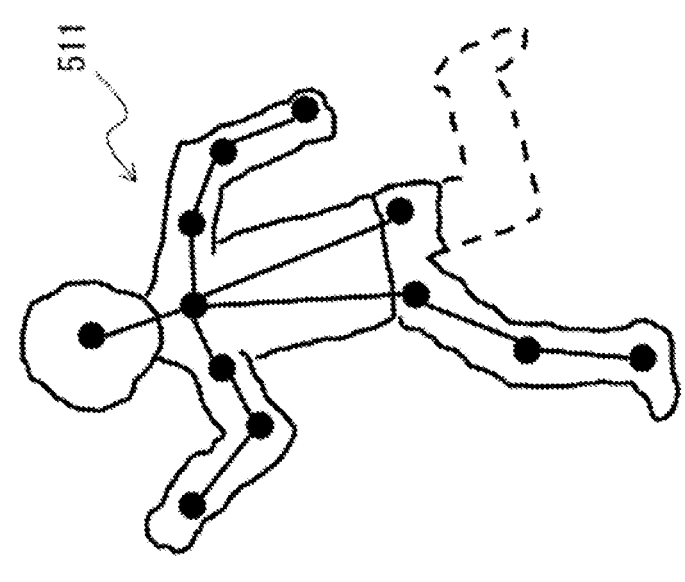
Figure 15:
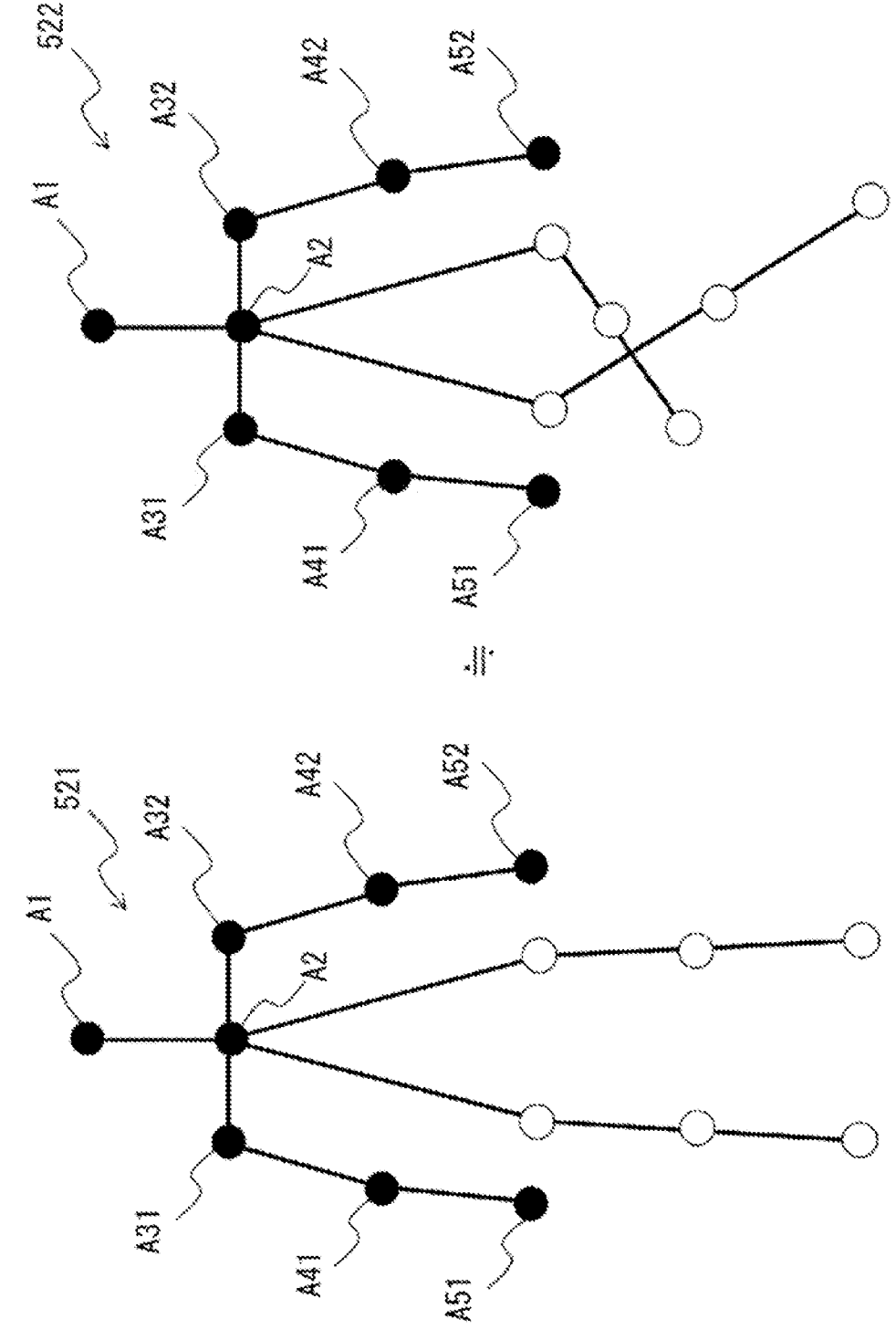
FIG. 15 is a diagram for describing the search method according to the example embodiment 1.

(Search Method 2) When a part of a body of a person is hidden in a partial search image, a search is performed by using only information about a recognizable portion. For example, as in skeleton structures 511 and 512 in FIG. 14, even when a keypoint of a left foot cannot be detected due to the left foot being hidden, a search can be performed by using a feature value of another detected keypoint. Thus, in the skeleton structures 511 and 512, it can be decided, at a time of a search (at a time of classification), that poses are the same. In other words, classification and a search can be performed by using a feature value of some of keypoints instead of all keypoints. In an example of skeleton structures 521 and 522 in FIG. 15, although orientations of both feet are different, it can be decided that poses are the same by setting a feature value of keypoints (A1, A2, A31, A32, A41, A42, A51, and A52) of an upper body as a search query. Further, a search may be performed by assigning a weight to a portion (feature point) desired to be searched, or a threshold value of a similarity degree determination may be changed. When a part of a body is hidden, a search may be performed by ignoring the hidden portion, or a search may be performed by taking the hidden portion into consideration. By performing a search also including a hidden portion, a pose in which the same portion is hidden can be searched.

Figure 16:
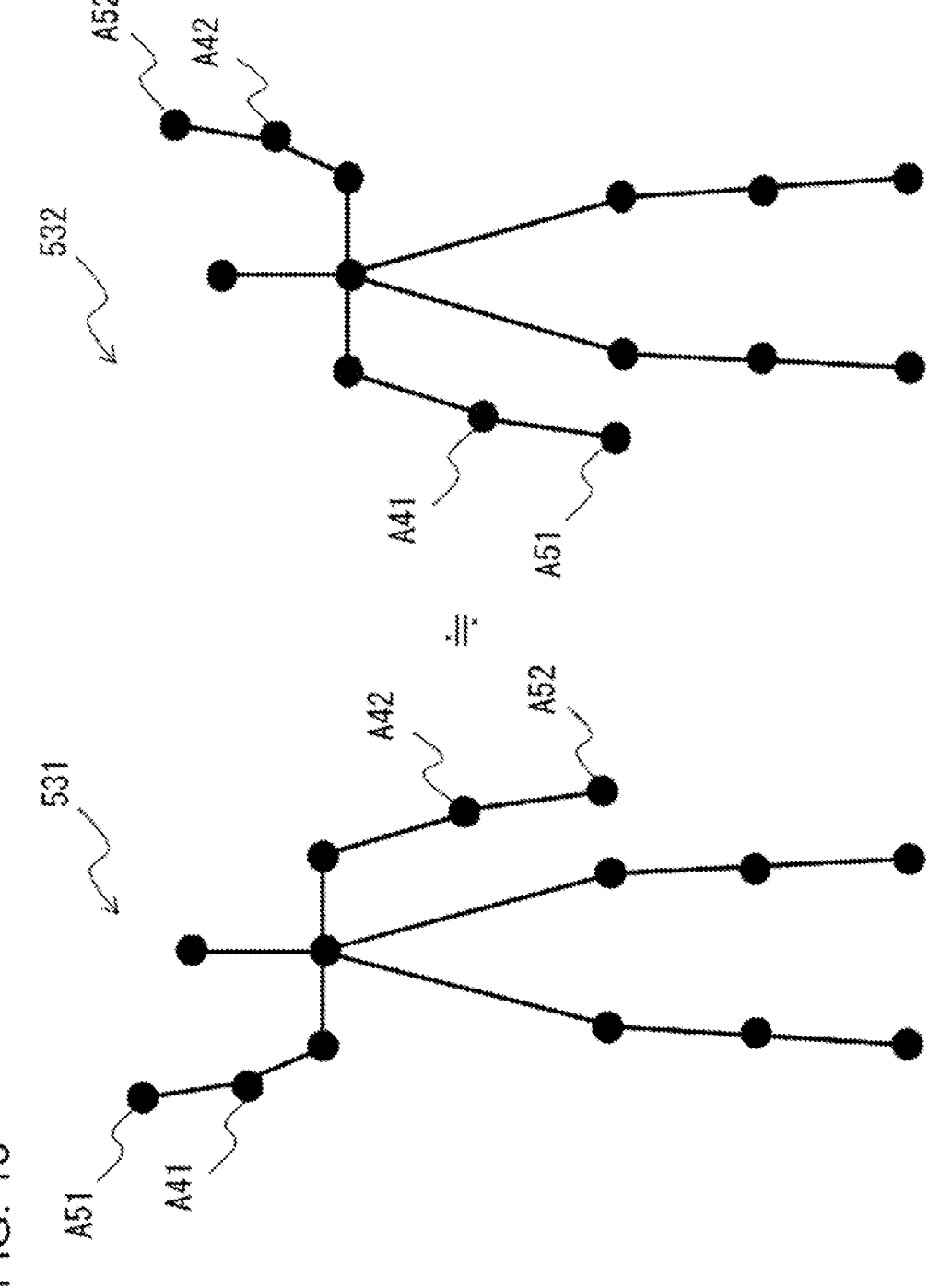
FIG. 16 is a diagram for describing the search method according to the example embodiment 1.

(Search Method 3) Search by Ignoring the Left and the Right of a Skeleton Structure A search is performed on an assumption that skeleton structures in which a right side and a left side are reversed are the same skeleton structure. For example, as in skeleton structures 531 and 532 in FIG. 16, a pose with a right hand up and a pose with a left hand up can be searched (classified) as the same pose. In the example in FIG. 16, in the skeleton structure 531 and the skeleton structure 532, although positions of the keypoint A51 of the right hand, the keypoint A41 of the right elbow, the keypoint A52 of the left hand, and the keypoint A42 of the left elbow are different, positions of the other keypoints are the same. When the keypoints of one of the skeleton structures, of the keypoint A51 of the right hand and the keypoint A41 of the right elbow of the skeleton structure 531 and the keypoint A52 of the left hand and the keypoint A42 of the left elbow of the skeleton structure 532, are reversed, the keypoints have the same positions of the keypoints of the other skeleton structure. When the keypoints of one of the skeleton structures, of the keypoint A52 of the left hand and the keypoint A42 of the left elbow of the skeleton structure 531 and the keypoint A51 of the right hand and the keypoint A41 of the right elbow of the skeleton structure 532, are reversed, the keypoints have the same positions of the keypoints of the other skeleton structure. Thus, it is decided that poses are the same.

(Search Method 4) a Search by a Feature Value in the Vertical Direction and the Horizontal Direction After a search is performed only with a feature value of a person in the vertical direction (Y-axis direction), the acquired result is further searched by using a feature value of the person in the horizontal direction (X-axis direction).

(Search Method 5) A search by a plurality of images along time series A search is performed based on a feature value of a skeleton structure in a plurality of images successive in time series. For example, a search may be performed based on a cumulative value by accumulating a feature value in a time series direction. Furthermore, a search may be performed based on a change (change value) in a feature value of a skeleton structure in a plurality of successive images.

Figure 17:
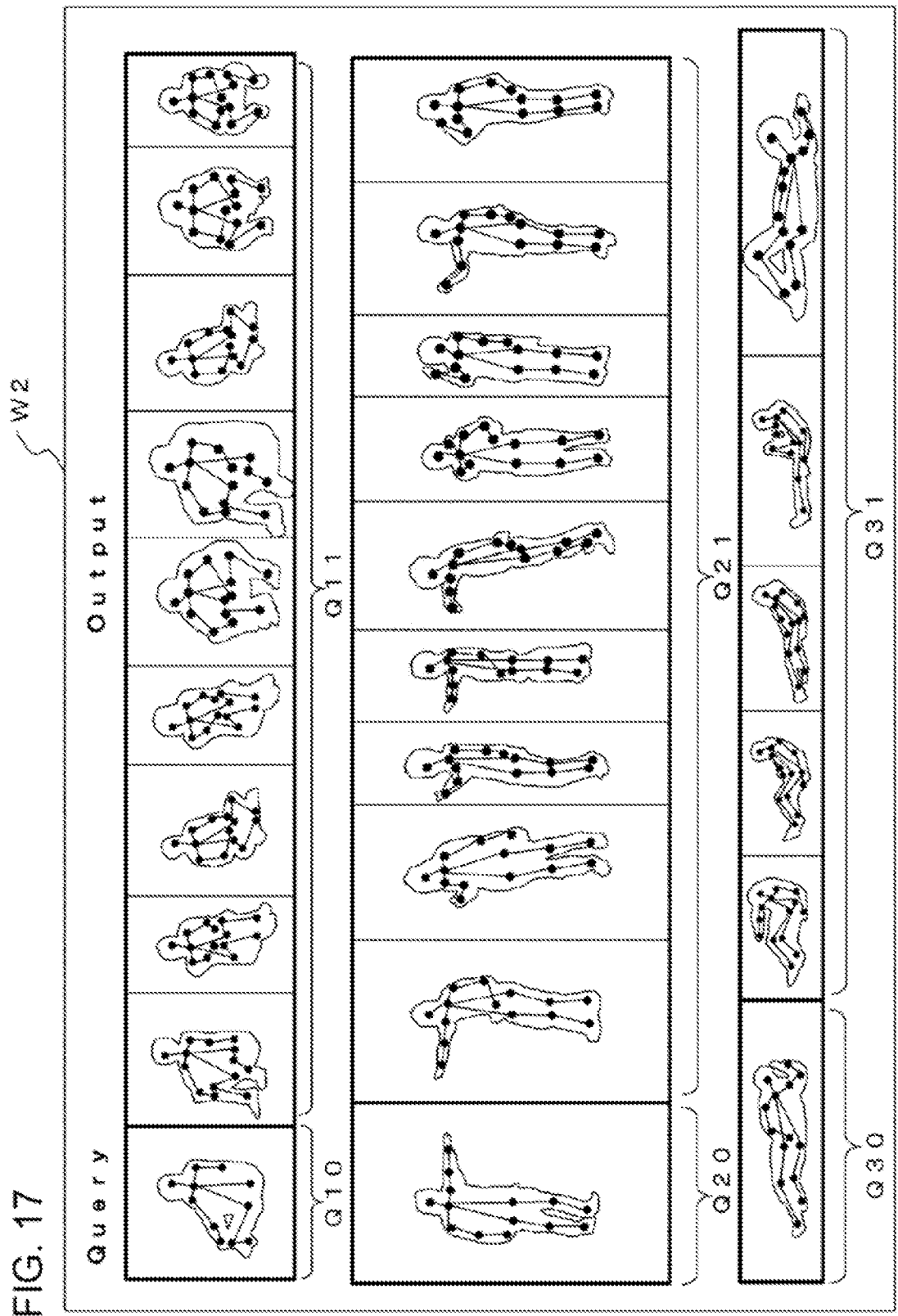
FIG. 17 is a diagram illustrating a display example of a search result according to the example embodiment 1.

Furthermore, the search unit 105 displays a search result of the skeleton structure (S123). The search unit 105 acquires a necessary image of a skeleton structure and a person from the database 110, and displays, on the display unit 107, the skeleton structure and the person acquired as a search result. For example, when a plurality of search queries (search conditions) are specified, a search result is displayed for each of the search queries. FIG. 17 illustrates a display example when a search is performed by three search queries (poses). For example, as illustrated in FIG. 17, in a display window W2, skeleton structures and persons of search queries Q10, Q20, and Q30 specified are displayed at a left end portion, and skeleton structures and persons of search results Q11, Q21, and Q31 of the search queries are displayed side by side on the right side of the search queries Q10, Q20, and Q30.

An order in which search results are displayed side by side from a search query may be an order in which a corresponding skeleton structure is found, or may be decreasing order of a degree of similarity. When a search is performed by assigning a weight to a portion (feature point) in a partial search, display may be performed in an order of a degree of similarity computed by assigning a weight. Display may be performed in an order of a degree of similarity computed only from a portion (feature point) selected by a user. Further, display may be performed by cutting, for a certain period of time, images (frames) in time series before and after an image (frame) that is a search result.

(Search Method 6) In the present search method, when there are a plurality of images (hereinafter described as target images) selected as a search result and an image of a person with a pose unintended by a user is included in the plurality of target images, the search unit 105 excludes the image (hereinafter described as an exclusion image) of the person with the unintended pose.

Figure 40:
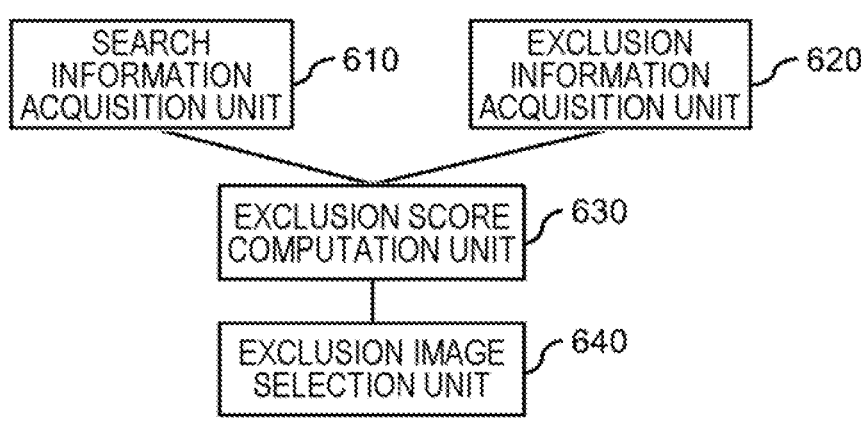
FIG. 40 is a diagram illustrating one example of a functional configuration of a search unit according to a search method 6.

FIG. 40 is a diagram illustrating one example of a functional configuration of the search unit 105 according to the present search method. In FIG. 40, the search unit 105 includes a search information acquisition unit 610, an exclusion information acquisition unit 620, an exclusion score computation unit 630, and an exclusion image selection unit 640.

The search information acquisition unit 610 acquires a plurality of pieces of information (hereinafter described as search pose information) that are generated for each of a plurality of target images and indicate a pose of a person included in the target image. In other words, the search information acquisition unit 610 acquires search pose information for each of a plurality of target images. The search pose information may be, for example, a feature value of a skeleton structure described above, but may be a skeleton structure itself such as relative positions of a plurality of keypoints.

The exclusion information acquisition unit 620 acquires information (hereinafter described as exclusion pose information) indicating a pose of a person included in an exclusion query image. The exclusion query image is an image to be a query of an image needed to be excluded from a search result, and includes at least a person.

The exclusion score computation unit 630 computes an exclusion score for each of the plurality of pieces of search pose information. The exclusion score indicates a degree of similarity of the search pose information to the exclusion pose information.

The exclusion image selection unit 640 selects, from the plurality of target images, an image needed to be excluded from a search result, i.e., an exclusion image, by using the exclusion score. A specific example of a method for selecting an exclusion image will be described later by using another diagram.

Note that, the search unit 105 may perform the processing described above on a plurality of target images being already selected, or may perform the processing described above on a plurality of target images being newly selected. In the former case, information that determines the plurality of target images is stored in the database 110, for example. In the latter case, the search unit 105 acquires an image (hereinafter described as a search query image) to be a search query, for example, and selects the plurality of target images by using a selection score indicating a degree of similarity to the search query image. Note that, the search query image includes a person with a pose needed to be included in the target image.

Further, the exclusion score is a distance in a space (hereinafter described as a feature value space) defined by a feature value (parameter) of a skeleton structure, for example. In this case, the exclusion image selection unit 640 selects, as an exclusion image, a target image having a distance from an exclusion query image within a reference in the feature value space. Note that, in the following description, a reference for selecting an exclusion image is described as an exclusion reference.

Further, one example of the selection score is a distance in the same space as that of the exclusion score. The search information acquisition unit 610 selects, as a target image, an image having a distance from a search query image within a reference in the feature value space. Herein, an image to be a search target is stored in the database 110, for example. Note that, in the following description, a reference for selecting a target image is described as a selection reference.

Figure 41:
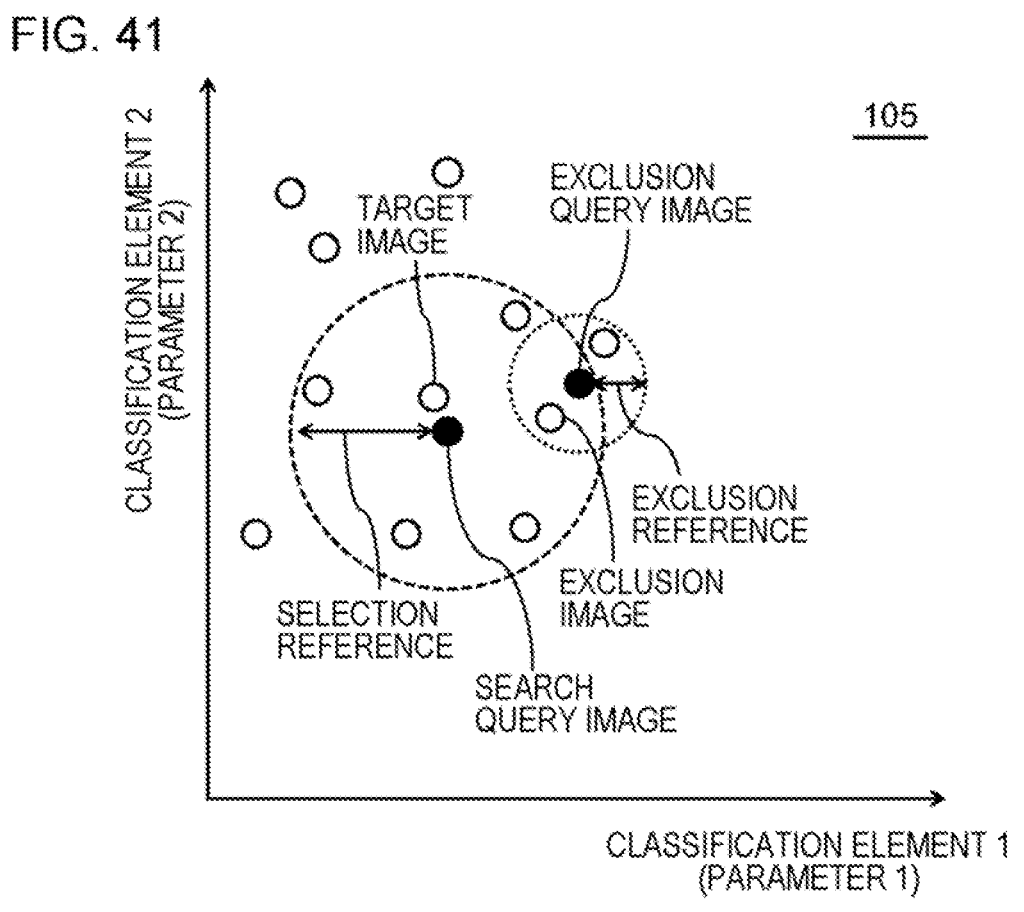

FIG. 41 is a diagram for describing one example of an exclusion reference and a selection reference. In the example illustrated in FIG. 41, an exclusion score and a selection score are defined by using the same feature value. Thus, these two scores are indicated in the same feature value space.

The search information acquisition unit 610 selects, as a target image, an image having a distance from a search query image within the selection reference (in the example illustrated in FIG. 41, an image located in a circle having a radius as the selection reference with the search query image at the center).

Further, the exclusion image selection unit 640 selects, as an exclusion image, an image having a distance from an exclusion query image within the exclusion reference (in the example illustrated in FIG. 41, an image located in a circle having a radius as the exclusion reference with the exclusion query image at the center) from target images. Note that, in the example illustrated in FIG. 41, the exclusion query image is selected from the target images.

Note that, the exclusion image selection unit 640 sets the exclusion reference according to an input from a user. However, the exclusion image selection unit 640 may set the exclusion reference by using the selection reference. As one example, when the exclusion score and the selection score are defined by using the same feature value, the exclusion reference is defined as a value less than the selection reference. In this case, the exclusion reference is defined by a function with the selection reference as a variable, for example. The exclusion reference may be a value acquired by multiplying the selection reference by a constant less than 1, or may be a value acquired by subtracting a predetermined constant from the selection reference.

Figure 42:
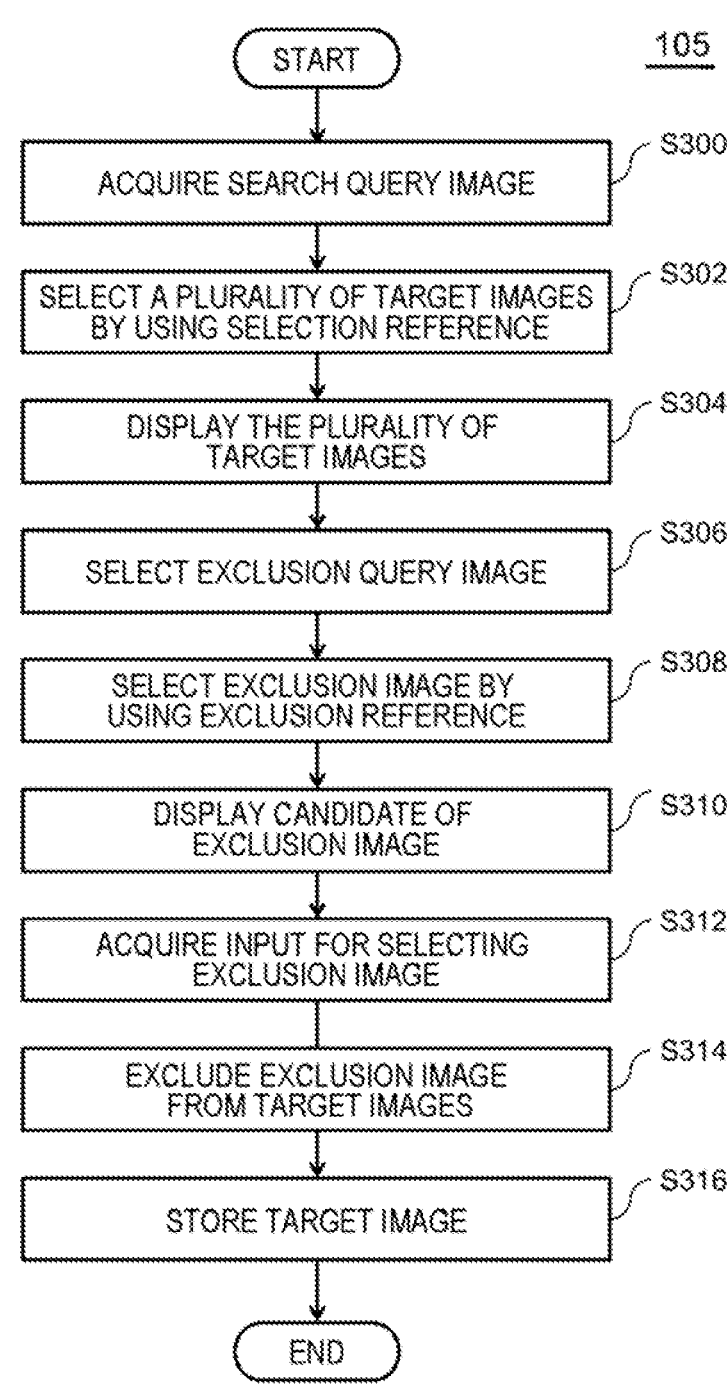
FIG. 42 is a flowchart illustrating a first example of processing performed by the search unit according to the search method 6.

FIG. 42 is a flowchart illustrating a first example of processing performed by the search unit 105 according to the present search method. First, the search information acquisition unit 610 of the search unit 105 acquires a search query image (step S300). As one example, the search information acquisition unit 610 acquires, as a search query image, an image specified by a user. The user may select a search query image from images stored in the database 110, or may cause the search unit 105 to acquire a search query image from an external apparatus or a storage medium.

Next, the search information acquisition unit 610 selects, as a target image, an image similar to the search query image from images stored in the database 110. At this time, the search information acquisition unit 610 decides whether the image is similar to the search query image by using the selection reference described above (step S302). In the processing, the search unit 105 may perform processing of selecting a target image after clustering by the classification unit 104 is performed, or may perform processing of selecting a target image in a state where clustering is not performed. In the processing, a plurality of target images are normally selected.

Next, the search information acquisition unit 610 displays the plurality of selected target images on the display unit 107 (step S304). In this way, the user of the image processing apparatus 100 can confirm whether a selection result of the target image is a desired result, for example, whether an image of an undesired pose is included in the target image.

Herein, when an image of an undesired pose is included in the plurality of target images, the user of the image processing apparatus 100 inputs an exclusion query image via the input unit 106, for example. As one example, the user of the image processing apparatus 100 selects at least one (may be more than one) image needed to be an exclusion query image from the target images displayed on the display unit 107 (step S306).

Then, the exclusion information acquisition unit 620 recognizes the image as the exclusion query image, and selects, as an exclusion image, an image similar to the exclusion query image among the plurality of target images (step S308).

Specifically, the exclusion information acquisition unit 620 acquires a feature value of a skeleton structure of a person included in the exclusion query image. When the exclusion query image is one of the images stored in the database 110, the exclusion information acquisition unit 620 reads a feature value of a skeleton structure associated with the exclusion query image from the database 110. On the other hand, when the exclusion query image is not stored in the database 110, the skeleton structure detection unit 102 and the feature value computation unit 103 process the exclusion query image and compute a feature value of a skeleton structure. Then, the exclusion information acquisition unit 620 acquires the feature value of the skeleton structure.

Then, the exclusion score computation unit 630 computes, for each of the target images, a distance from the exclusion query image in the feature value space. Then, the exclusion image selection unit 640 selects, as an exclusion image, the target image having the distance located within the exclusion reference.

Figure 43:
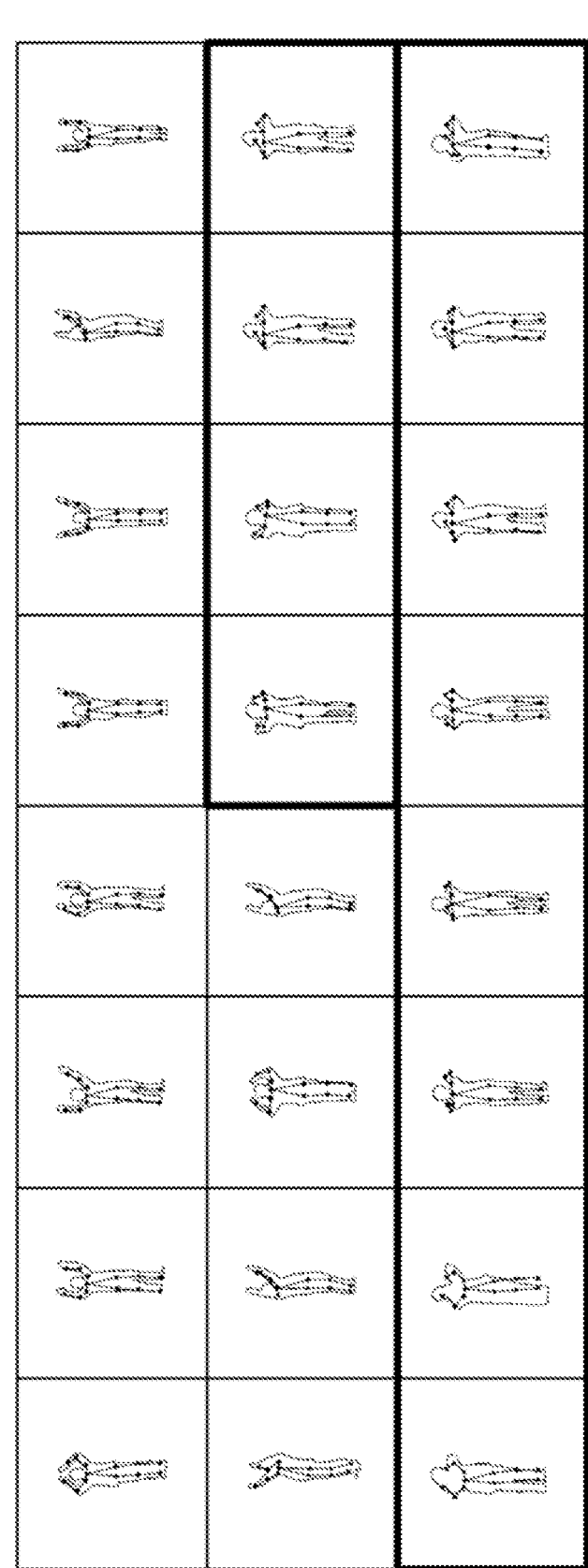
FIG. 43 is a diagram for describing step S310 in FIG. 42.

Next, the exclusion image selection unit 640 displays, on the display unit 107, information for the user to recognize the selected exclusion image (step S310). As one example, as illustrated in FIG. 43, in step S304, the search information acquisition unit 610 displays the plurality of target images on the display unit 107. The exclusion image selection unit 640 superimposes a specific mark (for example, a frame line) on images selected as the exclusion images among target images on the display unit 107. In this way, the exclusion image selection unit 640 displays the plurality of target images in a state where the exclusion images can be determined on the display unit 107.

Subsequently, when there is a predetermined input, the exclusion image selection unit 640 excludes the exclusion image from the target images. As one example, the user performs an input for selecting, from the exclusion images, an image needed to be excluded from the target images on the input unit 106. For example, the user selects, from the exclusion images displayed on the display unit 107, an image really needed to be excluded, and inputs information for determining the image to the input unit 106 (step S312). Specific examples include an input for "decide" being performed with a cursor on the image. Next, the exclusion image selection unit 640 excludes the exclusion image selected in step S312 from the target images (step S314).

Note that, in step S314, when there is a predetermined input from the user, the exclusion image selection unit 640 may exclude all of the plurality of exclusion images selected in step S308 from the target images. For example, when the plurality of exclusion images are surrounded by one frame in step S310, a predetermined input performed by the user is both of processing of selecting the frame and processing of selecting a button for performing processing of deleting the exclusion images.

Then, the exclusion image selection unit 640 stores information that determines the remaining target image in the database 110 (step S316). The exclusion image selection unit 640 may store the remaining target image itself, or may associate, with the image already stored in the database 110, a flag indicating that the image is selected as the target image. Herein, the exclusion image selection unit 640 may store, in the database 110, the remaining target image in association with the search query image.

Figure 44:
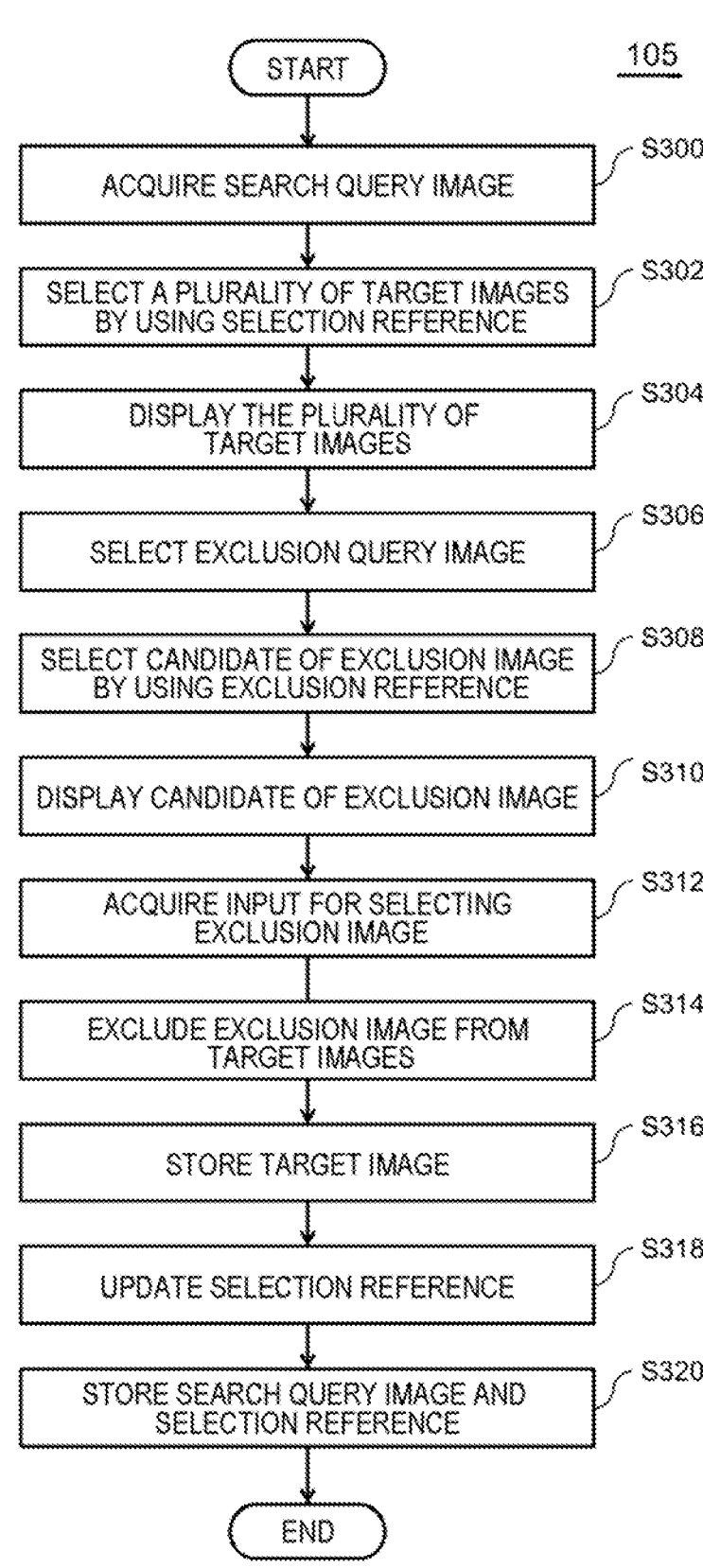
FIG. 44 is a flowchart illustrating a modification example of FIG. 42.

FIG. 44 is a flowchart illustrating a modification example of FIG. 42. In the example illustrated in FIG. 44, the search information acquisition unit 610 stores a search query image in the database 110 for a user to use the search query image again. At this time, the search information acquisition unit 610 stores a selection reference needed to be used together with the search query image in the database 110 in association with the search query image. Herein, the search information acquisition unit 610 updates the selection reference by using an input from the user related to a selection of an exclusion image.

Specifically, the processing in steps S300 to S316 is similar to the processing in FIG. 42. Next, the search information acquisition unit 610 updates the selection reference according to any of two examples below, for example (step S318).

Figure 45:
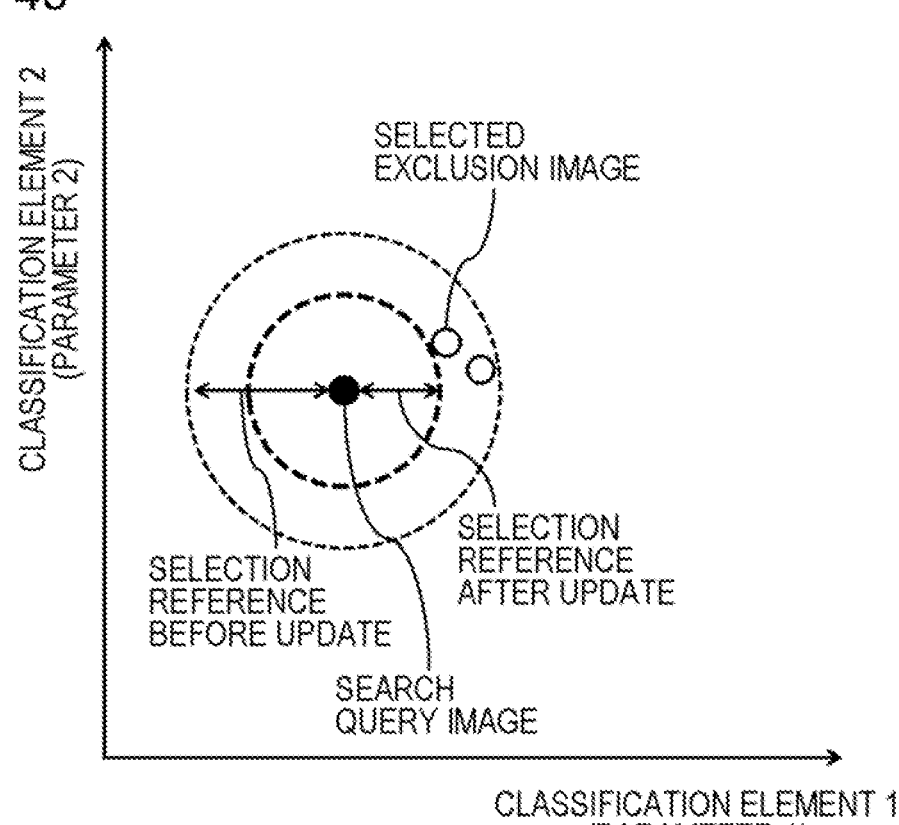
FIG. 45 is a diagram for describing a first example of an update method of a selection reference.

In a first example, in step S312, the user selects, from the exclusion images displayed on the display unit 107, an image really needed to be excluded, and inputs information for determining the image to the input unit 106. Next, in step S314, the exclusion image selection unit 640 excludes the exclusion image selected in step S312 from the target images. Then, the search information acquisition unit 610 updates the selection reference by using the exclusion image selected in step S312. Specifically, as illustrated in FIG. 45, the search information acquisition unit 610 updates a distance in the feature value space as the selection reference in such a way that the exclusion image selected in step S312 is excluded from the target images.

Figure 46:
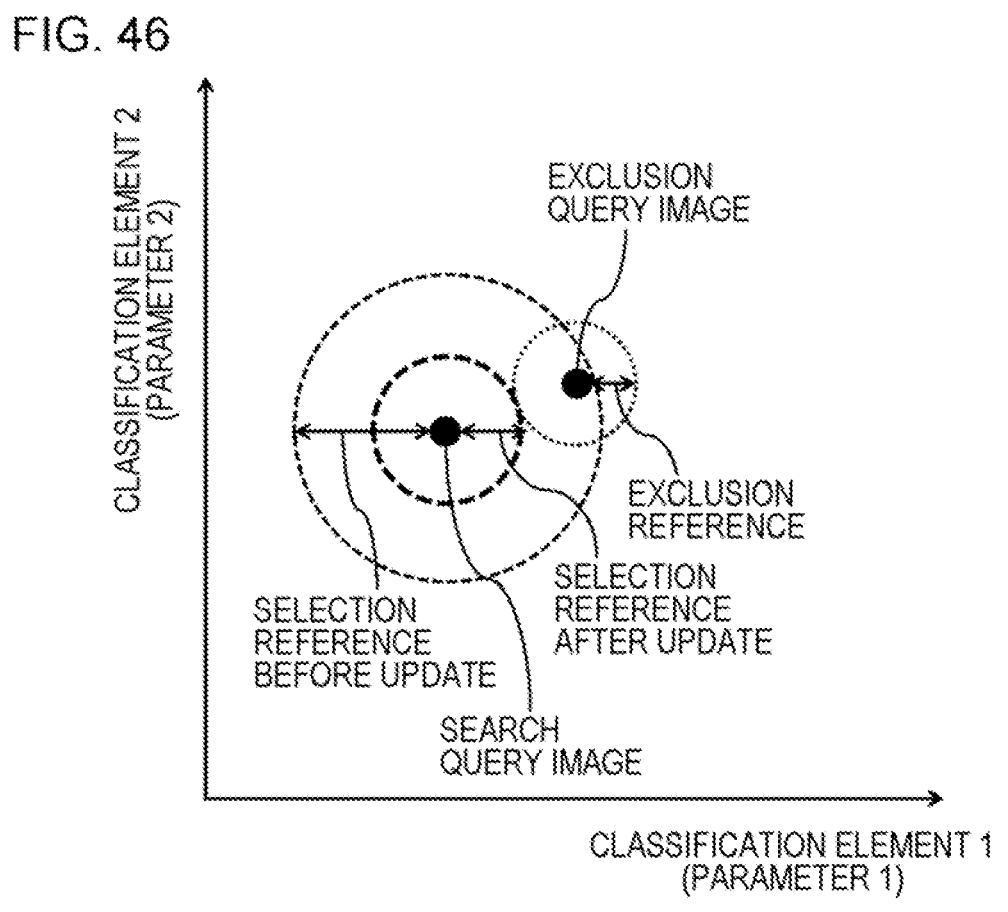

In a second example, an exclusion reference is set according to an input of the user. Then, the user causes the exclusion score computation unit 630 and the exclusion image selection unit 640 to repeatedly perform the processing indicated in step S308 and step S310 while changing the exclusion reference. In this way, the exclusion reference is adjusted to an optimum value. Then, the search information acquisition unit 610 updates the selection reference by using the exclusion reference. Specifically, as illustrated in FIG. 46, the search information acquisition unit 610 updates a distance in the feature value space as the selection reference to a "'distance from a search query image to an exclusion query image'-'a distance in the feature value space as the exclusion reference'".

Then, the search information acquisition unit 610 stores a selection reference after the update and a search query image in association with each other in the database 110. Subsequently, when the search information acquisition unit 610 searches for an image by using the search query image stored in the database 110 according to a user input, the search information acquisition unit 610 reads a selection reference associated with the search query image from the database 110 and uses the selection reference. Thus, when a target image is selected by using a search query image again, accuracy of the selection result increases.

As described above, in the present example embodiment, a skeleton structure of a person can be detected from a two-dimensional image, and classification and a search can be performed based on a feature value of the detected skeleton structure. In this way, classification can be performed for each similar pose having a high degree of similarity, and a similar pose having a high degree of similarity to a search query (search key) can be searched. By classifying similar poses from an image and displaying the similar poses, a user can recognize a pose of a person in the image without specifying a pose and the like. Since the user can specify a pose being a search query from a classification result, a desired pose can be searched for even when a pose desired to be searched for by a user is not recognized in detail in advance. For example, since classification and a search can be performed with a whole or a part of a skeleton structure of a person and the like as a condition, flexible classification and a flexible search can be performed.

Further, according to the search method 6, the search unit 105 excludes an image similar to an exclusion query image from target images selected by a search query image. Thus, search accuracy by the search unit 105 increases. A possibility that an image of a person with a pose unintended by a user is included in target images searched by the search unit 105 decreases.

(Example Embodiment 2) An example embodiment 2 will be described below with reference to the drawings. In the present example embodiment, a specific example of the feature value computation in the example embodiment 1 will be described. In the present example embodiment, a feature value is acquired by normalization by using a height of a person. The other points are similar to those in the example embodiment 1.

Figure 18:
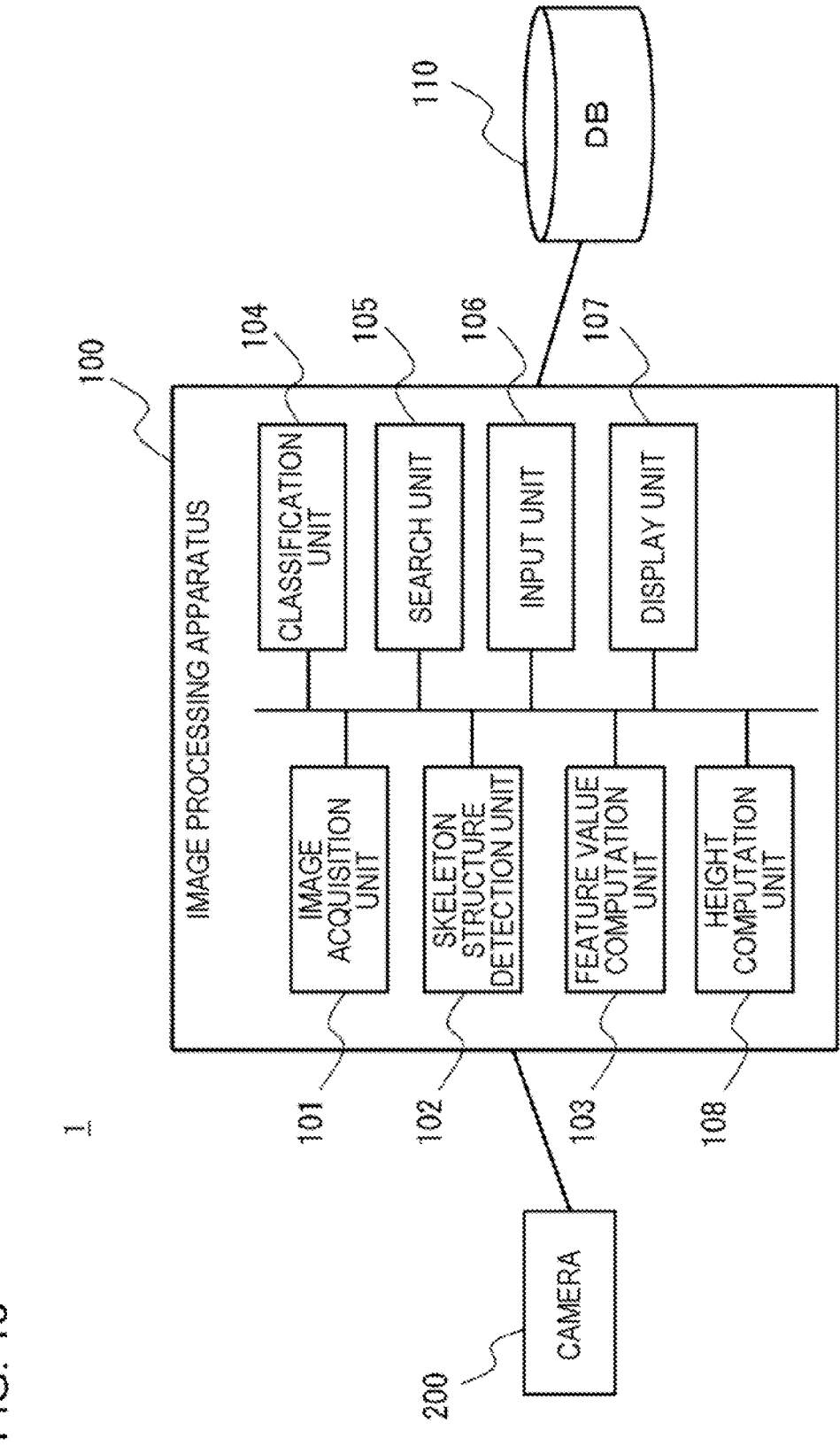
FIG. 18 is a configuration diagram illustrating a configuration of an image processing apparatus according to an example embodiment 2.

FIG. 18 illustrates a configuration of an image processing apparatus 100 according to the present example embodiment. As illustrated in FIG. 18, the image processing apparatus 100 further includes a height computation unit 108 in addition to the configuration in the example embodiment 1. Note that, a feature value computation unit 103 and the height computation unit 108 may serve as one processing unit.

The height computation unit (height estimation unit) 108 computes (estimates) an upright height (referred to as a height pixel count) of a person in a two-dimensional image, based on a two-dimensional skeleton structure detected by a skeleton structure detection unit 102. It can be said that the height pixel count is a height of a person in a two-dimensional image (a length of a whole body of a person on a two-dimensional image space). The height computation unit 108 acquires a height pixel count (pixel count) from a length (length on the two-dimensional image space) of each bone of a detected skeleton structure.

In the following examples, specific examples 1 to 3 are used as a method for acquiring a height pixel count. Note that, any method of the specific examples 1 to 3 may be used, or a plurality of any selected methods may be combined and used. In the specific example 1, a height pixel count is acquired by adding up lengths of bones from a head to a foot among bones of a skeleton structure. When the skeleton structure detection unit 102 (skeleton estimation technique) does not output a top of a head and a foot, a correction can be performed by multiplication by a constant as necessary. In the specific example 2, a height pixel count is computed by using a human model indicating a relationship between a length of each bone and a length of a whole body (a height on the two-dimensional image space). In the specific example 3, a height pixel count is computed by fitting (applying) a three-dimensional human model to a two-dimensional skeleton structure.

The feature value computation unit 103 according to the present example embodiment is a normalization unit that normalizes a skeleton structure (skeleton information) of a person, based on a computed height pixel count of the person. The feature value computation unit 103 stores a feature value (normalization value) of the normalized skeleton structure in a database 110. The feature value computation unit 103 normalizes, by the height pixel count, a height on an image of each keypoint (feature point) included in the skeleton structure. In the present example embodiment, for example, a height direction is an up-down direction (Y-axis direction) in a two-dimensional coordinate (X-Y coordinate) space of an image. In this case, a height of a keypoint can be acquired from a value (pixel count) of a Y coordinate of the keypoint. Alternatively, a height direction may be a direction (vertical projection direction) of a vertical projection axis in which a direction of a vertical axis perpendicular to the ground (reference surface) in a three-dimensional coordinate space in a real world is projected in the two-dimensional coordinate space. In this case, a height of a keypoint can be acquired from a value (pixel count) along a vertical projection axis, the vertical projection axis being acquired by projecting an axis perpendicular to the ground in the real world to the two-dimensional coordinate space, based on a camera parameter. Note that, the camera parameter is a capturing parameter of an image, and, for example, the camera parameter is a pose, a position, a capturing angle, a focal distance, and the like of a camera 200. The camera 200 captures an image of an object whose length and position are clear in advance, and a camera parameter can be acquired from the image. A strain may occur at both ends of the captured image, and the vertical direction in the real world and the up-down direction in the image may not match. In contrast, an extent that the vertical direction in the real world is tilted in an image is clear by using a parameter of a camera that captures the image. Thus, a feature value of a keypoint can be acquired in consideration of a difference between the real world and the image by normalizing, by a height, a value of the keypoint along a vertical projection axis projected in the image, based on camera parameter. Note that, a left-right direction (a horizontal direction) is a direction (X-axis direction) of left and right in a two-dimensional coordinate (X-Y coordinate) space of an image, or is a direction in which a direction parallel to the ground in the three-dimensional coordinate space in the real world is projected to the two-dimensional coordinate space.

Figure 19:
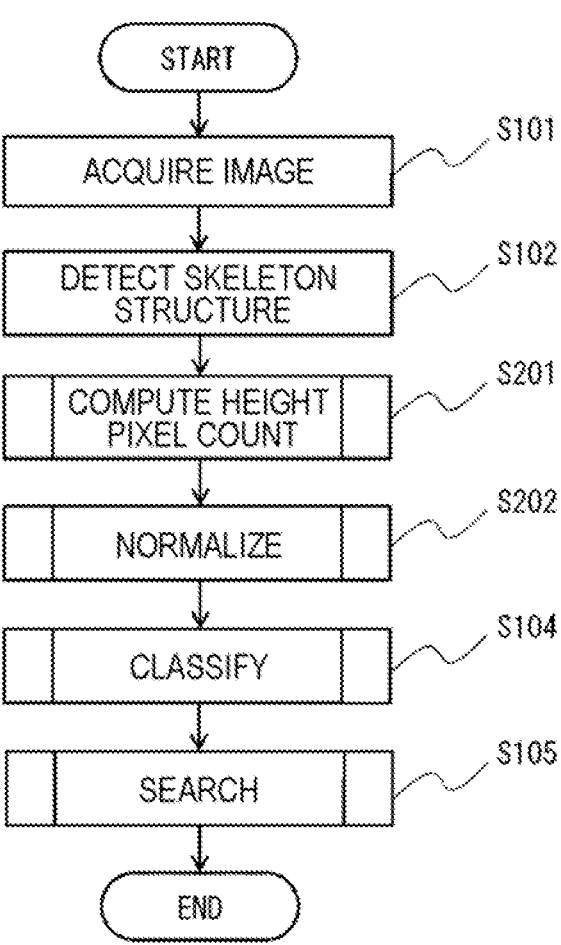
FIG. 19 is a flowchart illustrating an image processing method according to the example embodiment 2.
Figure 20:
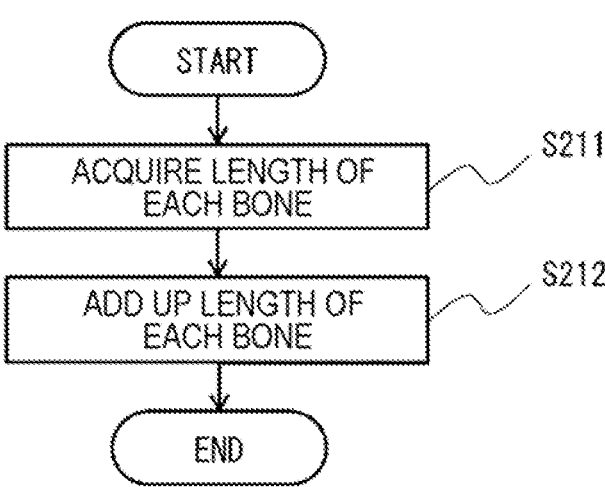
FIG. 20 is a flowchart illustrating a specific example 1 of a height pixel count computation method according to the example embodiment 2.
Figure 21:
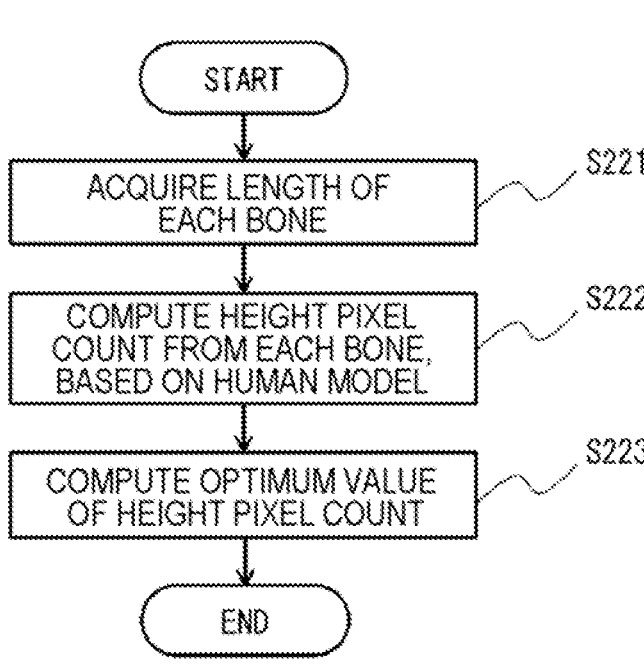
FIG. 21 is a flowchart illustrating a specific example 2 of the height pixel count computation method according to the example embodiment 2.
Figure 22:
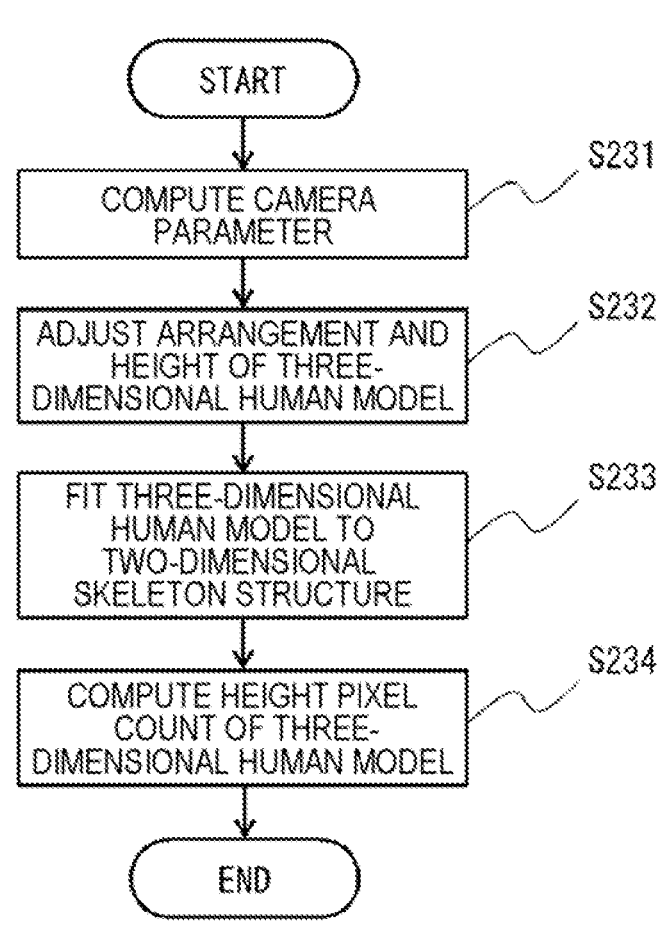
FIG. 22 is a flowchart illustrating the specific-example 2 example 3 of the height pixel count computation method according to the example embodiment 2.
Figure 23:
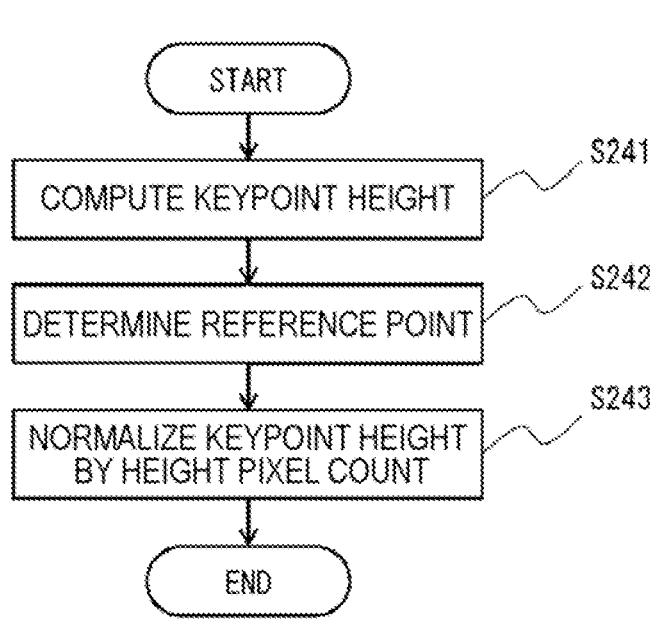
FIG. 23 is a flowchart illustrating a normalization method according to the example embodiment 2.

FIGS. 19 to 23 illustrate operations of the image processing apparatus 100 according to the present example embodiment. FIG. 19 illustrates a flow from image acquisition to search processing in the image processing apparatus 100, FIGS. 20 to 22 illustrate flows of specific examples 1 to 3 of height pixel count computation processing (S201) in FIG. 19, and FIG. 23 illustrates a flow of normalization processing (S202) in FIG. 19.

As illustrated in FIG. 19, in the present example embodiment, the height pixel count computation processing (S201) and the normalization processing (S202) are performed as the feature value computation processing (S103) in the example embodiment 1. The other points are similar to those in the example embodiment 1.

Figure 24:
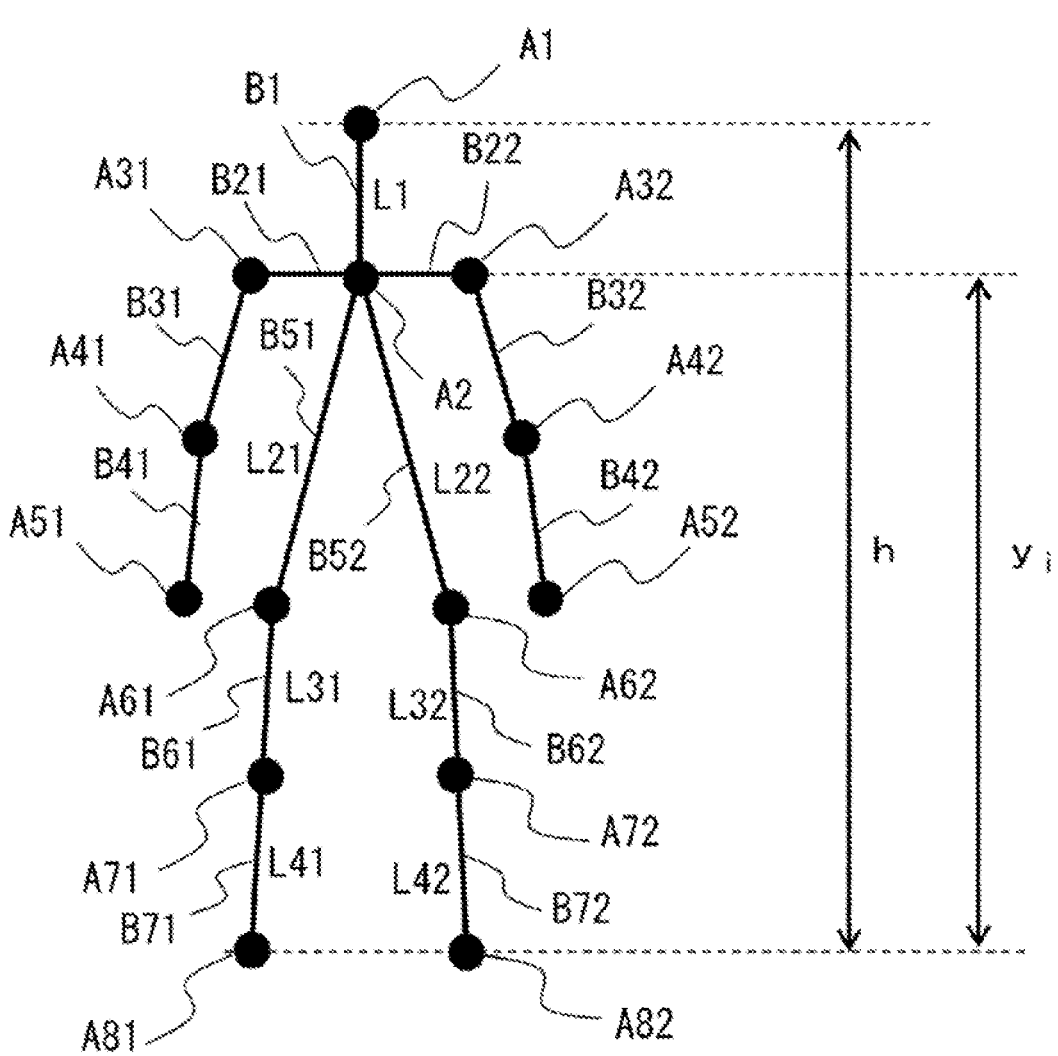
FIG. 24 is a diagram illustrating a human model according to the example embodiment 2.

The image processing apparatus 100 performs the height pixel count computation processing (S201), based on a detected skeleton structure, after the image acquisition (S101) and skeleton structure detection (S102). In this example, as illustrated in FIG. 24, a height of a skeleton structure of an upright person in an image is a height pixel count (h), and a height of each keypoint of the skeleton structure in the state of the person in the image is a keypoint height (yi). Hereinafter, the specific examples 1 to 3 of the height pixel count computation processing will be described.

<Specific Example 1> In the specific example 1, a height pixel count is acquired by using a length of a bone from a head to a foot. In the specific example 1, as illustrated in FIG. 20, the height computation unit 108 acquires a length of each bone (S211), and adds up the acquired length of each bone (S212).

The height computation unit 108 acquires a length of a bone from a head to a foot of a person on a two-dimensional image, and acquires a height pixel count. In other words, each length (pixel count) of a bone B1 (length L1), a bone B51 (length L21), a bone B61 (length L31), and a bone B71 (length L41), or the bone B1 (length L1), a bone B52 (length L22), a bone B62 (length L32), and a bone B72 (length L42) among bones in FIG. 24 is acquired from the image in which the skeleton structure is detected. A length of each bone can be acquired from coordinates of each keypoint in the two-dimensional image. A value acquired by multiplying, by a correction constant, L1+L21+L31+L41 or L1+L22+L32+L42, acquired by adding them up, is computed as the height pixel count (h). When both values can be computed, a longer value is set as the height pixel count, for example. In other words, each bone has a longest length in an image when being captured from the front, and is displayed to be short when being tilted in a depth direction with respect to a camera. Therefore, it is conceivable that a longer bone has a higher possibility of being captured from the front, and has a value closer to a true value. Thus, a longer value is preferably selected.

Figure 25:
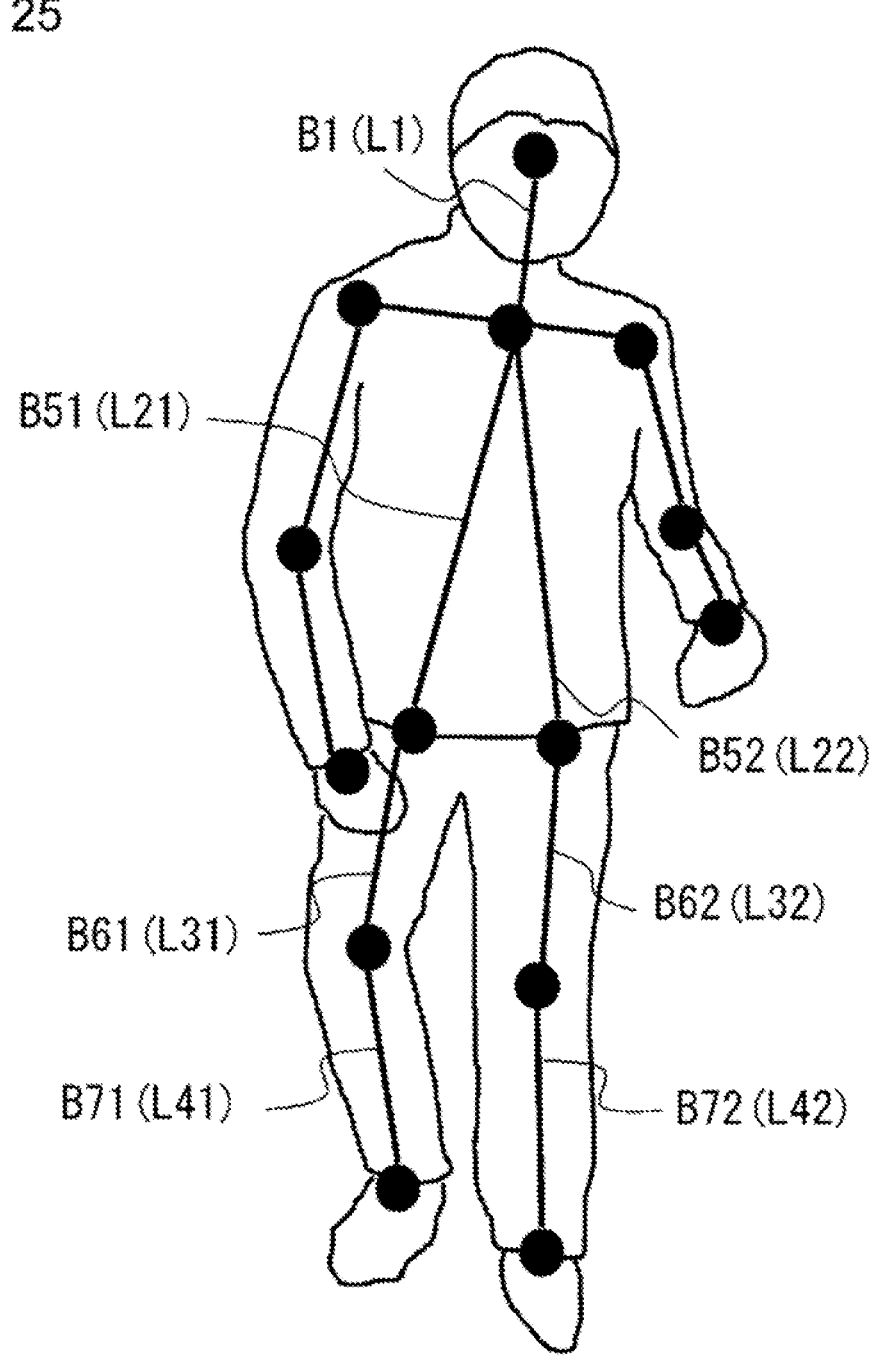
FIG. 25 is a diagram illustrating a detection example of a skeleton structure according to the example embodiment 2.

In an example in FIG. 25, the bone B1, the bone B51 and the bone B52, the bone B61 and the bone B62, and the bone B71 and the bone B72 are each detected without overlapping. L1+L21+L31+L41 and L1+L22+L32+L42 that are a total of the bones are acquired, and, for example, a value acquired by multiplying, by a correction constant, L1+L22+L32+L42 on a left leg side having a greater length of the detected bones is set as the height pixel count.

Figure 26:
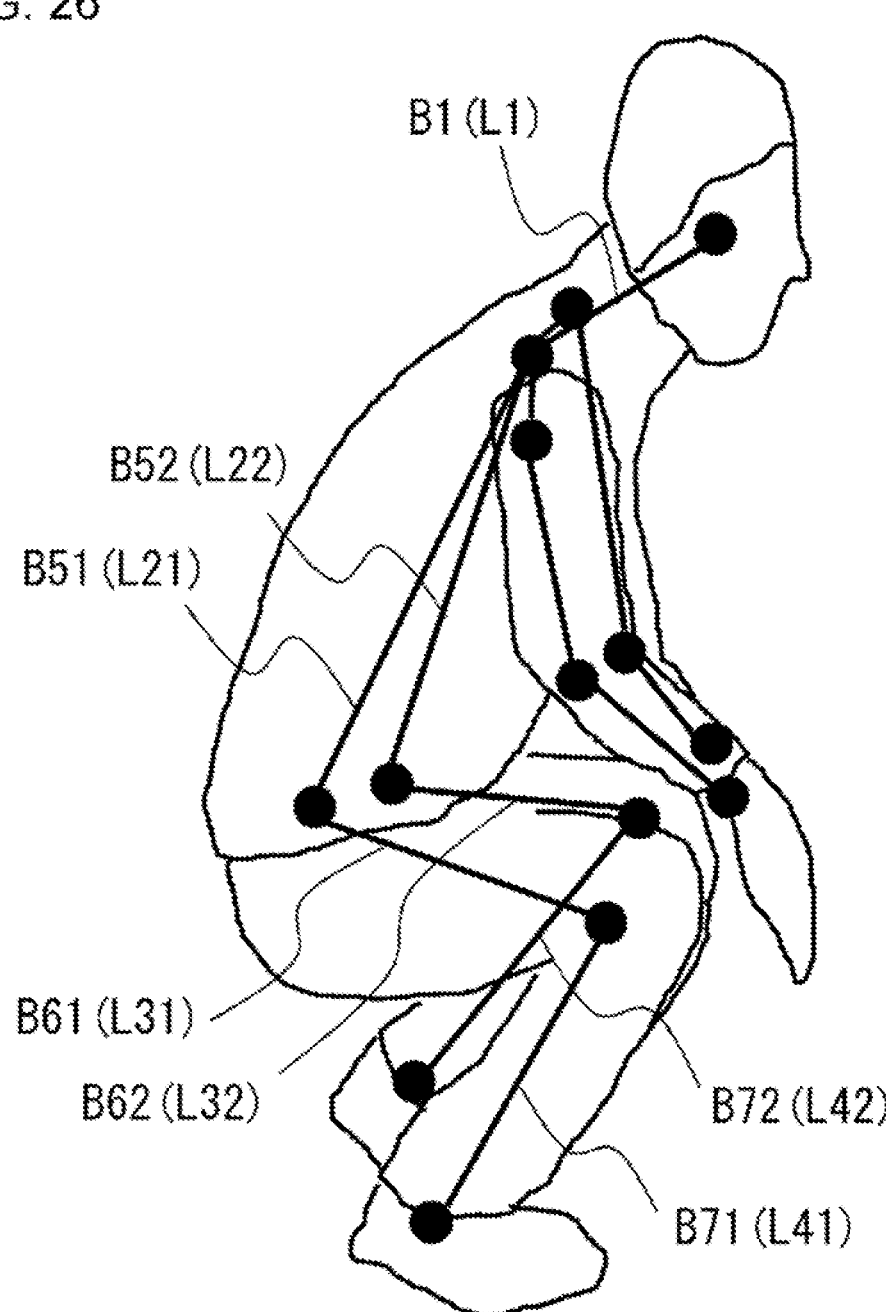
FIG. 26 is a diagram illustrating a detection example of a skeleton structure according to the example embodiment 2.

In an example in FIG. 26, the bone B1, the bone B51 and the bone B52, the bone B61 and the bone B62, and the bone B71 and the bone B72 are each detected, and the bone B61 and the bone B71 of a right leg, and the bone B62 and the bone B72 of a left leg overlap. L1+L21+L31+L41 and L1+L22+L32+L42 that are a total of the bones are acquired, and, for example, a value acquired by multiplying, by a correction constant, L1+L21+L31+L41 on a right leg side having a greater length of the detected bones is set as the height pixel count.

Figure 27:
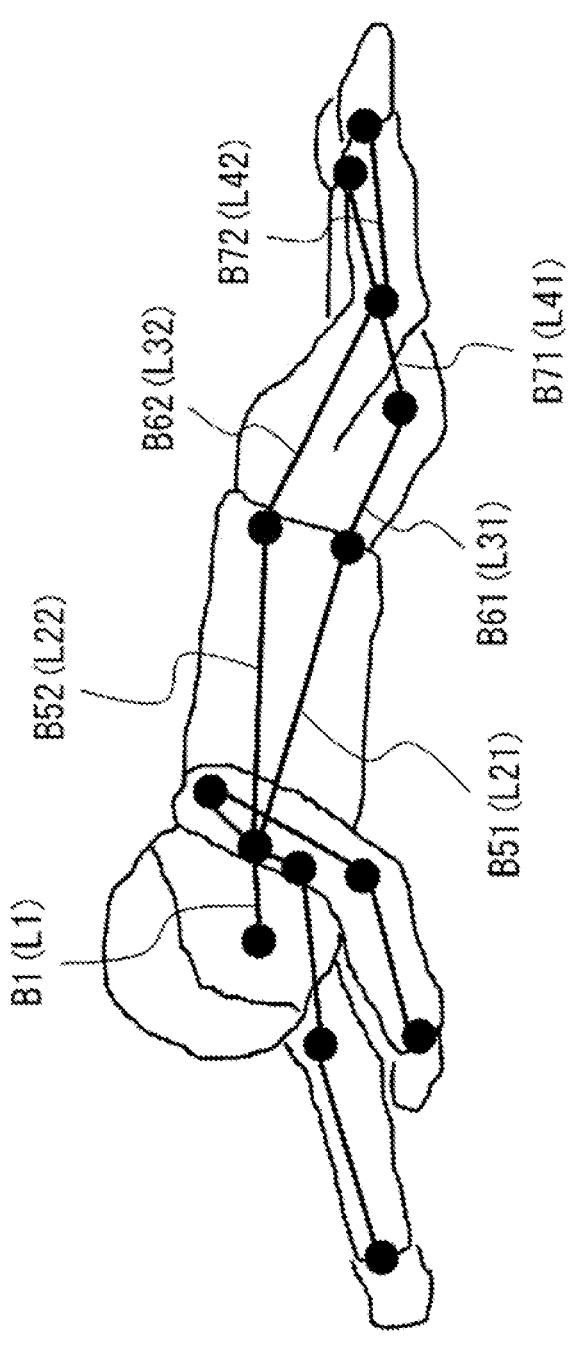
FIG. 27 is a diagram illustrating a detection example of a skeleton structure according to the example embodiment 2.

In an example in FIG. 27, the bone B1, the bone B51 and the bone B52, the bone B61 and the bone B62, and the bone B71 and the bone B72 are each detected, and the bone B61 and the bone B71 of the right leg and the bone B62 and the bone B72 of the left leg overlap. L1+L21+L31+L41 and L1+L22+L32+L42 that are a total of the bones are acquired, and, for example, a value acquired by multiplying, by a correction constant, L1+L22+L32+L42 on the left leg side having a greater length of the detected bones is set as the height pixel count.

In the specific example 1, since a height can be acquired by adding up lengths of bones from a head to a foot, a height pixel count can be acquired by a simple method. Further, since at least a skeleton from a head to a foot may be able to be detected by a skeleton estimation technique using machine learning, a height pixel count can be accurately estimated even when the entire person is not necessarily captured in an image as in a squatting state and the like.

<Specific Example 2> In the specific example 2, a height pixel count is acquired by using a two-dimensional skeleton model indicating a relationship between a length of a bone included in a two-dimensional skeleton structure and a length of a whole body of a person on a two-dimensional image space.

Figure 28:
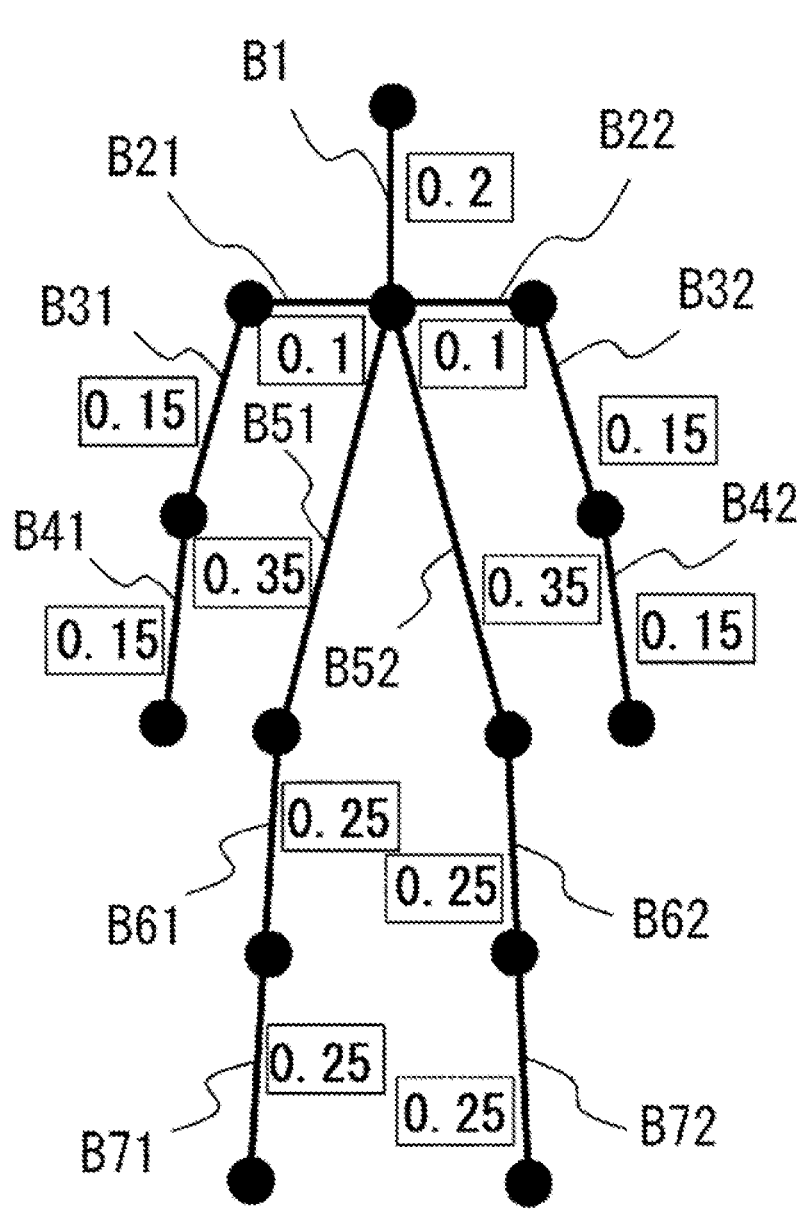
FIG. 28 is a diagram illustrating a human model according to the example embodiment 2.

FIG. 28 is a human model (two-dimensional skeleton model) 301 that is used in the specific example 2 and indicates a relationship between a length of each bone on the two-dimensional image space and a length of a whole body on the two-dimensional image space. As illustrated in FIG. 28, a relationship between a length of each bone of an average person and a length of a whole body (a proportion of a length of each bone to a length of a whole body) is associated with each bone of the human model 301. For example, a length of the bone B1 of a head is the length of the whole body×0.2 (20%), a length of the bone B41 of a right hand is the length of the whole body×0.15 (15%), and a length of the bone B71 of the right leg is the length of the whole body×0.25 (25%). Information about such a human model 301 is stored in the database 110, and thus an average length of a whole body can be acquired from a length of each bone. In addition to a human model of an average person, a human model may be prepared for each attribute of a person such as age, sex, and nationality. In this way, a length (height) of a whole body can be appropriately acquired according to an attribute of a person.

Figure 29:
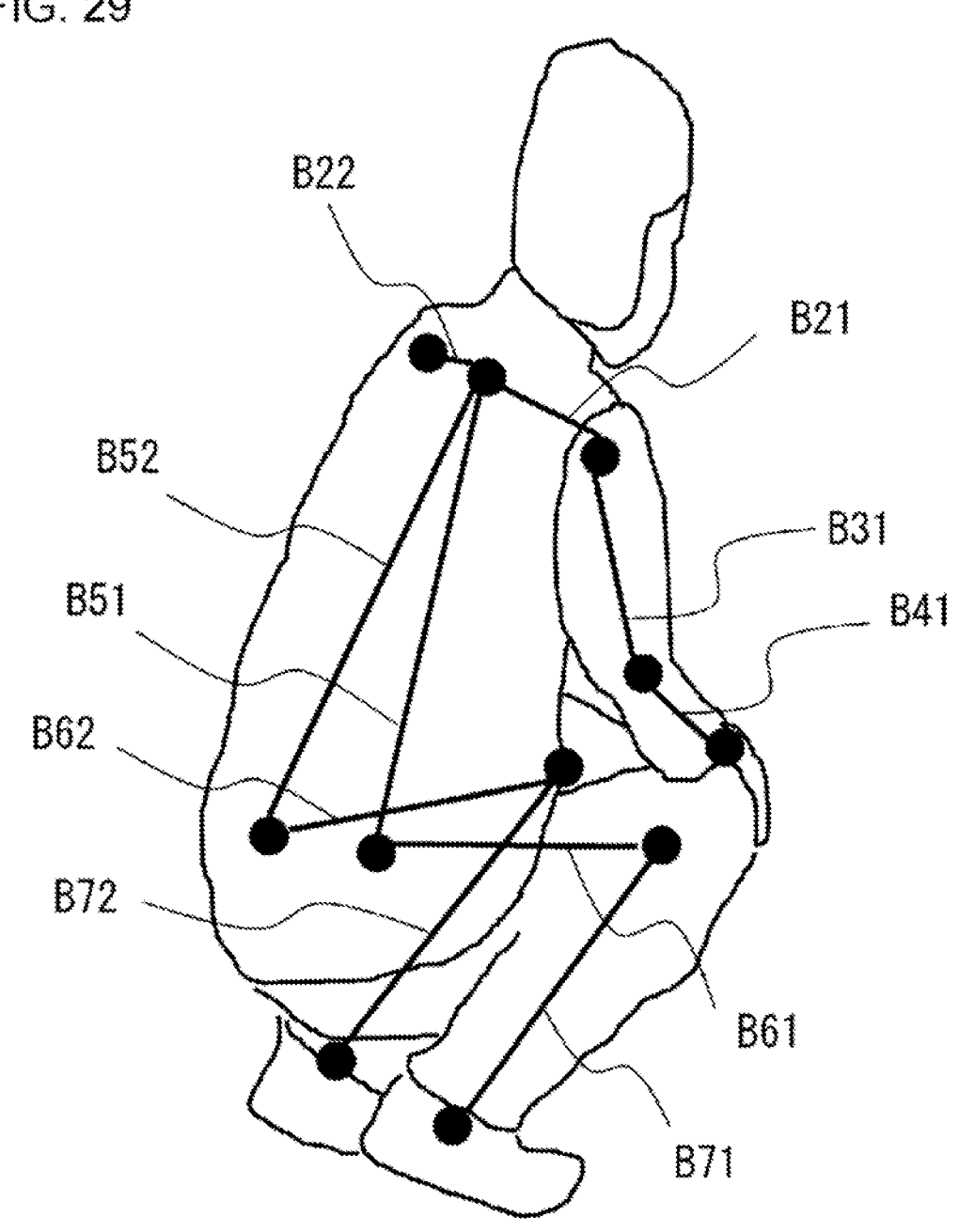
FIG. 29 is a diagram illustrating a detection example of a skeleton structure according to the example embodiment 2.

In the specific example 2, as illustrated in FIG. 21, the height computation unit 108 acquires a length of each bone (S221). The height computation unit 108 acquires a length of all bones (length on the two-dimensional image space) in a detected skeleton structure. FIG. 29 is an example of capturing an image of a person in a squatting state diagonally from rear right and detecting a skeleton structure. In this example, since a face and a left side surface of a person are not captured, a bone of a head and bones of a left arm and a left hand cannot be detected. Thus, each length of bones B21, B22, B31, B41, B51, B52, B61, B62, B71, and B72 that are detected is acquired.

Subsequently, as illustrated in FIG. 21, the height computation unit 108 computes a height pixel count from a length of each bone, based on a human model (S222). The height computation unit 108 refers to the human model 301 indicating a relationship between lengths of each bone and a whole body as in FIG. 28, and acquires a height pixel count from the length of each bone. For example, since a length of the bone B41 of the right hand is the length of the whole body×0.15, a height pixel count based on the bone B41 is acquired from the length of the bone B41/0.15. Further, since a length of the bone B71 of the right leg is the length of the whole body×0.25, a height pixel count based on the bone B71 is acquired from the length of the bone B71/0.25.

The human model referred at this time is, for example, a human model of an average person, but a human model may be selected according to an attribute of a person such as age, sex, and nationality. For example, when a face of a person is captured in a captured image, an attribute of the person is identified based on the face, and a human model associated with the identified attribute is referred. An attribute of a person can be recognized from a feature of a face in an image by referring to information acquired by performing machine learning on a face for each attribute. Further, when an attribute of a person cannot be identified from an image, a human model of an average person may be used.

Further, a height pixel count computed from a length of a bone may be corrected by a camera parameter. For example, when a camera is placed in a high position and performs capturing in such a way that a person is looked down, a horizontal length such as a bone of a shoulder width is not affected by a dip of the camera in a two-dimensional skeleton structure, but a vertical length such as a bone from a neck to a waist is reduced as a dip of the camera increases. Then, a height pixel count computed from the horizontal length such as a bone of a shoulder width tends to be greater than an actual height pixel count. Thus, when a camera parameter is used, an angle at which a person is looked down by the camera is clear, and thus a correction can be performed in such a way as to acquire a two-dimensional skeleton structure captured from the front by using information about the dip. In this way, a height pixel count can be more accurately computed.

Figure 30:
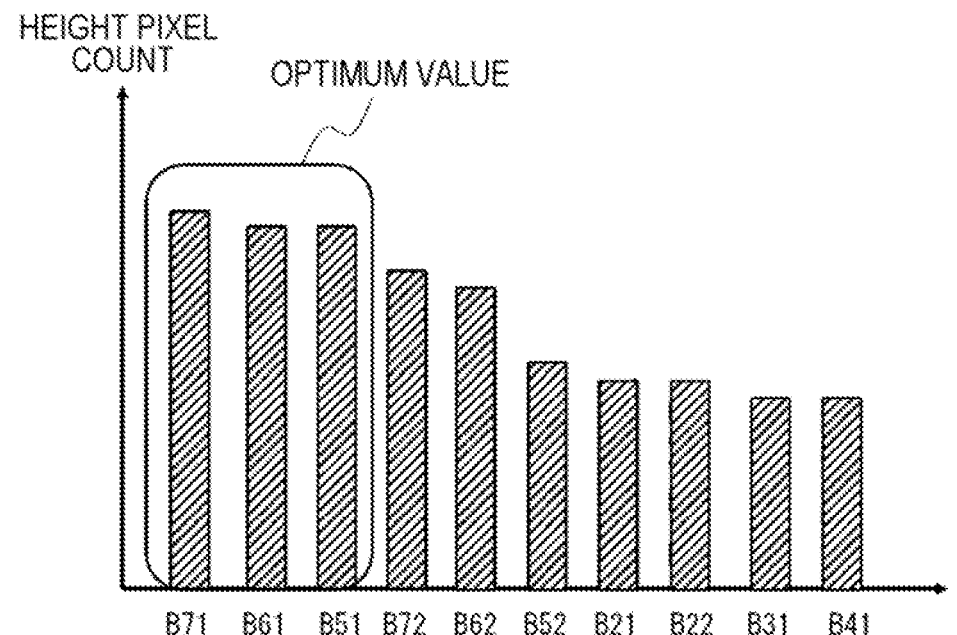
FIG. 30 is a histogram for describing the height pixel count computation method according to the example embodiment 2.

Subsequently, as illustrated in FIG. 21, the height computation unit 108 computes an optimum value of the height pixel count (S223). The height computation unit 108 computes an optimum value of the height pixel count from the height pixel count acquired for each bone. For example, a histogram of a height pixel count acquired for each bone as illustrated in FIG. 30 is generated, and a great height pixel count is selected from among the height pixel counts. In other words, a longer height pixel count is selected from among a plurality of height pixel counts acquired based on a plurality of bones. For example, values in top 30% are regarded valid, and height pixel counts by the bones B71, B61, and B51 are selected in FIG. 30. An average of the selected height pixel counts may be acquired as an optimum value, or a greatest height pixel count may be set as an optimum value. Since a height is acquired from a length of a bone in a two-dimensional image, when the bone cannot be captured from the front, i.e., when the bone tilted in the depth direction as viewed from the camera is captured, a length of the bone is shorter than that captured from the front. Then, a value having a greater height pixel count has a higher possibility of being captured from the front than a value having a smaller height pixel count and is a more plausible value, and thus a greater value is set as an optimum value.

In the specific example 2, since a height pixel count is acquired based on a bone of a detected skeleton structure by using a human model indicating a relationship between lengths of a bone and a whole body on the two-dimensional image space, a height pixel count can be acquired from some of bones even when not all skeletons from a head to a foot can be acquired. Particularly, a height pixel count can be accurately estimated by adopting a greater value from among values acquired from a plurality of bones.

<Specific Example 3> In the specific example 3, a skeleton vector of a whole body is acquired by fitting a two-dimensional skeleton structure to a three-dimensional human model (three-dimensional skeleton model) and using a height pixel count of the fit three-dimensional human model.

In the specific example 3, as illustrated in FIG. 22, the height computation unit 108 first computes a camera parameter, based on an image captured by the camera 200 (S231). The height computation unit 108 extracts an object whose length is clear in advance from a plurality of images captured by the camera 200, and acquires a camera parameter from a size (pixel count) of the extracted object. Note that, a camera parameter may be acquired in advance, and the acquired camera parameter may be obtained as necessary.

Subsequently, the height computation unit 108 adjusts an arrangement and a height of a three-dimensional human model (S232). The height computation unit 108 prepares, for a detected two-dimensional skeleton structure, the three-dimensional human model for computing a height pixel count, and arranges the three-dimensional human model in the same two-dimensional image, based on the camera parameter. Specifically, a "relative positional relationship between a camera and a person in a real world" is determined from the camera parameter and the two-dimensional skeleton structure. For example, on the basis that a position of the camera has coordinates (0, 0, 0), coordinates (x, y, z) of a position in which a person stands (or sits) are determined. Then, by assuming an image captured when the three-dimensional human model is arranged in the same position (x, y, z) as that of the determined person, the two-dimensional skeleton structure and the three-dimensional human model are superimposed.

Figure 31:
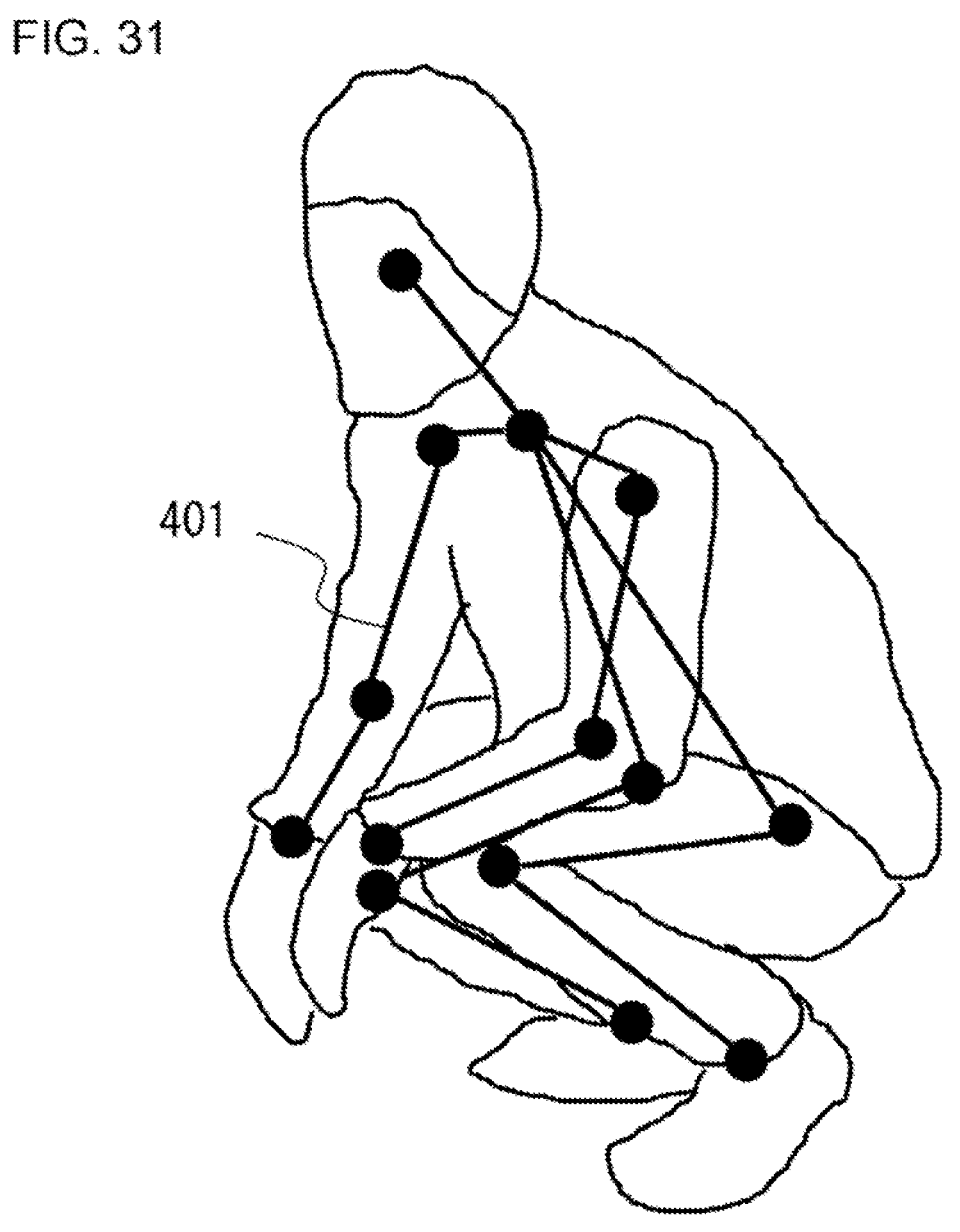
Figure 32:
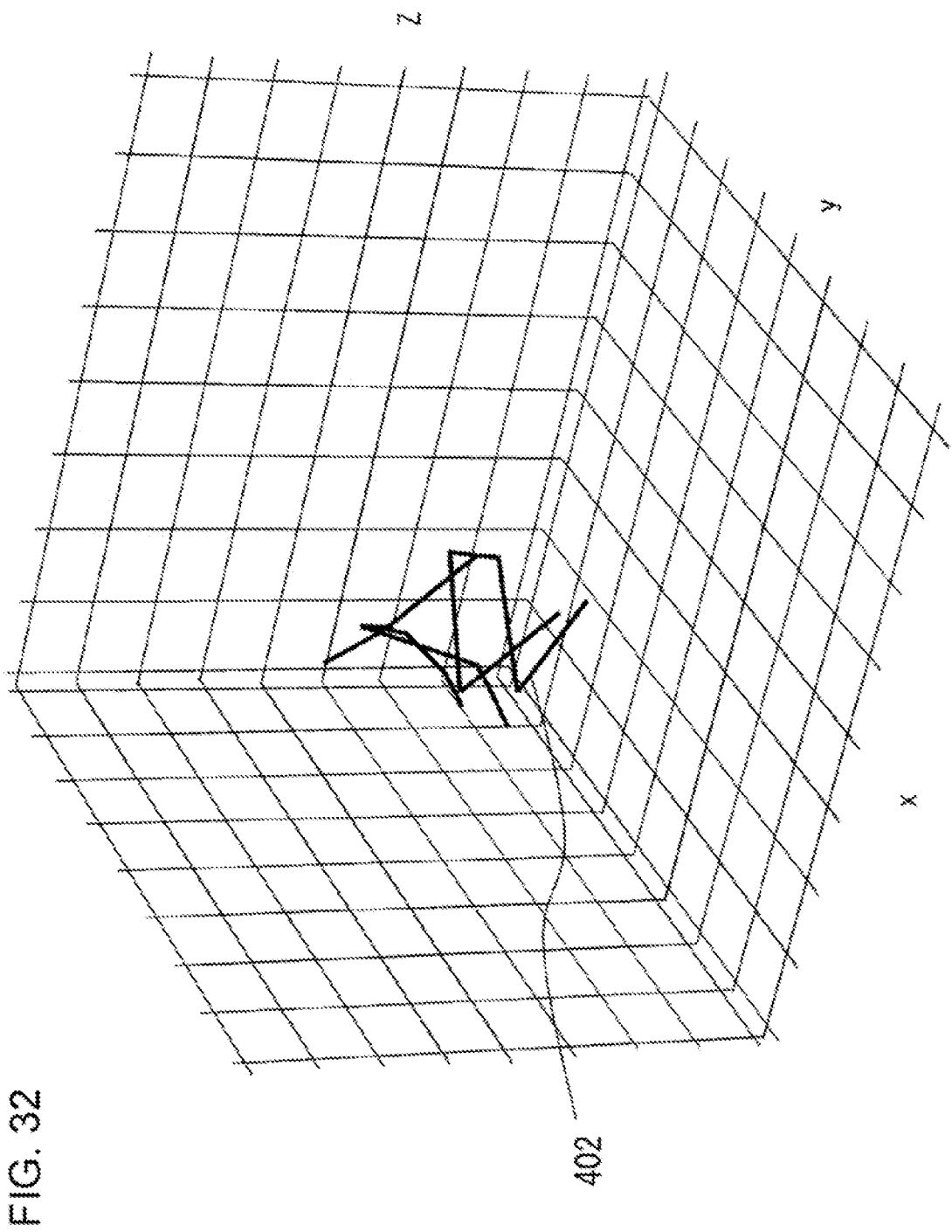
FIG. 32 is a diagram illustrating a three-dimensional human model according to the example embodiment 2.

FIG. 31 is an example of capturing an image of a squatting person diagonally from front left and detecting a two-dimensional skeleton structure 401. The two-dimensional skeleton structure 401 includes two-dimensional coordinate information. Note that, all bones are preferably detected, but some of bones may not be detected. A three-dimensional human model 402 as in FIG. 32 is prepared for the two-dimensional skeleton structure 401. The three-dimensional human model (three-dimensional skeleton model) 402 is a model of a skeleton including three-dimensional coordinate information and having the same shape as that of the two-dimensional skeleton structure 401. Then, as in FIG. 33, the prepared three-dimensional human model 402 is arranged and superimposed on the detected two-dimensional skeleton structure 401. Further, the three-dimensional human model 402 is superimposed on the two-dimensional skeleton structure 401, and a height of the three-dimensional human model 402 is also adjusted to the two-dimensional skeleton structure 401.

Figure 33:
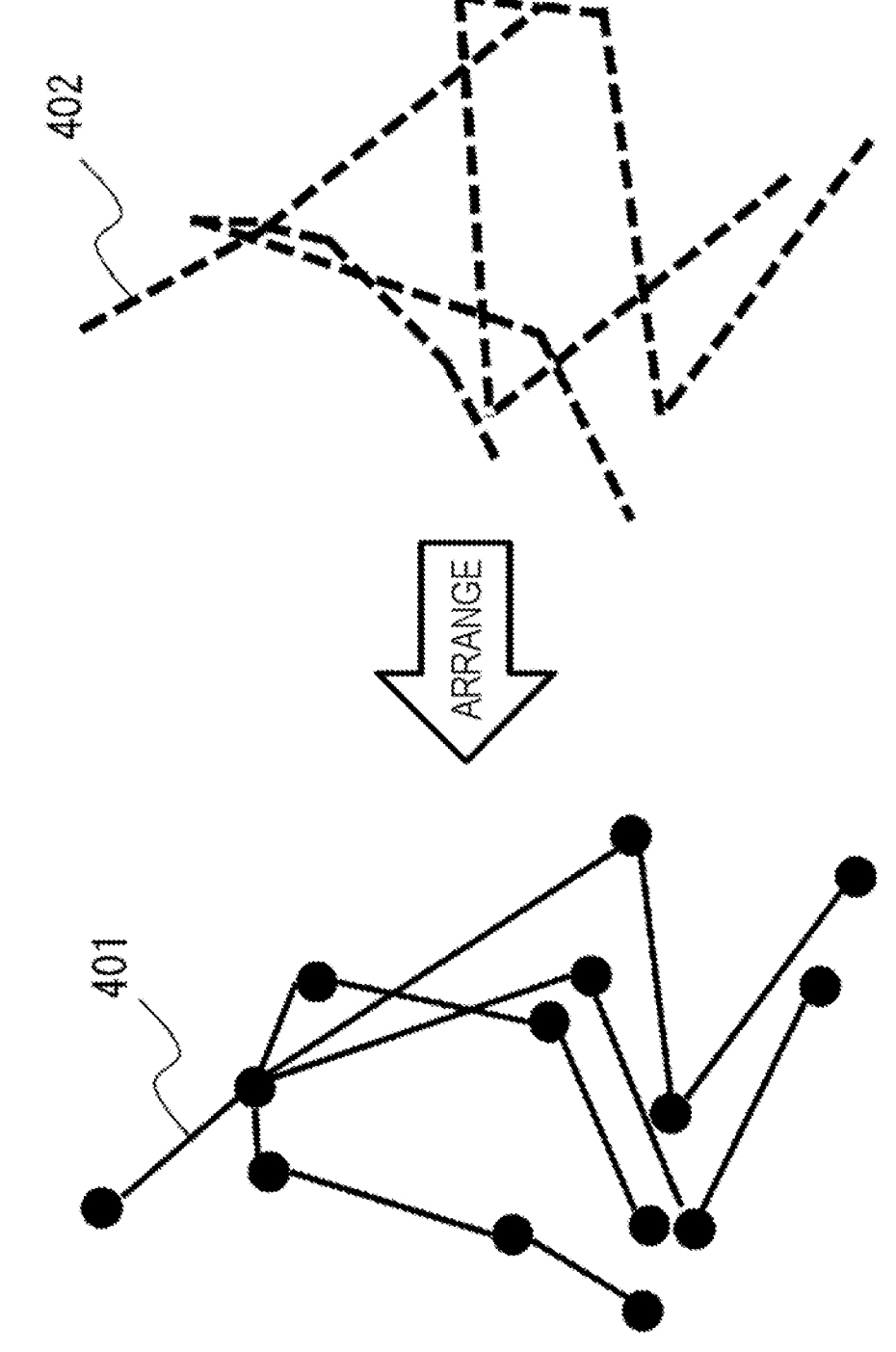
FIG. 33 is a diagram for describing the height pixel count computation method according to the example embodiment 2.

Note that, the three-dimensional human model 402 prepared at this time may be a model in a state close to a pose of the two-dimensional skeleton structure 401 as in FIG. 33, or may be a model in an upright state. For example, the three-dimensional human model 402 with an estimated pose may be generated by using a technique for estimating a pose in a three-dimensional space from a two-dimensional image by using machine learning. A three-dimensional pose can be estimated from a two-dimensional image by learning information about a joint in the two-dimensional image and information about a joint in a three-dimensional space.

Figure 34:
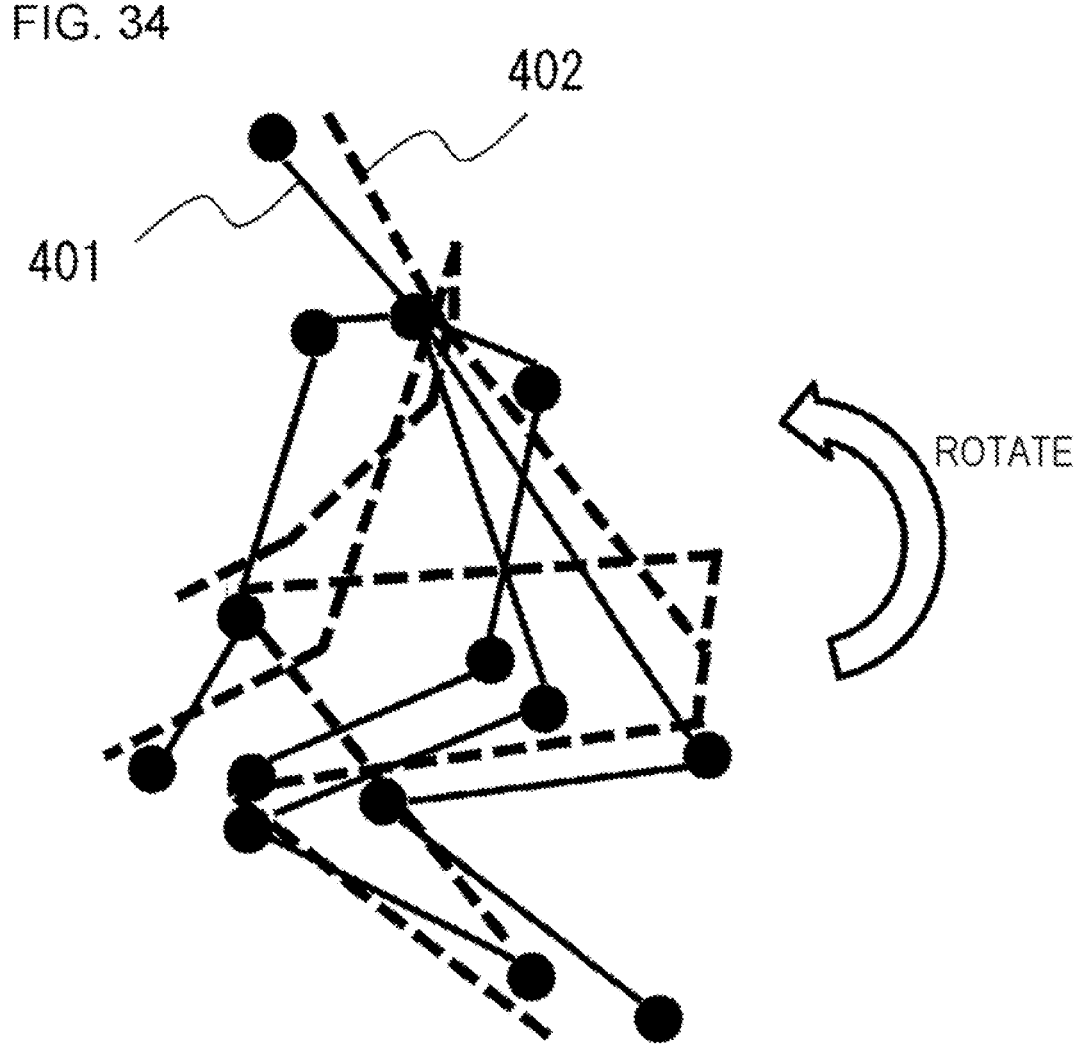
FIG. 34 is a diagram for describing the height pixel count computation method according to the example embodiment 2.

Subsequently, as illustrated in FIG. 22, the height computation unit 108 fits the three-dimensional human model to a two-dimensional skeleton structure (S233). As in FIG. 34, the height computation unit 108 deforms the three-dimensional human model 402 in such a way that poses of the three-dimensional human model 402 and the two-dimensional skeleton structure 401 match in a state where the three-dimensional human model 402 is superimposed on the two-dimensional skeleton structure 401. In other words, a height, an orientation of a body, and an angle of a joint of the three-dimensional human model 402 are adjusted, and optimization is performed in such a way as to eliminate a difference from the two-dimensional skeleton structure 401. For example, by rotating a joint of the three-dimensional human model 402 in a movable range of a person and also rotating the entire three-dimensional human model 402, the entire size is adjusted. Note that, fitting (application) between a three-dimensional human model and a two-dimensional skeleton structure is performed on a two-dimensional space (two-dimensional coordinates). In other words, a three-dimensional human model is mapped in the two-dimensional space, and the three-dimensional human model is optimized for a two-dimensional skeleton structure in consideration of a change of the deformed three-dimensional human model in the two-dimensional space (image).

Figure 35:
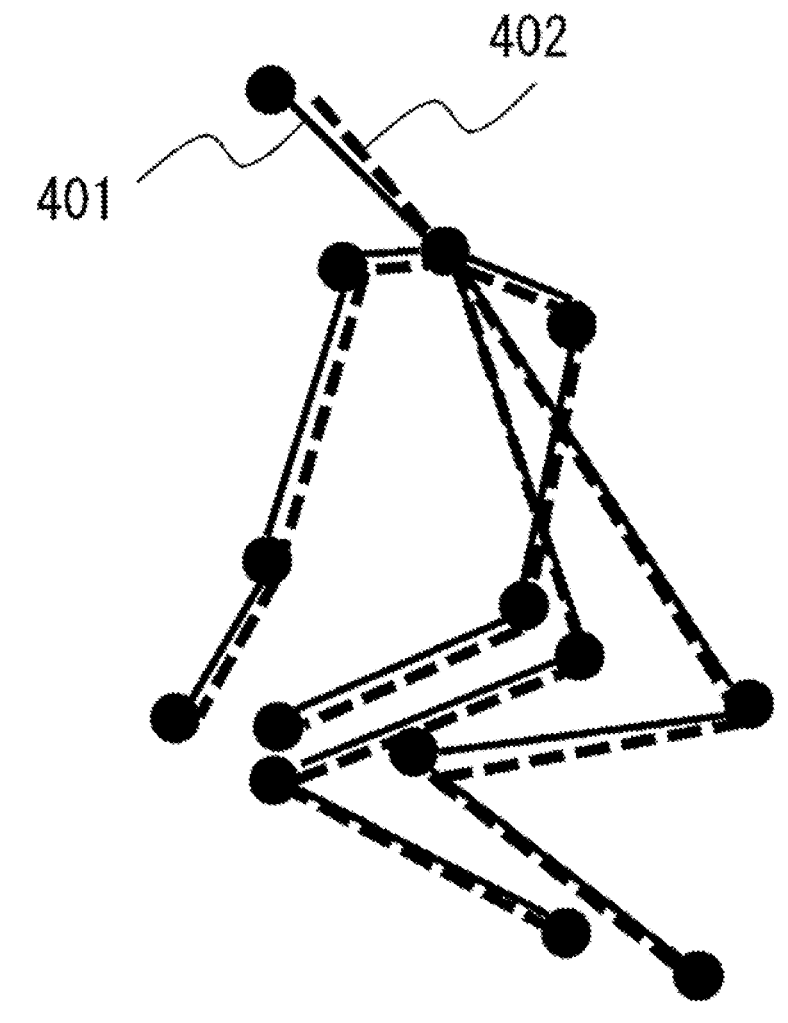
FIG. 35 is a diagram for describing the height pixel count computation method according to the example embodiment 2.

Subsequently, as illustrated in FIG. 22, the height computation unit 108 computes a height pixel count of the fit three-dimensional human model (S234). As in FIG. 35, when there is no difference between the three-dimensional human model 402 and the two-dimensional skeleton structure 401 and poses match, the height computation unit 108 acquires a height pixel count of the three-dimensional human model 402 in that state. With the optimized three-dimensional human model 402 in an upright state, a length of a whole body on the two-dimensional space is acquired based on a camera parameter. For example, a height pixel count is computed from lengths (pixel counts) of bones from a head to a foot when the three-dimensional human model 402 is upright. Similarly to the specific example 1, the lengths of the bones from the head to the foot of the three-dimensional human model 402 may be added up.

In the specific example 3, a height pixel count is acquired based on a three-dimensional human model by fitting the three-dimensional human model to a two-dimensional skeleton structure, based on a camera parameter, and thus the height pixel count can be accurately estimated even when all bones are not captured at the front, i.e., when an error is great due to all bones being captured on a slant.

<Normalization Processing> As illustrated in FIG. 19, the image processing apparatus 100 performs the normalization processing (S202) after the height pixel count computation processing. In the normalization processing, as illustrated in FIG. 23, the feature value computation unit 103 computes a keypoint height (S241). The feature value computation unit 103 computes a keypoint height (pixel count) of all keypoints included in the detected skeleton structure. The keypoint height is a length (pixel count) in the height direction from a lowest end (for example, a keypoint of any foot) of the skeleton structure to the keypoint. Herein, as one example, the keypoint height is acquired from a Y coordinate of the keypoint in an image. Note that, as described above, the keypoint height may be acquired from a length along a vertical projection axis based on a camera parameter. For example, in the example in FIG. 24, a height (yi) of a keypoint A2 of a neck is a value acquired by subtracting a Y coordinate of a keypoint A81 of a right foot or a keypoint A82 of a left foot from a Y coordinate of the keypoint A2.

Subsequently, the feature value computation unit 103 determines a reference point for normalization (S242). The reference point is a point being a reference for representing a relative height of a keypoint. The reference point may be preset, or may be able to be selected by a user. The reference point is preferably at the center of the skeleton structure or higher than the center (in an upper half of an image in the up-down direction), and, for example, coordinates of a keypoint of a neck are set as the reference point. Note that coordinates of a keypoint of a head or another portion instead of a neck may be set as the reference point. Instead of a keypoint, any coordinates (for example, center coordinates in the skeleton structure, and the like) may be set as the reference point.

Subsequently, the feature value computation unit 103 normalizes the keypoint height (yi) by the height pixel count (S243). The feature value computation unit 103 normalizes each keypoint by using the keypoint height of each keypoint, the reference point, and the height pixel count. Specifically, the feature value computation unit 103 normalizes, by the height pixel count, a relative height of a keypoint with respect to the reference point. Herein, as an example focusing only on the height direction, only a Y coordinate is extracted, and normalization is performed with the reference point as the keypoint of the neck. Specifically, with a Y coordinate of the reference point (keypoint of the neck) as (yc), a feature value (normalization value) is acquired by using the following equation (1). Note that, when a vertical projection axis based on a camera parameter is used, (yi) and (yc) are converted to values in a direction along the vertical projection axis.

[Mathematical 1]

$$f_i = (y_i - y_c)/h \qquad (1)$$

For example, when 18 keypoints are present, 18 coordinates (x0, y0), (x1, y1), . . . and (x17, y17) of the keypoints are converted to 18-dimensional feature values as follows by using the equation (1) described above.

[Mathematical 2]

$$f_0 = (y_0 - y_c)/h \qquad (2)$$

$$f_1 = (y_1 - y_c)/h$$

$$\vdots$$

$$f_{17} = (y_{17} - y_c)/h$$

Figure 36:
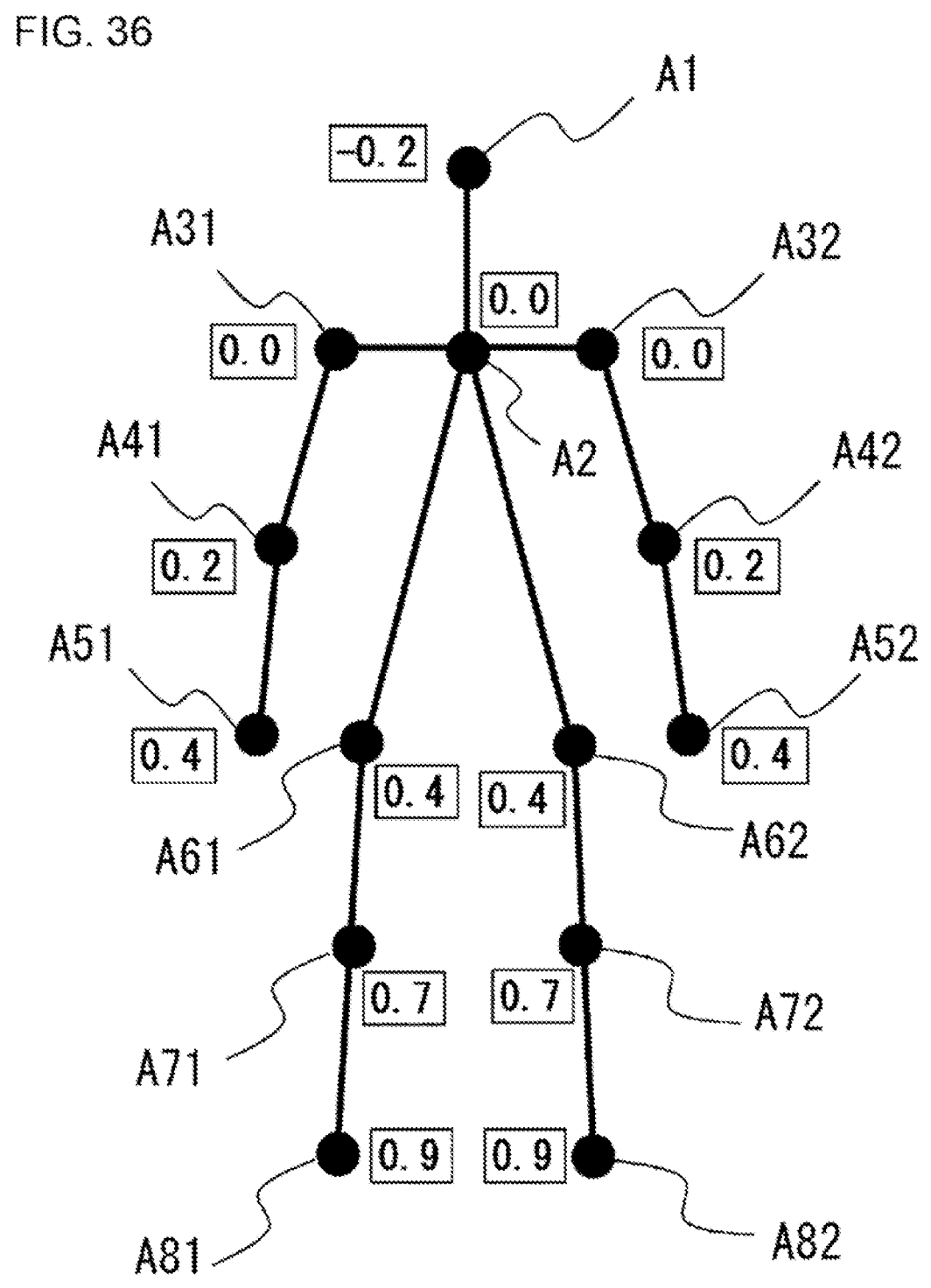
Figure 37:
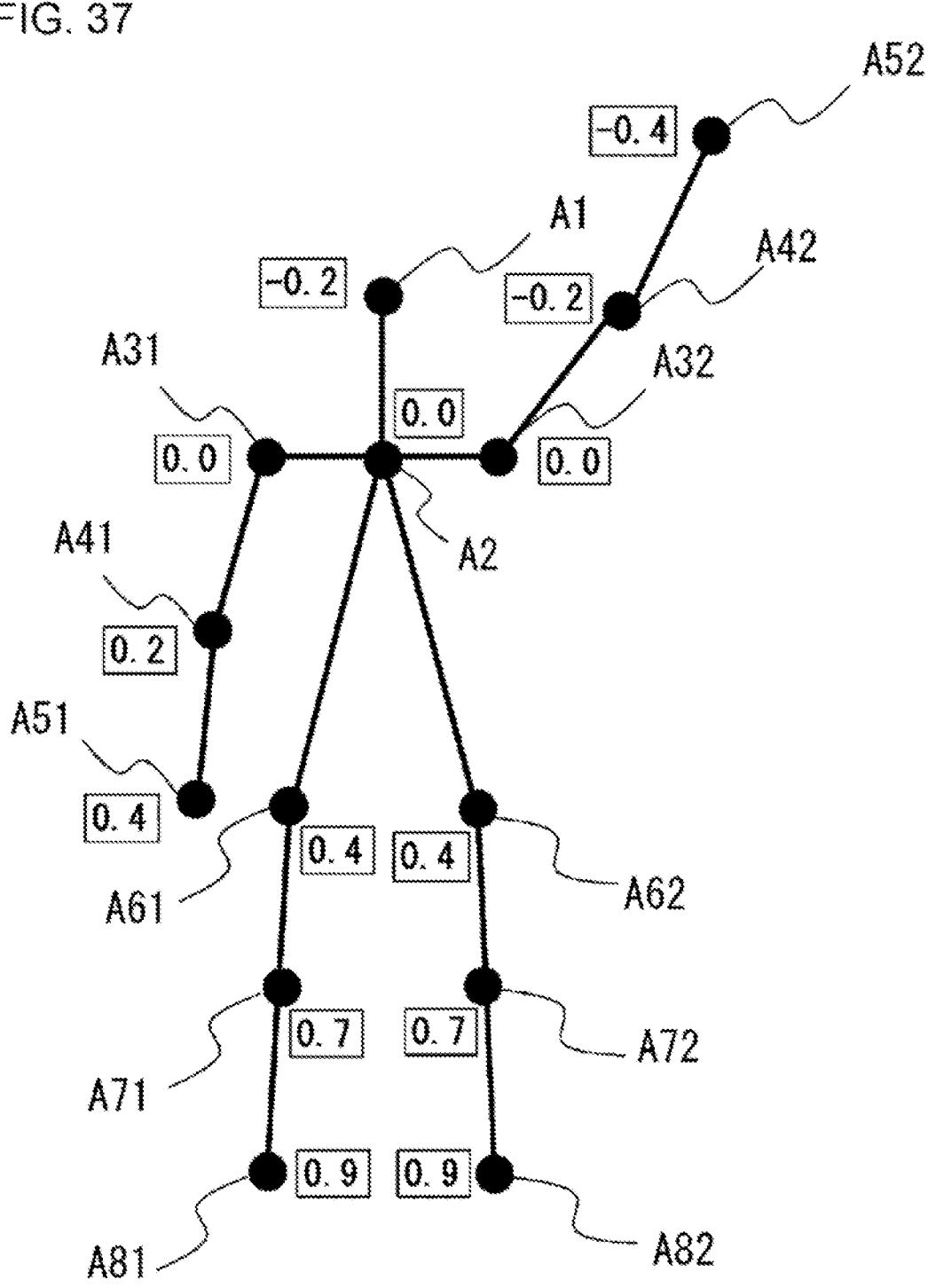
FIG. 37 is a diagram for describing the normalization method according to the example embodiment 2.
Figure 38:
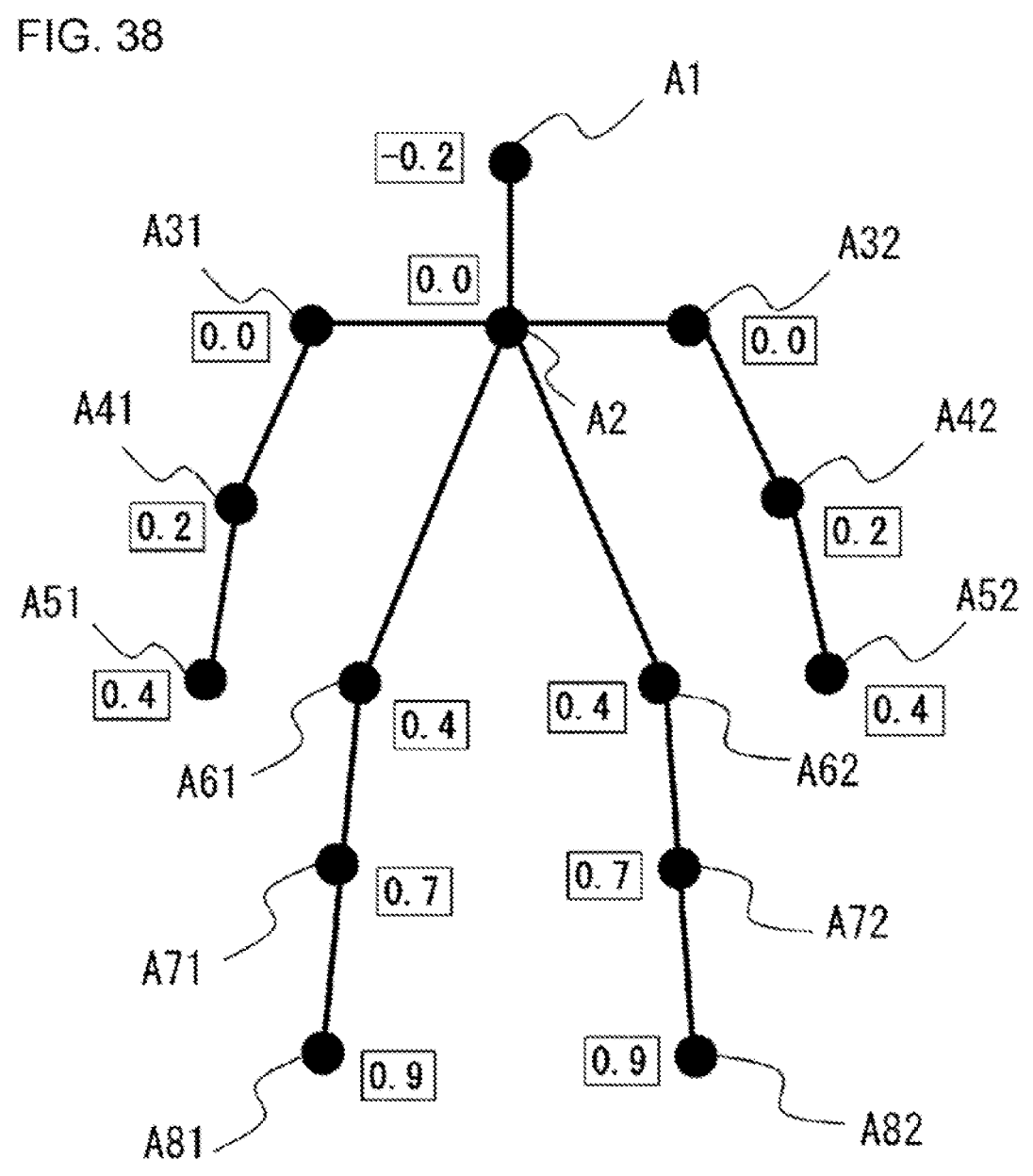

FIG. 36 illustrates an example of a feature value of each keypoint acquired by the feature value computation unit 103. In this example, since the keypoint A2 of the neck is the reference point, a feature value of the keypoint A2 is 0.0 and a feature value of a keypoint A31 of a right shoulder and a keypoint A32 of a left shoulder at the same height as the neck is also 0.0. A feature value of a keypoint A1 of a head higher than the neck is −0.2. Feature values of a keypoint A51 of a right hand and a keypoint A52 of a left hand lower than the neck are 0.4, and feature values of the keypoint A81 of the right foot and the keypoint A82 of the left foot are 0.9. When the person raises the left hand from this state, the left hand is higher than the reference point as in FIG. 37, and thus a feature value of the keypoint A52 of the left hand is −0.4. Meanwhile, since normalization is performed by using only a coordinate of the Y axis, as in FIG. 38, a feature value does not change as compared to FIG. 36 even when a width of the skeleton structure changes. In other words, a feature value (normalization value) according to the present example embodiment indicates a feature of a skeleton structure (keypoint) in the height direction (Y direction), and is not affected by a change of the skeleton structure in the horizontal direction (X direction).

As described above, in the present example embodiment, a skeleton structure of a person is detected from a two-dimensional image, and each keypoint of the skeleton structure is normalized by using a height pixel count (upright height on a two-dimensional image space) acquired from the detected skeleton structure. Robustness when classification, a search, and the like are performed can be improved by using the normalized feature value. In other words, since a feature value according to the present example embodiment is not affected by a change of a person in the horizontal direction as described above, robustness with respect to a change in orientation of the person and a body shape of the person is great.

Furthermore, the present example embodiment can be achieved by detecting a skeleton structure of a person by using a skeleton estimation technique such as Open Pose, and thus learning data that learn a pose and the like of a person do not need to be prepared. Further, classification and a search of a pose and the like of a person can be achieved by normalizing a keypoint of a skeleton structure and storing the keypoint in advance in a database, and thus classification and a search can also be performed on an unknown pose.

Further, a clear and simple feature value can be acquired by normalizing a keypoint of a skeleton structure, and thus persuasion of a user for a processing result is high unlike a black box algorithm as in machine learning.

While the example embodiments of the present invention have been described with reference to the drawings, the example embodiments are only exemplification of the present invention, and various configurations other than the above-described example embodiments can also be employed.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiment may also be described in supplementary notes below, which is not limited thereto.

1. An image selection apparatus, including:
    a search information acquisition unit that acquires a plurality of pieces of search pose information that are information generated for each of a plurality of target images and indicate a pose of a person included in the target image;
    an exclusion information acquisition unit that acquires exclusion pose information indicating a pose of a person included in an exclusion query image to be a query of an image needed to be excluded from a search result;
    an exclusion score computation unit that computes, for each of the plurality of pieces of search pose information, an exclusion score indicating a degree of similarity to the exclusion pose information; and
    an exclusion image selection unit that selects, from the plurality of target images by using the exclusion score, an exclusion image being an image needed to be excluded from a search result.

2. The image selection apparatus according to supplementary note 1 described above, wherein
    the search information acquisition unit acquires a search query image including a person with a pose needed to be included in the target image, and selects the plurality of target images by using a selection score indicating a degree of similarity to the search query image.

3. The image selection apparatus according to supplementary note 2 described above, wherein
    the exclusion score and the selection score are defined by a same parameter, and
    the exclusion image selection unit sets, by using a selection reference for selecting the plurality of target images, an exclusion reference for selecting the exclusion image.

4. The image selection apparatus according to supplementary note 3 described above, wherein
    the exclusion image selection unit selects, as the exclusion image, the target image in which a distance in a space formed of the parameter satisfies the exclusion reference,
    the search information acquisition unit selects, as the target image, an image in which a distance in a space formed of the parameter satisfies the selection reference, and the exclusion reference is less than the selection reference.

5. The image selection apparatus according to any one of supplementary notes 2 to 4 described above, wherein
the exclusion image selection unit acquires a selection input of at least the one exclusion image, and excludes the exclusion image selected by the selection input from the plurality of target images, and
the search information acquisition unit
updates, by using the exclusion image selected by the selection input, a selection reference for selecting the plurality of target images by using the search query image, and
stores the search query image and the selection reference after an update in association with each other in a storage unit.

6. The image selection apparatus according to supplementary note 2 described above, wherein
the exclusion score is indicated by at least one parameter, and
the exclusion image selection unit sets, according to an input from a user, an exclusion reference for selecting the exclusion image.

7. The image selection apparatus according to supplementary note 6 described above, wherein
the exclusion score and the selection score are defined by a same parameter,
the exclusion image selection unit sets, by using a selection reference for selecting the plurality of target images, an exclusion reference for selecting the exclusion image, and
the search information acquisition unit
updates the selection reference by using the exclusion reference, and
stores the search query image and the selection reference after an update in association with each other in a storage unit.

8. The image selection apparatus according to any one of supplementary notes 1 to 7 described above, wherein
the exclusion image selection unit displays the plurality of target images on a display unit in a state where the exclusion image can be determined,
the image selection apparatus further including
an exclusion unit that excludes the exclusion image from the plurality of target images when there is a predetermined input.

9. The image selection apparatus according to supplementary note 8 described above, wherein
the exclusion image selection unit
acquires a selection input of at least the one exclusion image after the plurality of target images are displayed, and
excludes the exclusion image selected by the selection input from the plurality of target images.

10. The image selection apparatus according to supplementary note 8 or 9 described above, wherein
the exclusion image selection unit selects a plurality of the exclusion images, and
the exclusion image selection unit excludes the plurality of exclusion images from the plurality of target images when there is a predetermined input.

11. An image selection method, including,
executing by a computer:
search information acquisition processing of acquiring a plurality of pieces of search pose information that are pose information generated for each of a plurality of target images and indicate a pose of a person included in the target image;
exclusion information acquisition processing of acquiring exclusion pose information indicating a pose of a person included in an exclusion query image to be a query of an image needed to be excluded from a search result;
exclusion score computation processing of computing, for each of the plurality of pieces of search pose information, an exclusion score indicating a degree of similarity to the exclusion pose information; and
exclusion image selection processing of selecting, from the plurality of target images by using the exclusion score, an exclusion image being an image needed to be excluded from a search result.

12. The image selection method according to supplementary note 11 described above, further including,
by the computer,
in the search information acquisition processing, acquiring a search query image including a person with a pose needed to be included in the target image, and selecting the plurality of target images by using a selection score indicating a degree of similarity to the search query image.

13. The image selection method according to supplementary note 12 described above, wherein
the exclusion score and the selection score are defined by a same parameter,
the image selection method further including,
by the computer,
in the exclusion image selection processing, setting, by using a selection reference for selecting the plurality of target images, an exclusion reference for selecting the exclusion image.

14. The image selection method according to supplementary note 13 described above, further including,
by the computer:
in the exclusion image selection processing, selecting, as the exclusion image, the target image in which a distance in a space formed of the parameter satisfies the exclusion reference; and,
in the search information acquisition processing, selecting, as the target image, an image in which a distance in a space formed of the parameter satisfies the selection reference, wherein
the exclusion reference is less than the selection reference.

15. The image selection method according to any one of supplementary notes 12 to 14 described above, further including,
by the computer:
in the exclusion image selection processing, acquiring a selection input of at least the one exclusion image, and excluding the exclusion image selected by the selection input from the plurality of target images;
in the search information acquisition processing,
updating, by using the exclusion image selected by the selection input, a selection reference for selecting the plurality of target images by using the search query image; and
storing the search query image and the selection reference after an update in association with each other in a storage unit.

16. The image selection method according to supplementary note 12 described above, wherein
the exclusion score is indicated by at least one parameter, the image selection method further including, by the computer, in the exclusion image selection processing, setting, according to an input from a user, an exclusion reference for selecting the exclusion image.

17. The image selection method according to supplementary note 16 described above, wherein the exclusion score and the selection score are defined by a same parameter, the image selection method further including, by the computer:

in the exclusion image selection processing, setting, by using a selection reference for selecting the plurality of target images, an exclusion reference for selecting the exclusion image;

in the search information acquisition processing, updating the selection reference by using the exclusion reference; and storing the search query image and the selection reference after an update in association with each other in a storage unit.

18. The image selection method according to any one of supplementary notes 11 to 17 described above, further including, by the computer:

in the exclusion image selection processing, displaying the plurality of target images on a display unit in a state where the exclusion image can be determined; and further executing exclusion processing of excluding the exclusion image from the plurality of target images when there is a predetermined input.

19. The image selection method according to supplementary note 18 described above, further including, by the computer:

in the exclusion image selection processing, acquiring a selection input of at least the one exclusion image after the plurality of target images are displayed; and excluding the exclusion image selected by the selection input from the plurality of target images.

20. The image selection method according to supplementary note 18 or 19 described above, further including, by the computer:

in the exclusion image selection processing, selecting a plurality of the exclusion images; and, in the exclusion image selection processing, excluding the plurality of exclusion images from the plurality of target images when there is a predetermined input.

21. A program causing a computer to include:

a search information acquisition function of acquiring a plurality of pieces of search pose information that are pose information generated for each of a plurality of target images and indicate a pose of a person included in the target image;

an exclusion information acquisition function of acquiring exclusion pose information indicating a pose of a person included in an exclusion query image to be a query of an image needed to be excluded from a search result;

an exclusion score computation function of computing, for each of the plurality of pieces of search pose information, an exclusion score indicating a degree of similarity to the exclusion pose information; and an exclusion image selection function of selecting, from the plurality of target images by using the exclusion score, an exclusion image being an image needed to be excluded from a search result.

22. The program according to supplementary note 21 described above, wherein the search information acquisition function acquires a search query image including a person with a pose needed to be included in the target image, and selects the plurality of target images by using a selection score indicating a degree of similarity to the search query image.

23. The program according to supplementary note 22 described above, wherein the exclusion score and the selection score are defined by a same parameter, and the exclusion image selection function sets, by using a selection reference for selecting the plurality of target images, an exclusion reference for selecting the exclusion image.

24. The program according to supplementary note 23 described above, wherein the exclusion image selection function selects, as the exclusion image, the target image in which a distance in a space formed of the parameter satisfies the exclusion reference, the search information acquisition function selects, as the target image, an image in which a distance in a space formed of the parameter satisfies the selection reference, and the exclusion reference is less than the selection reference.

25. The program according to any one of supplementary notes 22 to 24 described above, wherein the exclusion image selection function acquires a selection input of at least the one exclusion image, and excludes the exclusion image selected by the selection input from the plurality of target images, and the search information acquisition function updates, by using the exclusion image selected by the selection input, a selection reference for selecting the plurality of target images by using the search query image, and stores the search query image and the selection reference after an update in association with each other in a storage unit.

26. The program according to supplementary note 22 described above, wherein the exclusion score is indicated by at least one parameter, and the exclusion image selection function sets, according to an input from a user, an exclusion reference for selecting the exclusion image.

27. The program according to supplementary note 26 described above, wherein the exclusion score and the selection score are defined by a same parameter, the exclusion image selection function sets, by using a selection reference for selecting the plurality of target images, an exclusion reference for selecting the exclusion image, and the search information acquisition function updates the selection reference by using the exclusion reference, and stores the search query image and the selection reference after an update in association with each other in a storage unit.

28. The program according to any one of supplementary notes 21 to 27 described above, wherein

33 the exclusion image selection function displays the plurality of target images on a display unit in a state where the exclusion image can be determined, the program further causing the computer to include an exclusion function of excluding the exclusion image from the plurality of target images when there is a predetermined input.

29. The program according to supplementary note 28 described above, wherein
the exclusion image selection function
acquires a selection input of at least the one exclusion image after the plurality of target images are displayed, and
excludes the exclusion image selected by the selection input from the plurality of target images.

30. The program according to supplementary note 28 or 29 described above, wherein
the exclusion image selection function selects a plurality of the exclusion images, and
the exclusion image selection function excludes the plurality of exclusion images from the plurality of target images when there is a predetermined input.

REFERENCE SIGNS LIST

1 Image processing system
10 Image processing apparatus (image selection apparatus)
11 Skeleton detection unit
12 Feature value computation unit
13 Recognition unit
100 Image processing apparatus (image selection apparatus)
101 Image acquisition unit
102 Skeleton structure detection unit
103 Feature value computation unit
104 Classification unit
105 Search unit
106 Input unit
107 Display unit
108 Height computation unit
110 Database
200 Camera
300, 301 Human model
401 Two-dimensional skeleton structure
402 Three-dimensional human model
610 Search information acquisition unit
620 Exclusion information acquisition unit
630 Exclusion score computation unit
640 Exclusion image selection unit

What is claimed is:

1. An image selection apparatus, comprising:
at least one memory storing instructions; and
at least one processor configured to execute the instructions to perform operations comprising:
acquiring a plurality of pieces of search pose information that are information generated for each of a plurality of target images and indicate a pose of a person included in the each of the plurality of target images;
acquiring exclusion pose information indicating a pose of a person included in an exclusion query image to be a query of a candidate image for deletion from a search result;
computing, for each of the plurality of pieces of search pose information, an exclusion score indicating a degree of similarity to the exclusion pose information;

selecting at least one target image, among the plurality of target images, whose degree of similarity to the exclusion pose information is equal to or greater than a threshold value as at least one exclusion image being the candidate image for deletion from the search result;
acquiring a search query image including a person with a desired pose;
selecting the plurality of target images by using a selection score indicating a degree of similarity to the search query image, wherein the exclusion score and the selection score are defined by a same parameter; and
setting, by using a selection reference for selecting the plurality of target images, an exclusion reference for selecting the at least one exclusion image.

2. The image selection apparatus according to claim 1, wherein the operations comprise:
setting, as the at least one exclusion image, the at least one target image in which a distance in a space formed of the parameter satisfies the exclusion reference; and
selecting, as the at least one target image, an image in which a distance in the space formed of the parameter satisfies the selection reference, and
the exclusion reference is less than the selection reference.

3. The image selection apparatus according to claim 1, wherein the operations comprise
acquiring a selection input of the at least one exclusion image, and excluding the at least one exclusion image selected by the selection input from the plurality of target images, and
updating, by using the at least one exclusion image selected by the selection input, a selection reference for selecting the plurality of target images by using the search query image, and
storing the search query image and the selection reference after an update in association with each other in a storage.

4. The image selection apparatus according to claim 1, wherein
the exclusion score is indicated by at least one parameter, and
the operations comprise setting, according to an input from a user, an exclusion reference for selecting the at least one exclusion image.

5. The image selection apparatus according to claim 4, wherein
the exclusion score and the selection score are defined by a same parameter,
the operations comprise
setting, by using a selection reference for selecting the plurality of target images, an exclusion reference for selecting the at least one exclusion image, and
updating the selection reference by using the exclusion reference, and
storing the search query image and the selection reference after an update in association with each other in storage.

6. The image selection apparatus according to claim 1, wherein the operations comprise
displaying the plurality of target images on a display-in a state where the at least one exclusion image can be determined,
excluding the at least one exclusion image from the plurality of target images when there is a predetermined input.

7. The image selection apparatus according to claim 6, wherein
the operations comprise acquiring a selection input of the at least one exclusion image after the plurality of target images are displayed, and excluding the at least one exclusion image selected by the selection input from the plurality of target images.

8. The image selection apparatus according to claim 6, wherein the operations comprise selecting a plurality of exclusion images, and excluding the plurality of exclusion images from the plurality of target images when there is a predetermined input.

9. An image selection method, comprising, by a computer:

acquiring a plurality of pieces of search pose information that are pose information generated for each of a plurality of target images and indicate a pose of a person included in the each of the plurality of target images;

acquiring exclusion pose information indicating a pose of a person included in an exclusion query image to be a query of a candidate image for deletion from a search result;

computing, for each of the plurality of pieces of search pose information, an exclusion score indicating a degree of similarity to the exclusion pose information;

selecting at least one target image, among the plurality of target images, whose degree of similarity to the exclusion pose information is equal to or greater than a threshold value as at least one exclusion image being the candidate image for deletion from the search result;

acquiring a search query image including a person with a desired pose;

selecting the plurality of target images by using a selection score indicating a degree of similarity to the search query image, wherein the exclusion score and the selection score are defined by a same parameter; and setting, by using a selection reference for selecting the plurality of target images, an exclusion reference for selecting the at least one exclusion image.

10. A non-transitory computer-readable medium storing a program causing a computer to perform operations comprising:

acquiring a plurality of pieces of search pose information that are pose information generated for each of a plurality of target images and indicate a pose of a person included in the each of the plurality of target images;

acquiring exclusion pose information indicating a pose of a person included in an exclusion query image to be a query of an image needed to be excluded from a search result;

computing, for each of the plurality of pieces of search pose information, an exclusion score indicating a degree of similarity to the exclusion pose information;

selecting at least one target image, among the plurality of target images, whose degree of similarity to the exclusion pose information is equal to or greater than a threshold value as at least one exclusion image being a candidate image for deletion from the search result;

acquiring a search query image including a person with a desired pose;

selecting the plurality of target images by using a selection score indicating a degree of similarity to the search query image, wherein the exclusion score and the selection score are defined by a same parameter; and setting, by using a selection reference for selecting the plurality of target images, an exclusion reference for selecting the at least one exclusion image.

* * * * *